(12) United States Patent
Jang et al.

(10) Patent No.: US 11,064,060 B2
(45) Date of Patent: Jul. 13, 2021

(54) FOLDABLE ELECTRONIC DEVICE

(71) Applicant: Samsung Electronics Co., Ltd., Suwon-si (KR)

(72) Inventors: Jinyoung Jang, Suwon-si (KR); Seokwoo Lee, Suwon-si (KR); Joonwon Chang, Suwon-si (KR); Minsoo Kim, Suwon-si (KR); Jinwan An, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/096,714

(22) Filed: Nov. 12, 2020

(65) Prior Publication Data

US 2021/0152678 A1 May 20, 2021

(30) Foreign Application Priority Data

Nov. 14, 2019 (KR) .................. 10-2019-0146153

(51) Int. Cl.
*H04M 1/02* (2006.01)
(52) U.S. Cl.
CPC ................ *H04M 1/0214* (2013.01)
(58) Field of Classification Search
CPC .. H04M 1/0214; H04M 1/026; H04M 1/0216; H04M 1/0231
See application file for complete search history.

(56) References Cited

U.S. PATENT DOCUMENTS 7,580,734 B2 * 8/2009 Ahn .................. G06F 1/1686
455/575.1
7,911,773 B2 * 3/2011 Eromaki ............ G06F 1/1666
361/679.16

(Continued)

FOREIGN PATENT DOCUMENTS

JP 3925519 B2 6/2007
KR 10-0560940 B1 3/2006

(Continued)

OTHER PUBLICATIONS

International Search Report and Written Opinion of the International Searching Authority dated Feb. 15, 2021 in connection with International Application No. PCT/KR2020/015703, 6 pages.

*Primary Examiner* — Lewis G West

(57) ABSTRACT

Provided is a foldable electronic device. The electronic device may include: a foldable housing including: a hinge structure; a first housing structure including a first surface, a second surface, and a first side surface; and a second housing structure including a third surface, a fourth surface, and a second side surface, and foldable with the first housing structure with the hinge structure, wherein, in a folded state, the first side surface and the second side surface are aligned; a flexible display; first side keys including a first sensing panel reflecting a change in force applied to the first side surface; second side keys including a second sensing panel reflecting a change in force applied to the second side surface; and a sensor generating a signal based on a change in the force detected by the first sensing panel or the second sensing panel. It is possible to provide other embodiments.

20 Claims, 31 Drawing Sheets

(56) References Cited

U.S. PATENT DOCUMENTS

| | | | | |
|---|---|---|---|---|
| 8,560,003 | B2* | 10/2013 | Kwak | H04M 1/0247 |
| | | | | 455/550.1 |
| 10,921,857 | B2* | 2/2021 | Kim | G09F 9/301 |
| 2008/0268923 | A1 | 10/2008 | Mochizuki et al. | |
| 2012/0208602 | A1* | 8/2012 | Tsubokawa | H04W 52/0254 |
| | | | | 455/566 |
| 2014/0092041 | A1 | 4/2014 | Ih | |
| 2014/0132481 | A1 | 5/2014 | Bell et al. | |
| 2016/0184700 | A1 | 6/2016 | Lee et al. | |
| 2016/0357318 | A1 | 12/2016 | Chan et al. | |
| 2018/0129262 | A1 | 5/2018 | Veiga et al. | |
| 2018/0307339 | A1 | 10/2018 | Ho et al. | |
| 2019/0050128 | A1 | 2/2019 | Lee | |
| 2019/0286248 | A1* | 9/2019 | McDermid | G06F 3/0221 |
| 2019/0339739 | A1 | 11/2019 | Park et al. | |
| 2020/0293093 | A1* | 9/2020 | Kim | G06F 1/1656 |
| 2021/0014989 | A1* | 1/2021 | Hsu | G09F 9/301 |

FOREIGN PATENT DOCUMENTS

| | | |
|---|---|---|
| KR | 10-2016-0080841 A | 7/2016 |
| KR | 10-2017-0141253 A | 12/2017 |
| KR | 10-2019-0127074 A | 11/2019 |

* cited by examiner

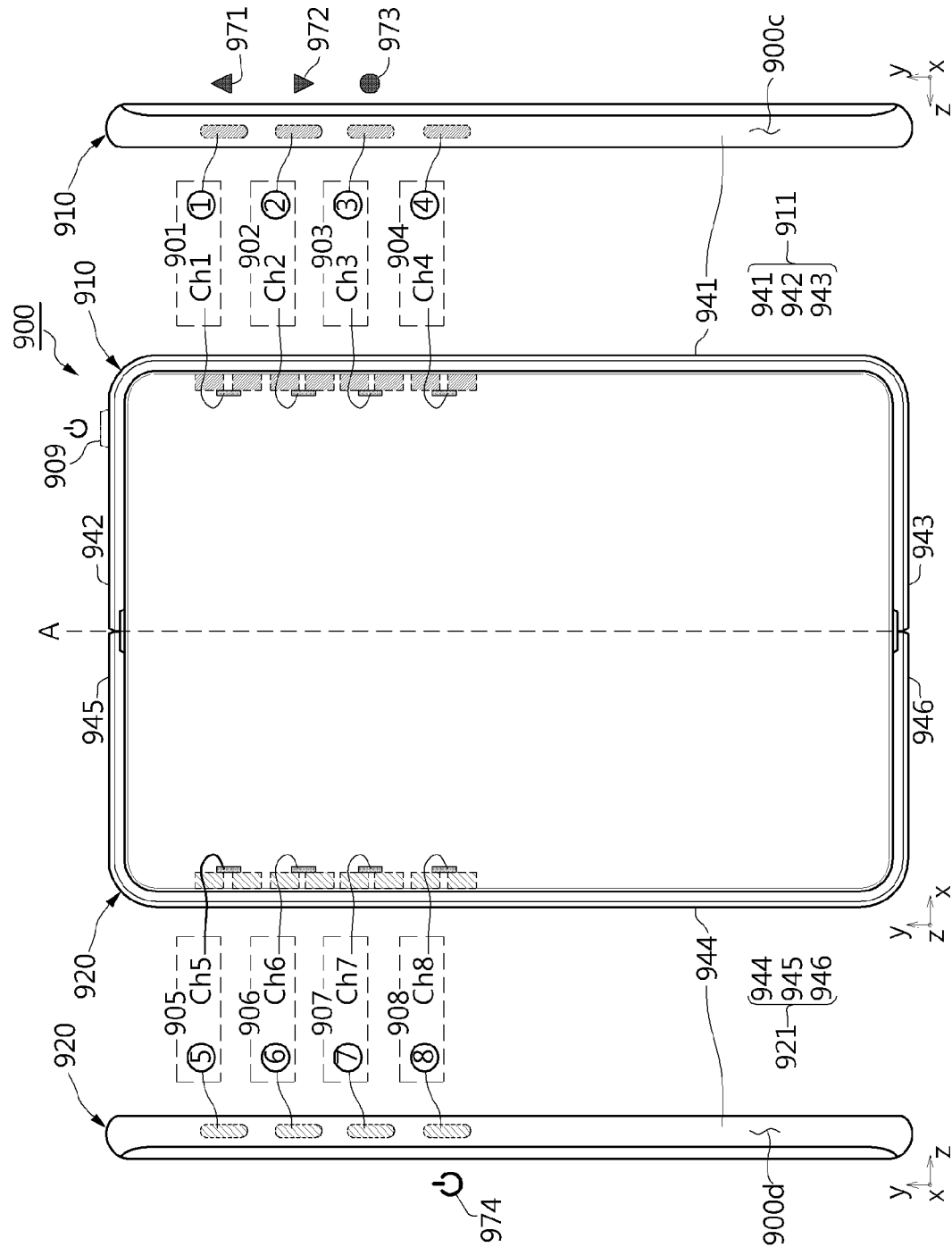

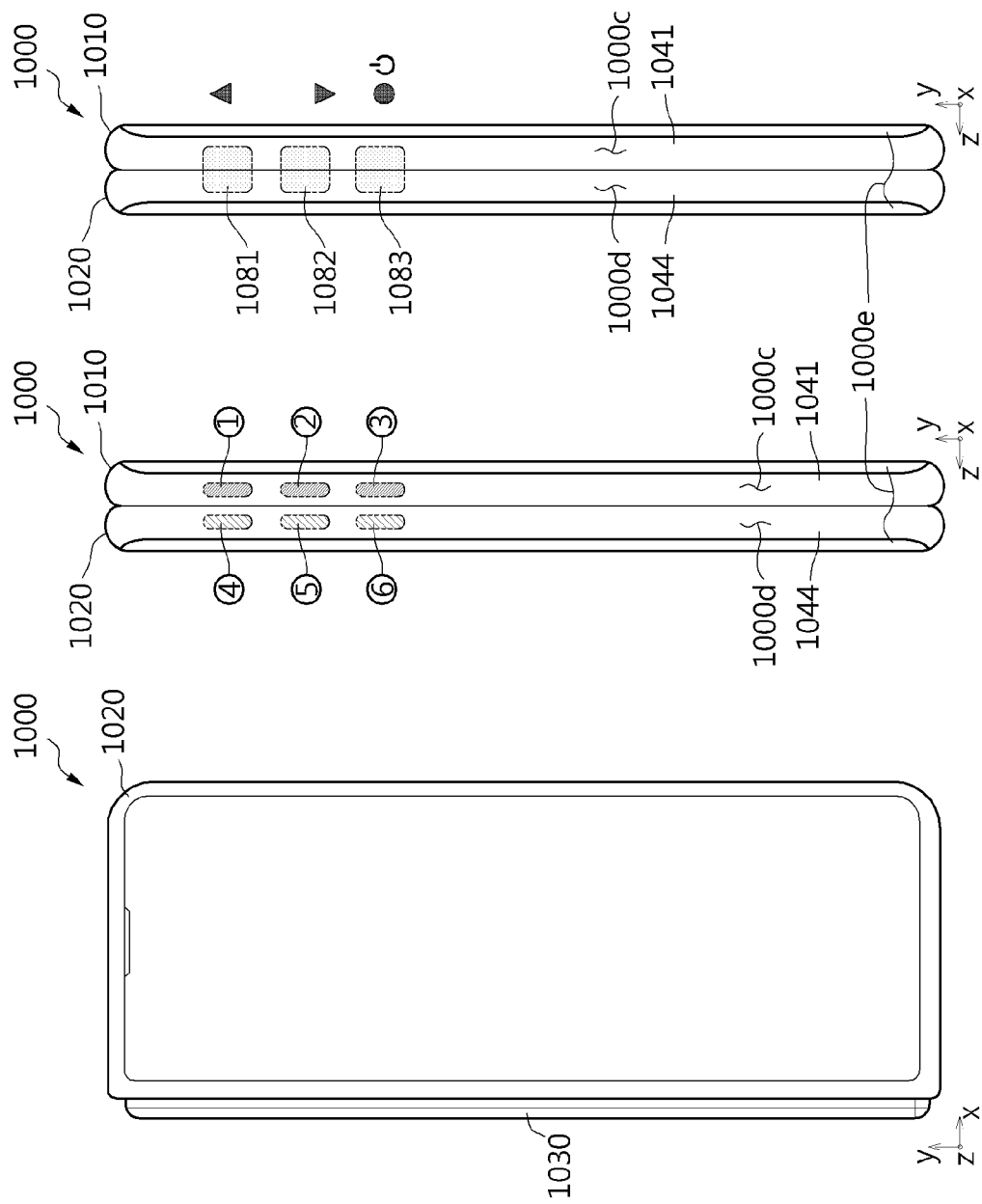

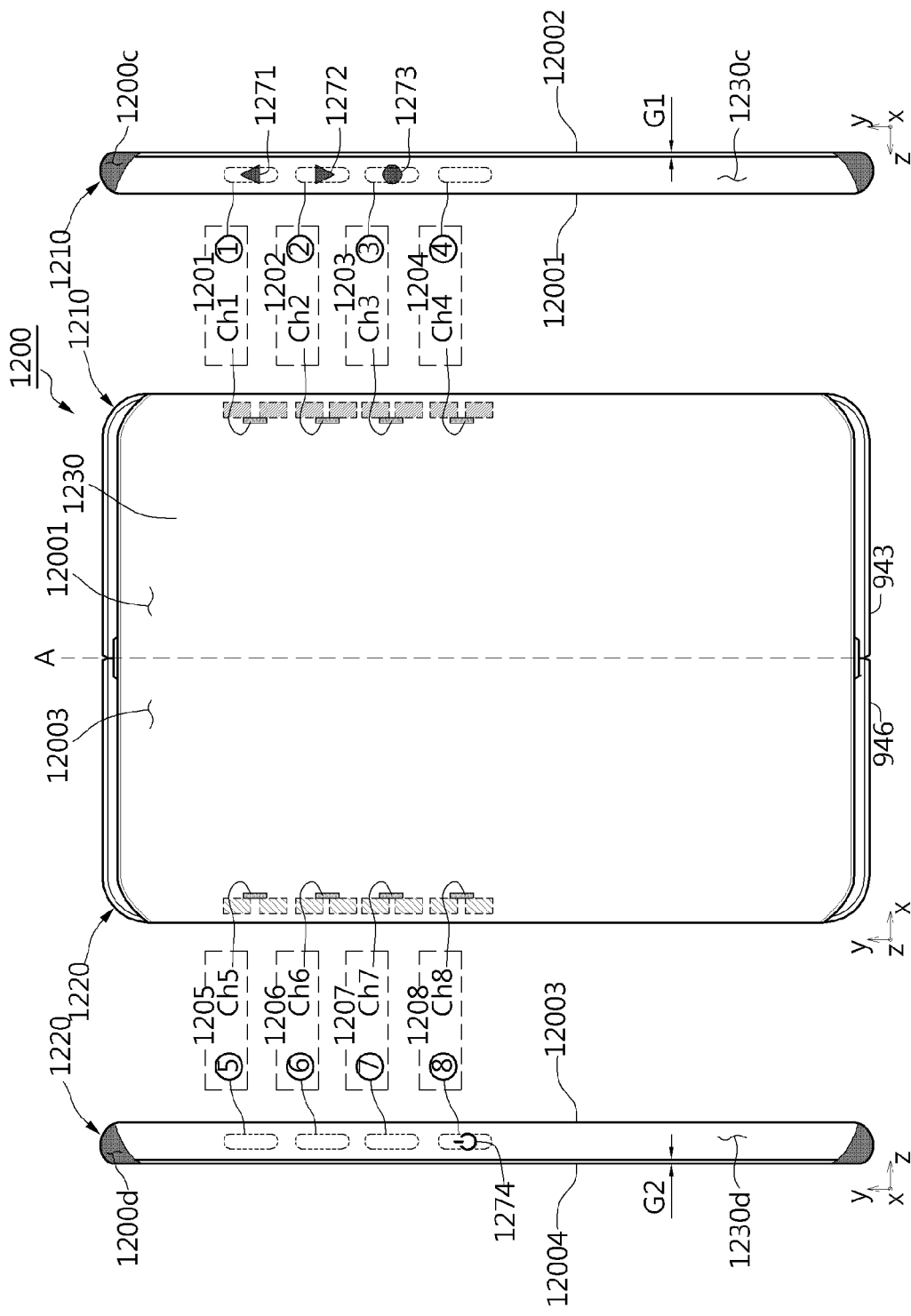

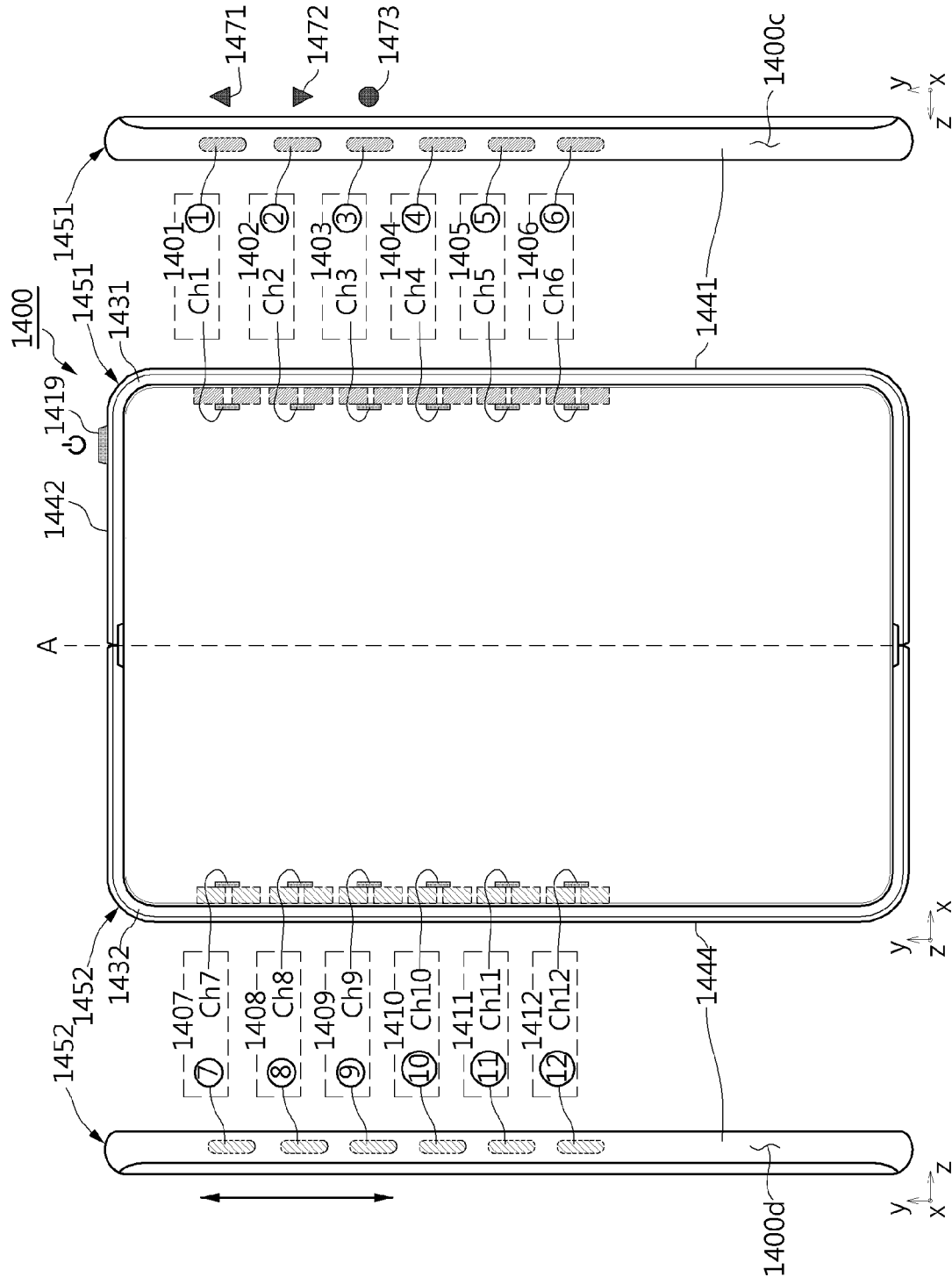

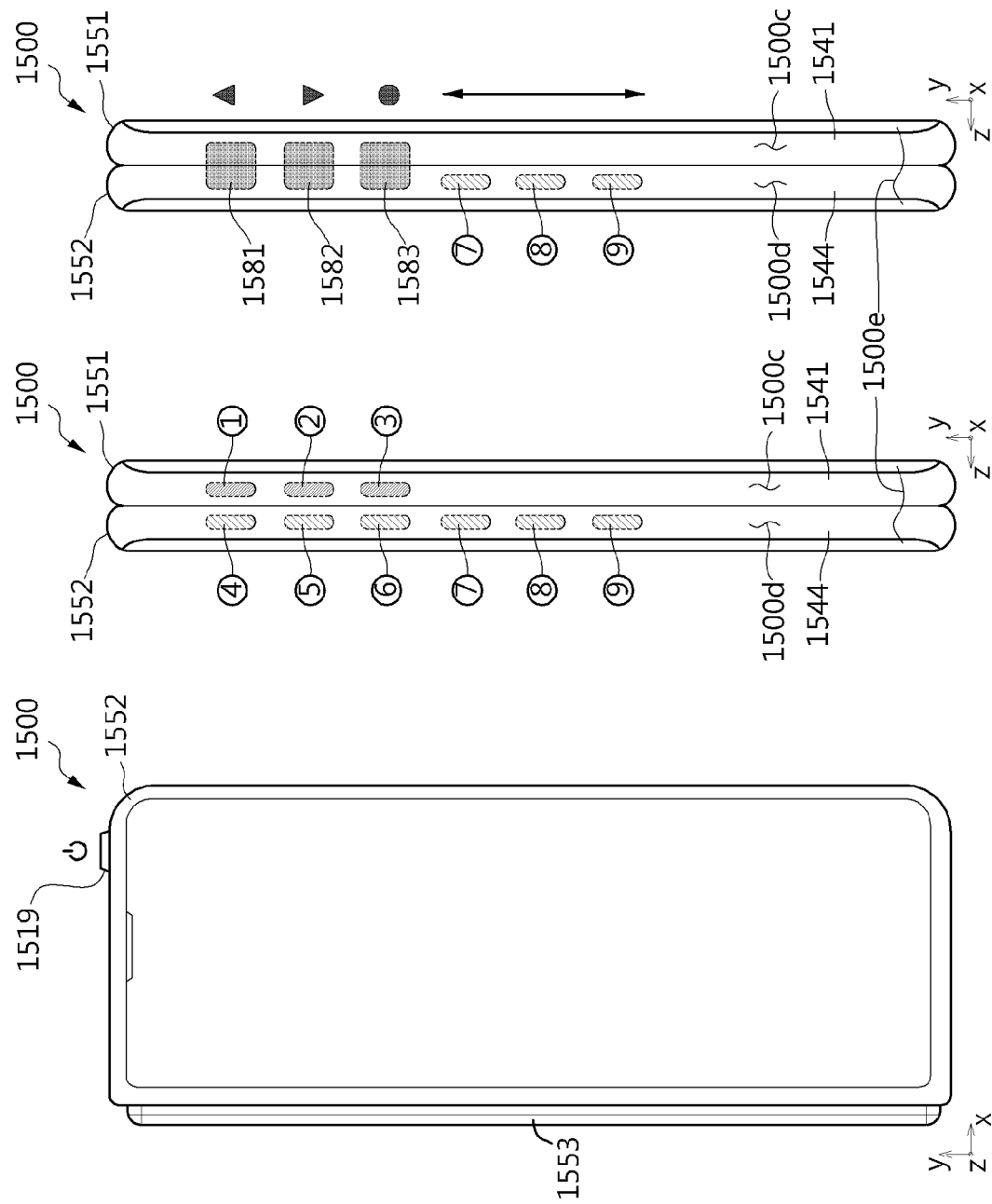

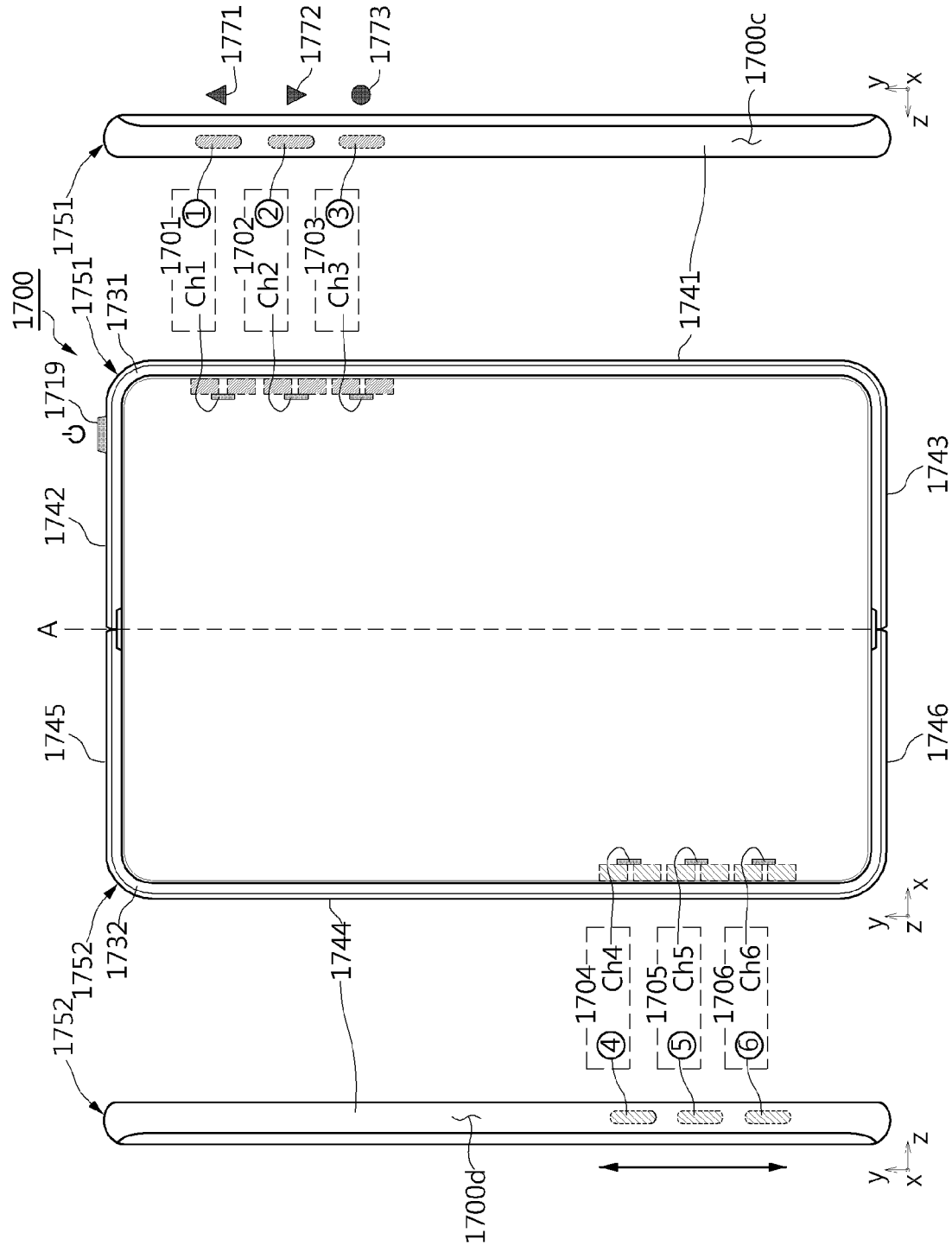

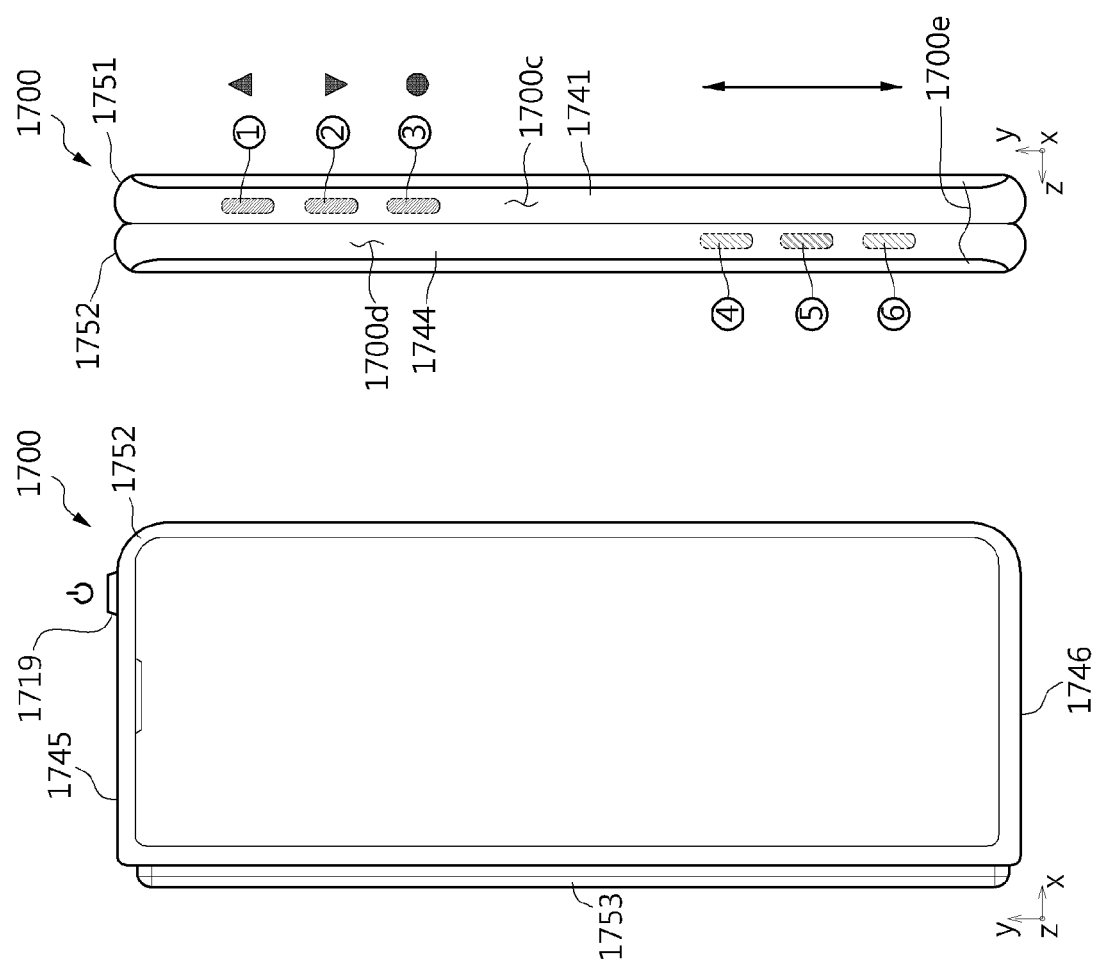

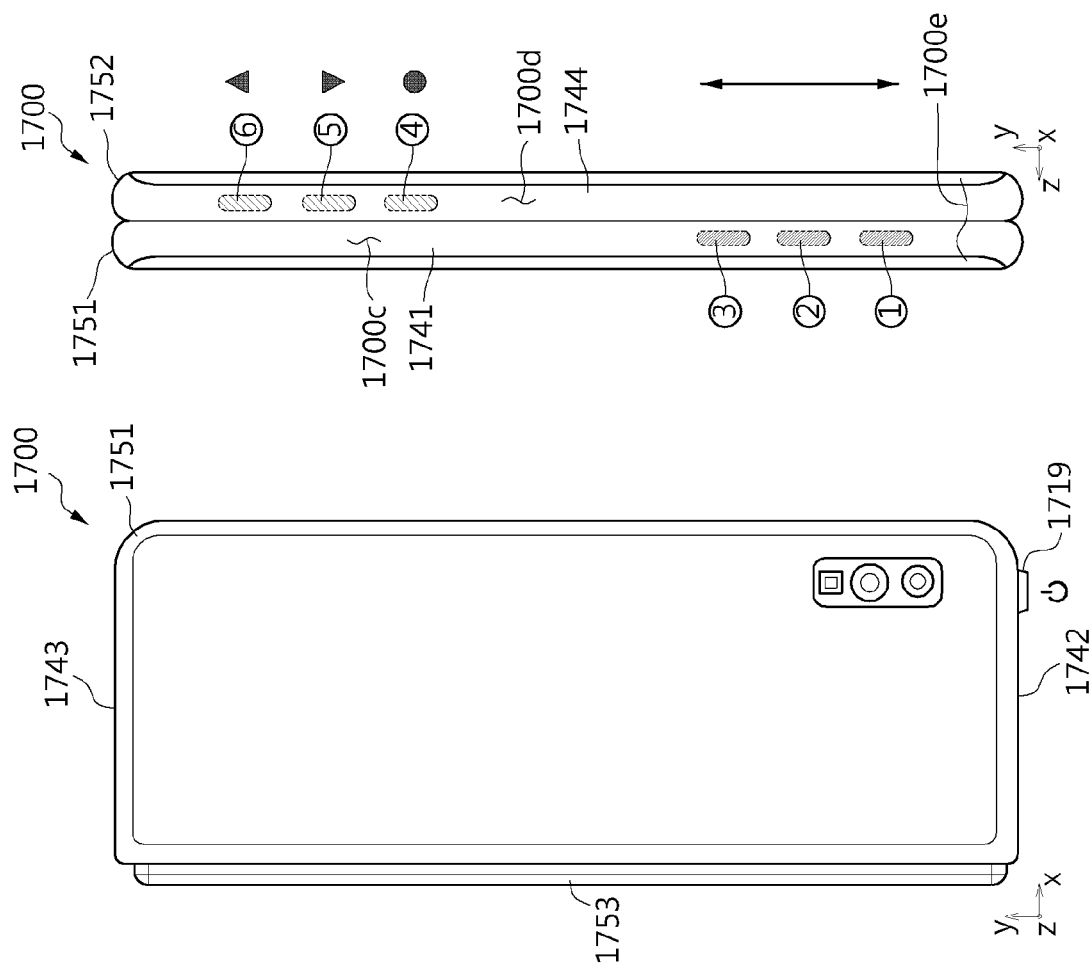

FOLDABLE ELECTRONIC DEVICE

CROSS-REFERENCE TO RELATED APPLICATION

This application is based on and claims priority under 35 U.S.C. § 119 to Korean Patent Application No. 10-2019-0146153, filed on Nov. 14, 2019, in the Korean Intellectual Property Office, the disclosure of which is herein incorporated by reference in its entirety.

BACKGROUND

1. Field

One embodiment of the disclosure relates to a foldable electronic device.

2. Description of Related Art

With advances in electronic communication technology, electronic devices having various functions have been introduced. These electronic devices may support a convergence function by performing one or more functions in combination. In recent years, as the functional gap between manufacturers is significantly reduced, to meet the consumer's purchasing needs, electronic devices are gradually becoming slimmer with enhanced design aspects. For example, the form factor paradigm of electronic devices such as smartphones is changing from a bar type to a foldable type. For instance, a foldable electronic device may include two housings overlapping each other in the folded state.

SUMMARY

The foldable electronic device may include a physical button disposed on the side surface of one housing. When the user attempts to enter a key by pressing the physical button with a thumb while holding the electronic device in the folded state with one hand, as the physical button is disposed on the side surface of one housing, it may be difficult to have a user experience holding an electronic device such as a bar-type smartphone with one hand and pressing a button placed on its side surface with a thumb. In addition, when pressing the physical button of the electronic device in the folded state, the external force may be concentrated on one housing in which the physical button is disposed, and this may cause damage to the hinge trying to maintain the folded state. Further, due to the slimness of electronic devices, it is becoming increasingly difficult to arrange physical buttons.

One embodiment of the disclosure may provide a foldable electronic device capable of realizing various key functions without exposed buttons by changing a physical method of controlling buttons to a touch method.

One embodiment of the disclosure may provide a foldable electronic device that is capable of providing a user experience for key input that may be offered by a bar-type electronic device when the foldable electronic device is in the folded state.

According to an embodiment of the disclosure, there is provided an electronic device. The electronic device may include: a foldable housing that includes: a hinge structure; a first housing structure connected to the hinge structure, and including a first surface facing in a first direction, a second surface facing in a second direction opposite to the first direction, and a first side surface surrounding at least some of a space between the first surface and the second surface; and a second housing structure connected to the hinge structure, including a third surface facing in a third direction, a fourth surface facing in a fourth direction opposite to the third direction, and a second side surface surrounding at least some of a space between the third surface and the fourth surface, and being foldable with the first housing structure with the hinge structure as a center, wherein, in a folded state, the first side surface and the second side surface may be aligned with each other; a flexible display extended from the first surface to the third surface; one or more first side keys disposed near the first side surface within the first housing structure, and including a first sensing panel reflecting a change in an external force applied to the first side surface; one or more second side keys disposed near the second side surface within the second housing structure, and including a second sensing panel reflecting a change in an external force applied to the second side surface; and a sensor disposed inside the foldable housing, electrically connected to the first sensing panel and the second sensing panel, and generating a signal related to a key input based on a change in the external force detected by the first sensing panel or the second sensing panel, wherein, in the folded state, at least one of the one or more first side keys and at least one of the one or more second side keys may be substantially aligned with each other.

According to various embodiments of the disclosure, it is possible to realize a foldable electronic device with a smooth design of unity by eliminating the physical button. Also, reducing the constraint on the side height for the arrangement of physical buttons can help slim the foldable electronic device. Further, while the foldable electronic device is in the folded state, a user experience may be provided for key input that may be offered by a bar-type electronic device.

Other effects that can be obtained or predicted due to the disclosure will be disclosed explicitly or implicitly in the detailed description of the embodiments of the disclosure. For example, various effects predicted according to various embodiments of the disclosure will be disclosed in the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9A illustrates an electronic device in the unfolded state according to an embodiment;

FIG. 10B illustrates the electronic device of FIG. 10A in the folded state according to various embodiments;

FIG. 12A illustrates an electronic device in the unfolded state according to various embodiments;

FIG. 14A illustrates an electronic device in the unfolded state according to various embodiments;

FIG. 15B illustrates the electronic device of FIG. 15A in the folded state according to various embodiments;

FIG. 17A illustrates an electronic device in the unfolded state according to various embodiments;

FIG. 17B illustrates the electronic device of FIG. 17A in the folded state according to various embodiments;

FIG. 17D illustrates an electronic device in the folded state and in the second rotation state according to various embodiments;

DETAILED DESCRIPTION

FIGS. 1 through 19B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
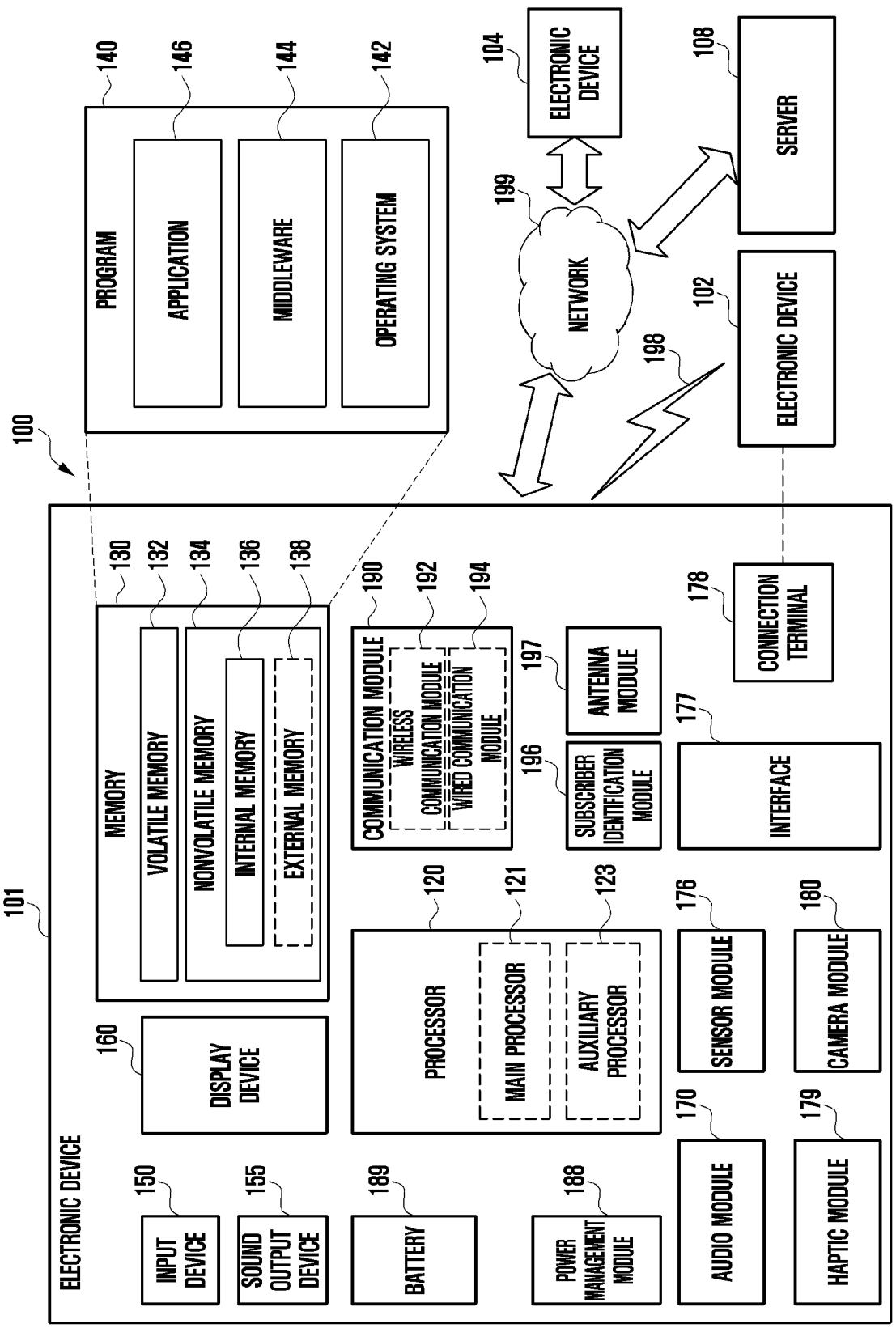
FIG. 1 is a block diagram of an electronic device in a network environment according to an embodiment.

FIG. 1 is a block diagram of an electronic device in a network environment according to an embodiment of the disclosure.

Referring to FIG. 1, in a network environment 100, an electronic device 101 may communicate with a first external electronic device 102 through a first network 198 (e.g., short-range wireless communication network) or may communicate with a second external electronic device 104 or a server 108 through a second network 199 (e.g., long-distance wireless communication network). In one embodiment, the electronic device 101 may communicate with the second external electronic device 104 through the server 108. According to an embodiment, the electronic device 101 may include a processor 120, a memory 130, an input unit 150, a sound output unit 155, a display unit 160, an audio module 170, a sensor module 176, an interface 177, a haptic module 179, a camera module 180, a power management module 188, a battery 189, a communication module 190, a subscriber identification module 196, and an antenna module 197. In one embodiment, at least one component (e.g., the display unit 160 or the camera module 180) among the components of the electronic device 101 may be omitted, or other components may be added to the electronic device 101. In one embodiment, some of these components may be implemented as an integrated circuit. For example, the sensor module 176 (e.g., fingerprint sensor, iris sensor, or illuminance sensor) may be embedded in the display unit 160 (e.g., display).

The processor 120 may execute, for example, software (e.g., a program 140) to control at least one of other components (e.g., hardware component or software component) of the electronic device 101 connected to the processor 120, and may process a variety of data or perform various computations. In one embodiment, as part of data processing or computation, the processor 120 may load a command or data received from other components (e.g., the sensor module 176 or the communication module 190) into the volatile memory 132, process the command or data stored in the volatile memory 132, and store the result data in nonvolatile memory 134. In one embodiment, the processor 120 may include a main processor 121 (e.g., central processing unit, or application processor), and a secondary processor 123 (e.g., graphics processing unit, image signal processor, sensor hub processor, or communication processor), which may operate independently of or in cooperation with the main processor 121. Additionally or alternatively, the secondary processor 123 may consume less power or may be more specialized in a specific function compared with the main processor 121. The secondary processor 123 may be implemented separately from or as part of the main processor 121.

The secondary processor 123 may control at least some of the functions or states associated with at least one component (e.g., the display unit 160, the sensor module 176, or the communication module 190) among the components of the electronic device 101, for example, instead of the main processor 121 while the main processor 121 is in an inactive (e.g., sleep) state, or together with the main processor 121 while the main processor 121 is in an active (e.g., application execution) state. In one embodiment, the secondary processor 123 (e.g., image signal processor or communication processor) may be implemented as a part of another component (e.g., the camera module 180 or the communication module 190) that is functionally related to the secondary processor 123.

The memory 130 may store a variety of data used by at least one component (e.g., the processor 120 or the sensor module 176) of the electronic device 101. The data may include, for example, software (e.g., the program 140) and input data or output data for commands associated with the software. The memory 130 may include the volatile memory 132 or the nonvolatile memory 134.

The programs 140 may be stored in the memory 130 as software, and may include, for example, an operating system 142, a middleware 144, or an application 146.

The input unit 150 may receive a command or data, which can be to be used for a component (e.g., the processor 120) of the electronic device 101, from the outside of the electronic device 101 (e.g., user). The input unit 150 may include, for example, a microphone, a mouse, a keyboard, or a digital pen (e.g., stylus pen).

The sound output unit 155 may output a sound signal to the outside of the electronic device 101. The sound output unit 155 may include, for example, a speaker and a receiver. The speaker may be used for general purposes, such as playback of multimedia or recordings, and the receiver may be used for receiving an incoming call. In one embodiment, the receiver may be implemented separately from or as part of the speaker.

The display unit 160 may visually present information to the outside of the electronic device 101 (e.g., user). The display unit 160 may include, for example, a display, a hologram device, or a projector, and a control circuit for controlling these. In one embodiment, the display unit 160 may include a touch circuitry configured to sense a touch, or a sensing circuitry (e.g., pressure sensor) configured to measure the strength of a force caused by a touch action.

The audio module 170 may convert a sound into an electric signal or convert an electric signal into a sound. In one embodiment, the audio module 170 may obtain a sound signal through the input unit 150 or may output a sound signal through an external electronic device (e.g., the first external electronic device 102 (e.g., speaker or headphone)) wiredly or wirelessly connected to the sound output unit 155 or the electronic device 101.

The sensor module 176 may generate an electrical signal or a data value corresponding to the operating state (e.g., power or temperature) of the electronic device 101 or the environmental state (e.g., user state) outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols that enable the electronic device 101 to directly or wirelessly connect to an external electronic device (e.g., the first external electronic device 102). In one embodiment, the interface 177 may include, for example, a high-definition multimedia interface (HDMI), a universal serial bus (USB) interface, an SD card interface, or an audio interface.

The connection terminal 178 may include a connector through which the electronic device 101 can be physically connected to an external electronic device (e.g., the first external electronic device 102). In one embodiment, the connection terminal 178 may include, for example, an HDMI connector, a USB connector, a secure digital (SD) card connector, or an audio connector (e.g., headphone connector).

The haptic module 179 may convert an electrical signal into a mechanical stimulus (e.g., vibration or motion) or an electrical stimulus that can be perceived by the user through tactile or kinesthetic senses. In one embodiment, the haptic module 179 may include, for example, a motor, a piezoelectric element, or an electric stimulator.

The camera module 180 may capture a still image or a moving image. In one embodiment, the camera module 180 may include at least one lens, an image sensor, an image signal processor, or a flash.

The power management module 188 may manage the power supplied to the electronic device 101. The power management module 188 may be implemented as part of a power management integrated circuit (PMIC).

The battery 189 may supply power to at least one component of the electronic device 101. In one embodiment, the battery 189 may include, for example, a non-rechargeable primary cell, a rechargeable secondary cell, or a fuel cell.

The communication module 190 may establish a wired or wireless communication channel between the electronic device 101 and the external electronic device (e.g., the first external electronic device 102, the second external electronic device 104, or the server 108) and support communication through the established communication channel. The communication module 190 may include at least one communication processor that can operate separately from the processor 120 (e.g., application processor) to support wired or wireless communication. In one embodiment, the communication module 190 may include a wireless communication module 192 (e.g., cellular communication module, short-range wireless communication module, or global navigation satellite system (GNSS) communication module), or a wired communication module 194 (e.g., local area network (LAN) communication module, or power line communication module). The corresponding communication module may communicate with an external electronic device through the first network 198 (e.g., short-range communication network such as Bluetooth, Wi-Fi direct, or infrared data association (IrDA)) or through the second network 199 (e.g., long-distance communication network such as a cellular network, the Internet, or a computer network like a LAN or WAN). The above various communication modules may be implemented as one component (e.g., single chip) or as separate components (e.g., multiple chips). The wireless communication module 192 may identify and authenticate the electronic device 101 in the communication network such as the first network 198 or the second network 199 by using subscriber information stored in the subscriber identification module 196.

The antenna module 197 may transmit or receive a signal or power to or from the outside (e.g., the external electronic devices 102 or 104). In one embodiment, the antenna module 197 may include one antenna having a radiator made of a conductor or conductive pattern formed on a substrate (e.g., PCB). In one embodiment, the antenna module 197 may include a plurality of antennas. In this case, at least one antenna suitable for the communication scheme used in the communication network such as the first network 198 or the second network 199 may be selected from the plurality of antennas by, for example, the communication module 190. The signal or power may be transmitted or received between the communication module 190 and the external electronic devices 102 or 104 through the selected at least one antenna. In one embodiment, in addition to the radiator, another component (e.g., radio frequency integrated circuit (RFIC)) may be further formed as part of the antenna module 197.

At least some of the above components may be connected to each other via a communication scheme between peripherals (e.g., bus, general purpose input and output (GPIO), serial peripheral interface (SPI), or mobile industry processor interface (MIPI)), and may exchange signals (e.g., commands or data) with each other.

In one embodiment, commands or data may be exchanged between the electronic device 101 and the second external electronic device 104 through the server 108 connected to the second network 199. The external electronic devices 102 and 104 may be of the same type as or a different type from the electronic device 101. In one embodiment, all or some of the operations that can be performed by the electronic device 101 may be performed by one or more of the external electronic devices 102, 104 and 108. For example, to perform a certain function or service automatically or upon request, the electronic device 101 may, instead of or in addition to executing the function or service, request one or more external electronic devices to execute at least some of the function or service. Upon reception of the request, the external electronic devices may execute at least a portion of the requested function or service or an additional function or service related to the request, and return the execution results to the electronic device 101. The electronic device 101 may further process the received results if necessary and provide the processing results as a response to the requested function or service. To this end, technologies such as cloud computing, distributed computing, and client-server computing may be used.

The electronic device according to various embodiments disclosed herein can be one of various types of devices, such as portable communication devices (e.g., smartphones), computers, portable multimedia devices, portable medical instruments, cameras, wearable devices, and home appliances. However, the electronic device is not limited to the above-mentioned devices.

It should be understood that the various embodiments of the disclosure and the terminology used herein are not intended to limit the techniques described herein to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (functionally or communicatively) "coupled with/to" or "connected with/to" another element (e.g., second element), it can be coupled or connected with/to the other element directly (wiredly), wirelessly, or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit, or a part thereof, which performs one or more particular functions. For example, a module may be implemented in the form of an application-specific integrated circuit (ASIC).

Various embodiments of the disclosure may be implemented in software (e.g., the programs 140) including instructions stored in a machine-readable storage medium (e.g., internal memory 136 or external memory 138) readable by a machine (e.g., the electronic device 101). For example, the processor (e.g., the processor 120) of the machine (e.g., the electronic device 101) can fetch a stored instruction from a storage medium and execute the fetched instruction. When the instruction is executed by the processor, the machine may perform the function corresponding to the instruction. The instructions may include a code generated by a compiler and a code executable by an interpreter. The machine-readable storage medium may be provided in the form of a non-transitory storage medium. Here, "non-transitory" means that the storage medium does not include a signal and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may be composed of one or more elements. An existing component may be omitted, and a new component may be added. Alternatively or additionally, some of the components (e.g., modules or programs) may be combined into one entity while maintaining the same functionality. Operations supported by a module, program, or another component may be carried out in sequence, in parallel, by repetition, or heuristically. Some operations may be executed in a different order or may be omitted, and a new operation may be added.

Figure 2:
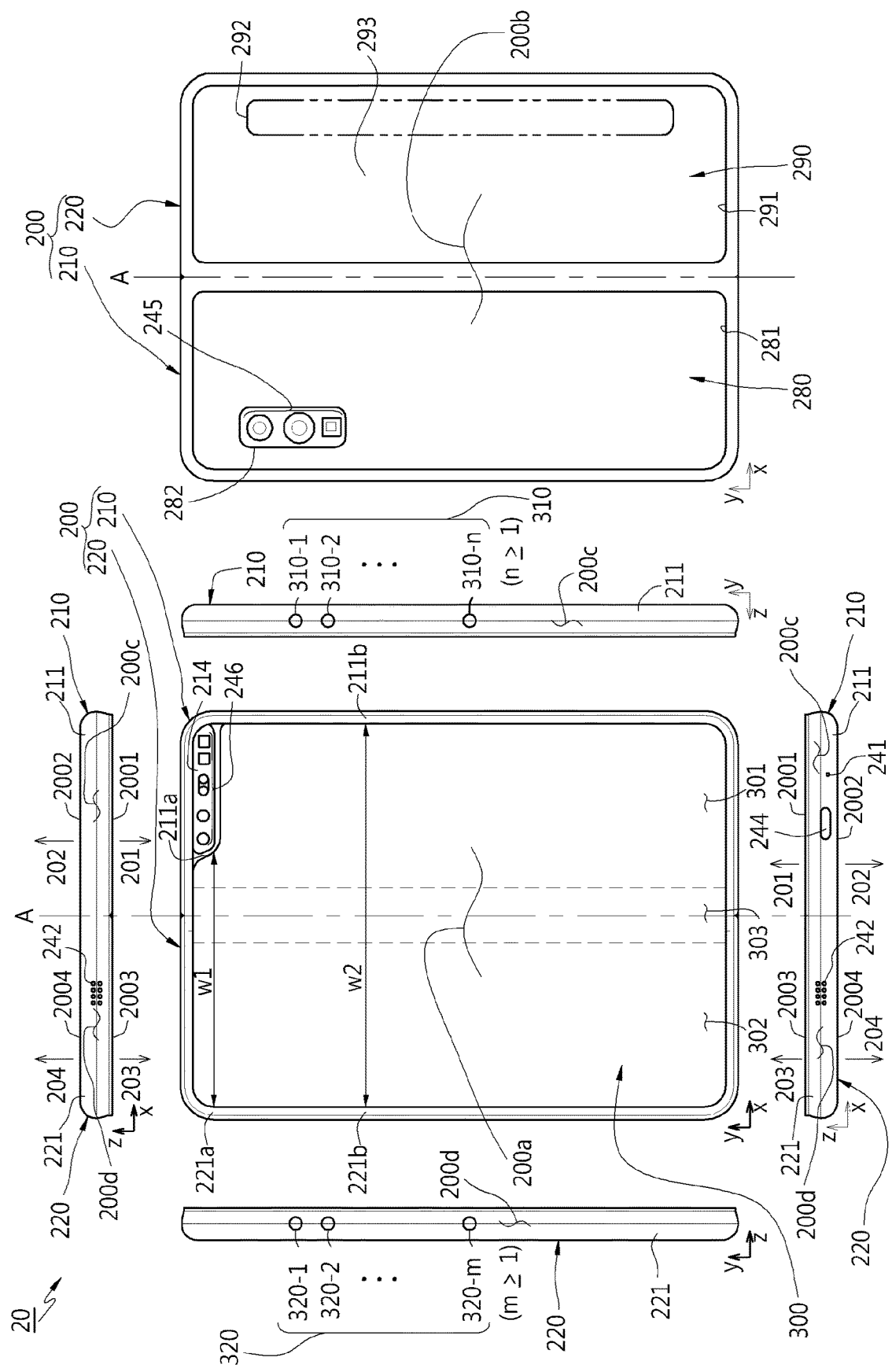
FIG. 2 illustrates an electronic device in the unfolded state according to an embodiment.
Figure 3:
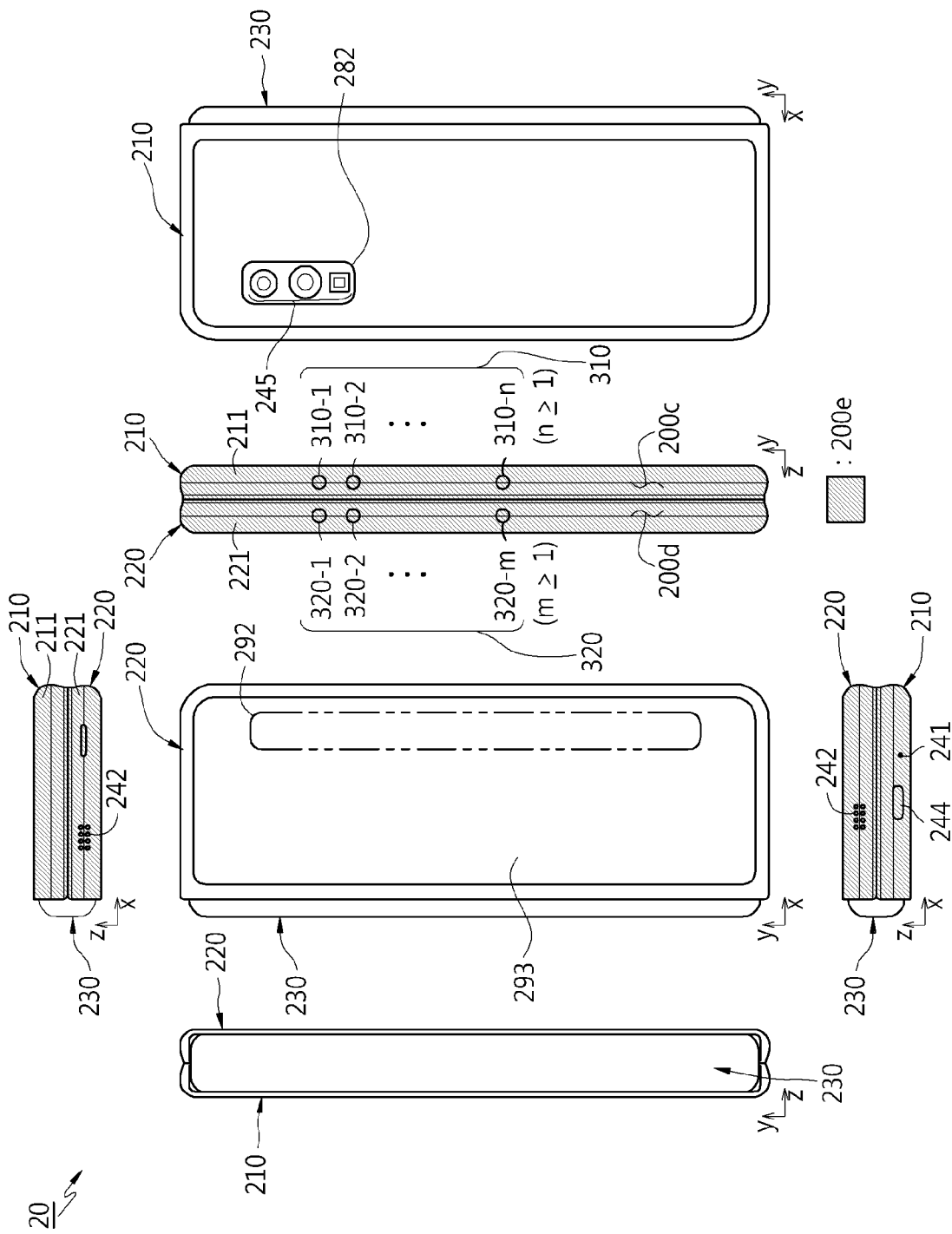
FIG. 3 illustrates the electronic device of FIG. 2 in the folded state according to an embodiment.

FIG. 2 illustrates an electronic device in the flat or unfolded state according to an embodiment. FIG. 3 illustrates the electronic device of FIG. 2 in the folded state according to an embodiment.

With reference to FIGS. 2 and 3, in one embodiment, the electronic device 20 (e.g., electronic device 101 in FIG. 1) may include a foldable housing 200, a hinge cover 230 covering the foldable portion of the foldable housing 200, and a flexible or foldable display 300 (hereinafter, "display") (e.g., display device 160 in FIG. 1) disposed in a space formed by the foldable housing 200. In one embodiment, the foldable housing 200 may include a front surface 200a to which the display 300 is exposed, a rear surface 200b facing in the opposite direction of the front surface 200a, and side surfaces 200c and 200d surrounding the space between the front surface 200a and the rear surface 200b.

In one embodiment, the foldable housing 200 may include a first housing structure 210 and a second housing structure 220 connected by a hinge structure (not shown). For example, the first housing structure 210 may be rotatably connected to the second housing structure 220 through the hinge structure.

In one embodiment, the first housing structure 210 may include a first surface 2001 facing in a first direction 201, a second surface 2002 facing in a second direction 202 opposite to the first direction 201, and a first side surface 200c surrounding at least some of the space between the first surface 2001 and the second surface 2002. The second housing structure 220 may include a third surface 2003 facing in a third direction 203, a fourth surface 2004 facing in a fourth direction 204 opposite to the third direction 203, and a second side surface 200d surrounding at least some of the space between the third surface 2003 and the fourth surface 2004. The front surface 200a of the electronic device 20 may include the first surface 2001 and the third surface 2003, and the rear surface 200b of the electronic device 20 may include the second surface 2002 and the fourth surface 2004. In various embodiments (not shown), the first housing structure 210 may refer to a structure that forms a part of the first surface 2001, the second surface 2002, and the first side surface 200c. In various embodiments (not shown), the second housing structure 220 may refer to a structure that forms a part of the third surface 2003, the fourth surface 2004, and the second side surface 200d.

In one embodiment, the foldable housing 200 may include a transparent plate (not shown) forming the first surface 2001 and the third surface 2003 (e.g., polymer plate including various coating layers). The display 300 may be disposed along the transparent plate, and may be visually exposed through the first surface 2001 and the third surface 2003. The transparent plate may have flexibility to enable the folded state of the electronic device 20. In one embodiment, the display 300 may be implemented to include a transparent plate, and the foldable housing 200 may not include a transparent plate.

In one embodiment, the first housing structure 210 may include a first rear cover 280 disposed on one side of the folding axis A and forming at least a portion of the second surface 2002. For example, the first rear cover 280 may have a substantially rectangular periphery 281, and the periphery 281 may be wrapped by a first side member 211. In various embodiments, the first side member 211 and the first rear cover 280 may be formed as a single body and may be made of the same material.

In one embodiment, the second housing structure 220 may include a second rear cover 290 disposed on the other side of the folding axis A and forming at least a portion of the fourth surface 2004. For example, the second rear cover 290 may have a substantially rectangular periphery 291, and the periphery 291 may be wrapped by a second side member 221. In various embodiments, the second side member 221 and the second rear cover 290 may be formed as a single body and may be made of the same material.

In various embodiments, the first rear cover 280 or the second rear cover 290 may be made of, for example, coated or colored glass, ceramic, polymer, or metal (e.g., aluminum, stainless steel (STS), or magnesium), or a combination thereof.

In one embodiment, the first rear cover 280 and the second rear cover 290 may have substantially symmetrical shapes with respect to the folding axis A. The first rear cover 280 and the second rear cover 290 do not necessarily have mutually symmetric shapes, and may have various different shapes in another embodiment.

In one embodiment, the first housing structure 210 may include a first side member (or, first side bezel structure) 211 constituting the first side surface 200c, and the second housing structure 220 may include a second side member (or, second side bezel structure) 221 constituting the second side surface 200d. The first side member 211 or the second side member 221 may be made of metal or polymer.

In various embodiments, the first side member 211 and the second side member 221 may be extended to form the edge region of the front surface 200a. For example, the front surface 200a of the electronic device 20 may be formed by the display 300, a region of the first side member 211 adjacent to the display 300, and a region of the second side member 221.

In various embodiments, a region (not shown) of the first side member 211 adjacent to the periphery 281 of the first rear cover 280 or a region (not shown) of the second side member 221 adjacent to the periphery 291 of the second rear cover 290 may constitute a portion of the rear surface 200b. For example, the rear surface 200b of the electronic device 20 may be formed by the first rear cover 280, a region of the first side member 211 adjacent to the first rear cover 280, the second rear cover 290, and a region of the second side member 221 adjacent to the second rear cover 290.

In one embodiment, the first side member 211 and the second side member 221 may be disposed on both sides of the folding axis A, and may have symmetrical shapes on the whole with respect to the folding axis A.

In one embodiment, the first housing structure 210 may further include a component placement region 214 that extends from or is coupled to the first side member 211 and constitutes the first surface 200I together with the display 300. The remaining region of the first side member 211 excluding the component placement region 214 may have a shape symmetrical to that of the second side member 221. At least one component utilizing the first surface 200I may be disposed in the component placement region 214. In one embodiment, the component placement region 214 may be formed to have a region close to one corner of the first side member 211. In various embodiments, the arrangement, shape, and size of the component placement region 214 are not limited to the illustrated example. For example, in another embodiment, the component placement region 214 may be arranged at another corner of the first side member 211 or in a region between the top and bottom corners thereof. Components for performing various functions embedded in the electronic device 20 may be exposed on the first surface 200I through the component placement region 214 or one or more openings (not shown) formed in the component placement region 214. In one embodiment, the components 246 arranged in the component placement region 214 may include at least one of various sensors such as a proximity sensor, a front camera, a light emitting element, or a receiver. For example, the light emitting element may provide status information of the electronic device 20 in the form of light. In another embodiment, the light emitting element may provide a light source associated with the operation of, for example, the front camera. The light emitting element may include, for example, an LED, an IR LED, or a xenon lamp.

In one embodiment, the electronic device 20 may include at least one of audio modules 241 and 242 or a connector hole 244.

In one embodiment, the audio modules 241 and 242 may include a microphone hole 241 or a speaker hole 242. A microphone for picking up an external sound may be disposed inside the microphone hole 241. In a certain embodiment, a plurality of microphones may be arranged in the microphone hole 241 to identify the direction of a sound. The speaker hole 242 may include an external speaker hole or a call receiver hole. In a certain embodiment, the speaker hole 242 and the microphone hole 241 may be implemented as one hole, or a speaker may be included without the speaker hole 242 (e.g., piezo speaker). In one embodiment, the connector hole 244 may include a first connector hole that can accommodate a connector (e.g., USB connector) for transmitting and receiving power or data to and from an external electronic device, or a second connector hole (e.g., earphone jack) that can accommodate a connector for transmitting and receiving audio signals to and from an external electronic device. The position or number of connector holes is not limited to the embodiment of FIG. 2 or 3 and may be formed differently.

In various embodiments (not shown), at least one of an audio module (e.g., call receiver), a sensor module (e.g., proximity sensor or fingerprint sensor), a camera module (e.g., front camera), or a light emitting device may be included on the rear surface of the screen display area of the display 300. In another embodiment (not shown), the display 300 may be disposed in combination with or adjacent to a touch sensing circuit, a pressure sensor for measuring the intensity (pressure) of a touch, or a digitizer for detecting a magnetic field type electronic pen.

In one embodiment, the first housing structure 210 and the second housing structure 220 may together constitute a recess being a space in which the display 300 is disposed. In the illustrated embodiment, due to the component placement region 214, the recess may have two or more different widths in a direction perpendicular to the folding axis A.

For example, the recess may have a first width w1 in the x-axis direction between a first portion 221a of the second side member 221 parallel to the folding axis A and a first portion 211a of the first side member 211 formed on the periphery of the component placement region 214. The recess may have a second width w2 in the x-axis direction between a second portion 221b of the second side member 221 and a second portion 211b of the first side member 211 not corresponding to the component placement region 214 and parallel to the folding axis A. The second width w2 may be formed larger than the first width w1. In one embodiment, the first portion 211a of the first housing structure 210 and the first portion 221a of the second housing structure 220 with asymmetric shapes may constitute the first width w1 of the recess, and the second portion 211b of the first housing structure 210 and the second portion 221b of the second housing structure 220 with symmetrical shapes may constitute the second width w2 of the recess. In one embodiment, the distance between the first portion 221a of the second housing structure 220 and the folding axis A may be different from that between the second portion 221b thereof and the folding axis A. The width of the recess is not limited to the illustrated example. In various embodiments, the recess may have plural different widths due to the shape of the component placement region 214 or portions of the first housing structure 210 and the second housing structure 220 having asymmetrical shapes.

In various embodiments (not shown), the display 300 may be extended to the component placement region 214, and the component placement region 214 and the components 246 (e.g., optical components) disposed thereon may be located on or close to the rear surface of the display 300. In this case, the display 300 may have a symmetrical shape with respect to the folding axis A.

One or more components may be disposed or visually exposed on the rear surface 200b of the electronic device 20.

For example, the sub display 293 may be visually exposed through the second rear cover 290. In one embodiment, the sub display 293 may be substantially visible through the entire area of the second rear cover 290. In a certain embodiment, the sub display may be disposed to be visually exposed through some (e.g., second rear region 292) of the second rear cover 290.

For example, at least one component 245 may be visually exposed through a first rear region 282 of the first rear cover 280. In various embodiments, the at least one component 245 may include a sensor (e.g., proximity sensor, or heart rate sensor) or a rear camera.

With reference to FIG. 3, the hinge cover 230 disposed between the first housing structure 210 and the second housing structure 220 may cover internal components (e.g., hinge structure). In a certain embodiment, the hinge structure may also be referred to as an element that includes the hinge cover 230. In one embodiment, the hinge cover 230 may be hidden by some of the first housing structure 210 and the second housing structure 220 or be exposed to the outside according to the unfolded state or the folded state of the electronic device 20.

In one embodiment, when the electronic device 20 is in the folded state (FIG. 3), the first surface 2001 of the first housing structure 210 and the second surface 2002 of the second housing structure 220 may face each other. The folded state may include a fully folded state. In the fully folded state, for example, as shown in FIG. 3, the first surface 2001 of the first housing structure 210 and the second surface 2002 of the second housing structure 220 may have an angle of about 0 degrees. The folded state may further include a state where the first surface 2001 of the first housing structure 210 and the second surface 2002 of the second housing structure 220 face each other at a narrow angle (e.g., between about 0 degrees and about 10 degrees).

In one embodiment, the unfolded state of the electronic device 20 indicates when it is not in the folded state, and may include a fully unfolded state or an intermediate state. In the fully unfolded state, for example, as in FIG. 2, the first surface 2001 of the first housing structure 210 and the third surface 2003 of the second housing structure 220 may have an angle of about 180 degrees. The intermediate state may refer to a state between the folded state and the fully unfolded state. As shown in FIG. 3, in the folded state, the hinge cover 230 may be exposed to the outside between the first housing structure 210 and the second housing structure 220. As shown in FIG. 2, in the fully unfolded state, the hinge cover 230 may be not exposed by being covered by the first housing structure 210 and the second housing structure 220. Although not shown, in the intermediate state, the hinge cover 230 may be partially exposed to the outside between the first housing structure 210 and the second housing structure 220. The exposed region of the hinge cover 230 in the intermediate state may be less than the exposed region of the hinge cover 230 in the folded state. In one embodiment, the hinge cover 230 may include a curved surface, and the curved surface may constitute one side surface of the electronic device 20 in the folded state.

In various embodiments, the foldable housing 200 may be implemented in various other forms. For example, the foldable housing (not shown) may include a folding part, a first part and a second part with the folding part interposed therebetween. The folding part may be a curved portion when the electronic device transitions from the unfolded state to the folded state. In various embodiments, the first part may be referred to by various other terms such as "first housing part". The second part may be referred to by various other terms such as "second housing part". The folding part is a portion with flexibility enabling the folding between the first part and the second part, and may be referred to by various other terms. The folding part may be implemented by a structure (e.g., hinge rail or hinge rail structure) where plural bars (or, rails) extending in the y-axis direction are arranged from the first part to the second part. In various embodiments, the folding part may be implemented in various other structures that can be bent while connecting the first part and the second part. In the folded state of the electronic device, the folding part may form a curved shape whose at least a portion has a curvature. In various embodiments, the first part or the second part may refer to a part less flexible than the folding part. In various embodiments, the folding part may be made of a material different from that of the first part or the second part.

In various embodiments, the display 300 may indicate a display whose at least some region can be deformed into a flat surface or a curved surface. In one embodiment, with reference to FIG. 2, the display 300 may include a folding part 303, a first part 301 disposed on one side of the folding part 303 (e.g., right side of the folding part 303), and a second part 302 disposed on the other side (e.g., left side of the folding part 303). The folding part 303 may be a curved portion when the electronic device 20 transitions from the unfolded state to the folded state.

In various embodiments, the division of regions in the display 300 illustrated in FIG. 2 is exemplary, and the display 300 may be divided into plural regions (e.g., four or more regions, or two regions) according to the structure or functionality. For example, in the embodiment illustrated in FIG. 2, the display 300 may be divided into regions based on the folding part 303 or the folding axis A extending parallel to the y-axis, but in another embodiment, the display 300 may be divided into regions based on a different folding part (e.g., folding part parallel to the x-axis) or different folding axis (e.g., folding axis parallel to the x-axis).

In one embodiment, the first part 301 and the second part 302 of the display 300 may have symmetrical shapes on the whole with respect to the folding part 303. In one embodiment, the second part 302, unlike the first part 301, may include a notch cut according to the presence of the component placement region 214, but may have a shape symmetrical to that of the first part 301 with respect to the folding part 303 in other regions. For example, the first part 301 and the second part 302 may include regions having symmetrical shapes and regions having asymmetrical shapes with respect to the folding part 303.

In one embodiment, the angle or distance between the first housing structure 210 and the second housing structure 220 may vary depending on the unfolded state or folded state of the foldable housing 200. Next, a description is given of the operation of the first housing structure 210 and the second housing structure 220 and regions of the display 300 according to the unfolded or folded state of the electronic device 20.

In one embodiment, when the electronic device 20 is in the fully unfolded state (FIG. 2), the first direction 201 in which the first surface 2001 of the first housing structure 210 faces and the third direction 203 in which the third surface 2003 of the second housing structure 220 faces may be the same. For example, in the unfolded state, the first surface 2001 of the first housing structure 210 and the third surface 2003 of the second housing structure 220 may be arranged to face the same direction (e.g., direction in which the front surface 200a of the electronic device 20 faces) at an angle of about 180 degrees. When the electronic device 20 is in the fully unfolded state, the surface of the first part 301 of the display 300 and the surface of the second part 302 may face the same direction (e.g., direction in which the front surface 200a of the electronic device 20 faces) at an angle of about 180 degrees. In the fully unfolded state, the folding part 303 of the display 300 may be coplanar with the first part 301 and the second part 302.

In one embodiment, when the electronic device 20 is in the folded state (FIG. 3), the first housing structure 210 and the second housing structure 220 may be arranged to face each other. For example, in the folded state, the first surface 2001 of the first housing structure 210 and the third surface 2003 of the second housing structure 220 may face each other. In the folded state, the surface of the first part 301 of the display 300 and the surface of the second part 302 may face each other at a small angle (e.g., between about 0 and 10 degrees). In the folded state, at least a portion of the folding part 303 may be formed of a curved surface having a preset curvature.

In one embodiment, when the electronic device 20 is in an intermediate state (not shown) between the fully unfolded state (FIG. 2) and the fully folded state (FIG. 3), the first housing structure 210 and the second housing structure 220 may be arranged at a certain angle with each other. In the intermediate state, the first surface 2001 of the first housing structure 210 and the third surface 2003 of the second housing structure 220, or the surface of the first part 301 and the surface of the second part 302 of the display 300, may form an angle greater than that of the folded state and smaller than that of the fully unfolded state. In the intermediate state, at least a portion of the folding part 303 may be formed of a curved surface having a preset curvature, and this curvature may be less than that of the folded state.

In one embodiment, the electronic device 20 may include a plurality of first sensing elements 310 arranged near the first side surface 200c in the first housing structure 210. The plural first sensing elements 310 may be disposed on, for example, the first side member 211. In one embodiment, the plural first sensing elements 310 may be arranged along a portion of the first side member 211 that is parallel to and spaced apart from the folding axis A. For example, when a first input region of the first side surface 200c corresponding to a first sensing element 310-$n$ is touched or pressed by a finger, a change may occur in various physical properties of the first sensing element 310-$n$, such as electrical properties, magnetic properties, or optical properties. In various embodiments, the first input region may be referred to as a first touch region. In various embodiments, the position or number of the first sensing elements may be varied without being limited to the embodiment of FIG. 2.

In one embodiment, the electronic device 20 may include a plurality of second sensing elements 320 arranged near the second side surface 200d in the second housing structure 220. The plural second sensing elements 320 may be disposed on, for example, the second side member 221. In one embodiment, the plural second sensing elements 320 may be arranged along a portion of the second side member 221 that is parallel to and spaced apart from the folding axis A. For example, when a second input region of the second side surface 200d corresponding to a second sensing element 320-$m$ is touched or pressed by a finger, a change may occur in various physical properties of the second sensing element 320-$m$, such as electrical properties, magnetic properties, or optical properties. In various embodiments, the second input region may be referred to as a second touch region. In various embodiments, the position or number of the second sensing elements may be varied without being limited to the embodiment of FIG. 2.

In one embodiment, the plural first sensing elements 310 and the plural second sensing elements 320 may be electrically connected to a sensor (or, sensor integrated circuit (IC)) (not shown) disposed inside the foldable housing 200. The sensor may output an electrical signal (e.g., key input signal) related to a user input through the first side surface 200c based on a change in physical properties detected by a first sensing element 310-$n$. The sensor may output an electrical signal (e.g., key input signal) related to a user input through the second side surface 200d based on a change in physical properties detected by a second sensing element 320-$m$. In various embodiments, the sensing elements (e.g., first sensing element 310-$n$ or second sensing element 320-$m$) and the sensor may be collectively referred to as a "sensor circuit".

In one embodiment, the first sensing element 310-$n$ or the second sensing element 320-$m$ may include a strain gauge. When the first input region of the first side surface 200c corresponding to the first sensing element 310-$n$ or the second input region of the second side surface 200d corresponding to the second sensing element 320-$m$ is pressed, strain may occur at a resistor (e.g., resistance wire) included in the strain gauge due to the external stress. This strain can change the resistance of the resistor. The sensor may output a key input signal related to a user input based on a change in resistance detected by the strain gauge. In various embodiments, a sensor circuit composed of sensing elements (e.g., first sensing element 310-$n$ or second sensing element 320-$m$) and a sensor may be implemented in connection with various other physical properties (e.g., capacitance, or magnetic force).

In one embodiment, the sensor circuit composed of sensing elements (e.g., first sensing element 310-$n$ or second sensing element 320-$m$) and a sensor can replace physical buttons, thereby realizing the external appearance of the electronic device 20 with a smooth design and a sense of unity. The sensor circuit composed of sensing elements (e.g., first sensing element 310-$n$ or second sensing element 320-$m$) and a sensor may reduce the restrictions on the height of the first side surface 200c or the second side surface 200d (e.g., thickness in the z-axis direction in FIG. 2) for placement of physical buttons, helping to slim the electronic device 20.

With reference to FIG. 3, in one embodiment, the height of the third side surface 200e of the electronic device 20 in the folded state may be greater than that in the unfolded state due to the alignment of the first side surface 200c and the second side surface 200d. In one embodiment, in the folded state of the electronic device 20, when viewed toward the third side surface 200e, at least some of the plural first sensing elements 310 and at least some of the plural second sensing elements 320 may be aligned with each other. When the first sensing element 310-$n$ and the second sensing element 320-$m$ are aligned with each other in the folded state of the electronic device 20, the first input region (not shown) of the first side surface 200c corresponding to the first sensing element 310-$n$ and the second input region (not shown) of the second side surface 200d corresponding to the second sensing element 320-$m$ may also be aligned with each other. When the first sensing element 310-$n$ and the second sensing element 320-$m$ aligned with each other in the folded state of the electronic device 20 are used as input elements for the same key function, an extended input region for the key function may be formed on the third side surface 200e due to the alignment of the first and second input regions.

In various embodiments (not shown), in the folded state of the electronic device 20, when viewed toward the third side surface 200e, at least some of the plural first sensing elements 310 and at least some of the plural second sensing elements 320 may be not aligned with each other.

In various embodiments (not shown), the at least one first sensing element may be disposed along a portion of the first side member 211 perpendicular to the folding axis A. The at least one second sensing element may be disposed along a portion of the second side member 221 perpendicular to the folding axis A.

Figure 4:
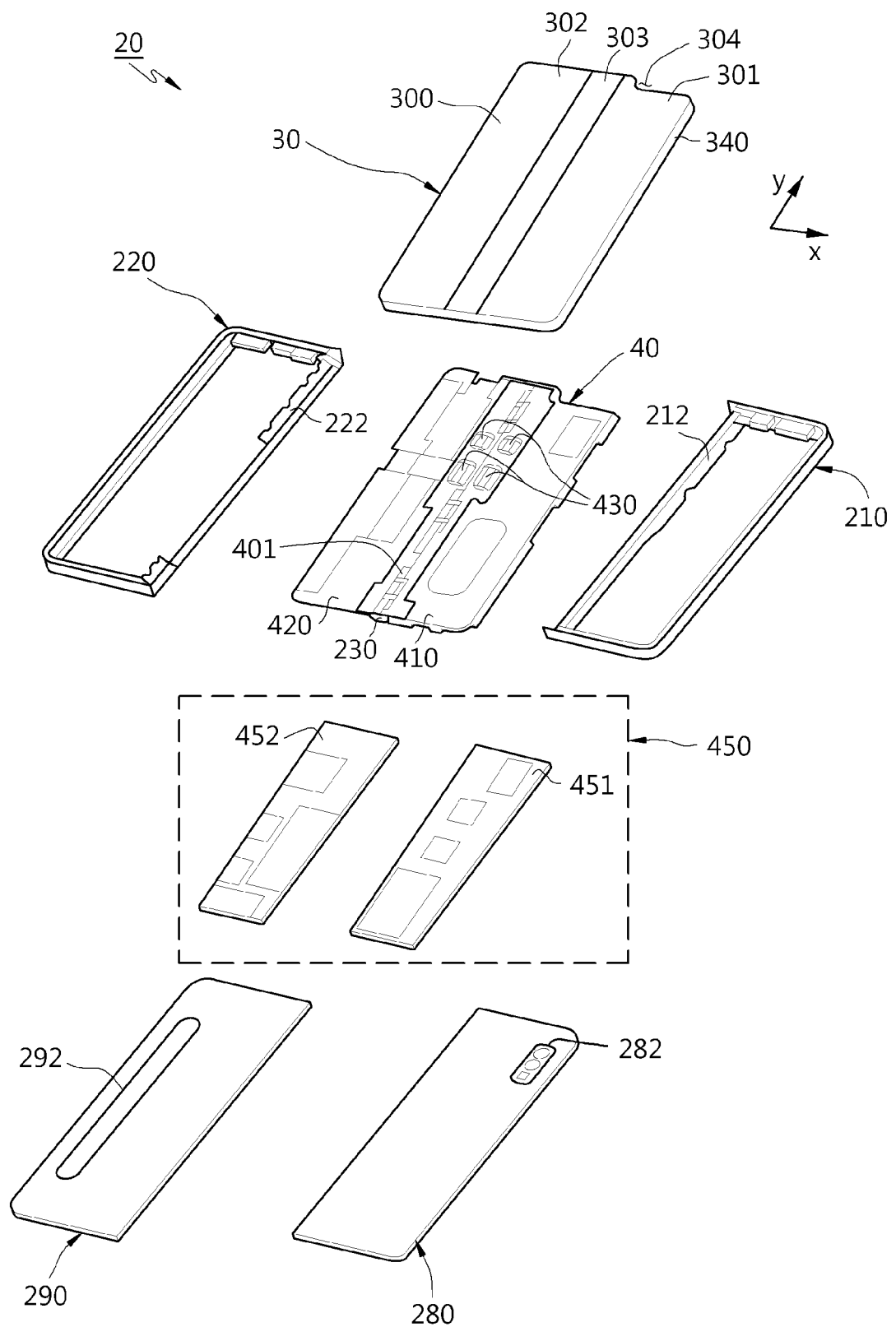
FIG. 4 is an exploded perspective view of the electronic device of FIG. 2 or 3 according to an embodiment.

FIG. 4 is an exploded perspective view illustrating the electronic device 20 of FIG. 2 or FIG. 3 according to an embodiment.

Referring to FIG. 3, in an embodiment, the electronic device 20 may include at least one of a display unit (e.g., including a display) 30, a support member assembly (e.g. bracket or bracket assembly) 40, a substrate unit 450, the first housing structure 210, the second housing structure 220, the first rear cover 280, or the second rear cover 290. In the disclosure, the display unit 30 may be also referred to as a display module or a display assembly.

The display unit 30 may, for example, include the display 300 and at least one plate or layer 340 on which the display 300 is mounted. In an embodiment, the plate 340 may be disposed between the display 300 and the support member assembly 40. The display 300 may be disposed on at least a portion of one surface (e.g., the upper surface in FIG. 4) of the plate 340. The plate 340 may have a shape corresponding to the display 300. For example, a portion of the plate 340 may have a shape corresponding to a cut portion 304 of the display 300.

In various embodiments (not shown), the display unit 30 may further include a digitizer for detecting an electronic pen (e.g., stylus pen). The digitizer may be disposed in adjacent to the display 300 or to be coupled to the back surface of the display 300.

The support member assembly 40 may include a first support member (e.g., first bracket) 410, a second support member (e.g., second bracket) 420, a hinge structure (e.g., including a hinge) 401 disposed between the first and second support members 410 and 420, the hinge cover 230 covering the hinge structure 401, and a wiring member 430 (e.g., a flexible printed circuit (FPC)) intersecting with the first and second support members 410 and 420.

In an embodiment, the support member assembly 40 may be disposed between the plate 340 and the substrate unit 450. For example, the first support member 410 may be disposed between the first part 301 of the display unit 30 and a first substrate 451 (e.g., first PCB). The second support member 420 may be disposed between the second part 302 of the display 300 and a second substrate 452 (e.g., second PCB).

In an embodiment, the wiring member 430 and the hinge structure 401 may be disposed, at least in part, inside the support member assembly 40. The wiring member 430 may be disposed in a direction (e.g., the x-axis direction) that crosses the first and second support members 410 and 420. The wiring member 430 may be disposed in a direction perpendicular to a folding axis (e.g., the y-axis or the folding axis (A) in FIG. 2) of the folding part 303 of the display 300.

In an embodiment, the substrate unit 450 may include the first substrate 451 disposed to correspond to the first support member 410, and the second substrate 452 disposed to correspond to the second support member 420. The first and second substrates 451 and 452 may be disposed in a space formed by all or substantially all of the support member assembly 40, the first housing structure 210, the second housing structure 220, the first rear cover 280, and the second rear cover 290. On the first substrate 451 and the second substrate 452, electronic components for implementing various functions of the electronic device 20 may be mounted.

In an embodiment, the first housing structure 210 and the second housing structure 220 may be assembled to be combined with both sides of the support member assembly 40 in a state where the display unit 30 is combined with the support member assembly 40. In various embodiments, the first housing structure 210 and the second housing structure 220 may be combined with the support member assembly 40 by sliding on both sides of the support member assembly 40.

In an embodiment, the first housing structure 210 may have a first rotation supporting surface 212, and the second housing structure 220 may have a second rotation supporting surface 222 corresponding to the first rotation supporting surface 212. Each of the first and second rotation supporting surfaces 212 and 222 may have a curved surface corresponding to the curved surface included in the hinge cover 230.

In an embodiment, when the electronic device 20 is in the flat state (e.g., FIG. 2), the first and second rotation supporting surfaces 212 and 222 cover the hinge cover 230 so that the hinge cover 230 may not be exposed or be exposed in a relatively small amount to the rear surface of the electronic device 20. Meanwhile, when the electronic device 20 is in the folded state (e.g., FIG. 3), the hinge cover 230 may be exposed in a relatively lot amount to the rear surface of the electronic device 20.

Figure 5:
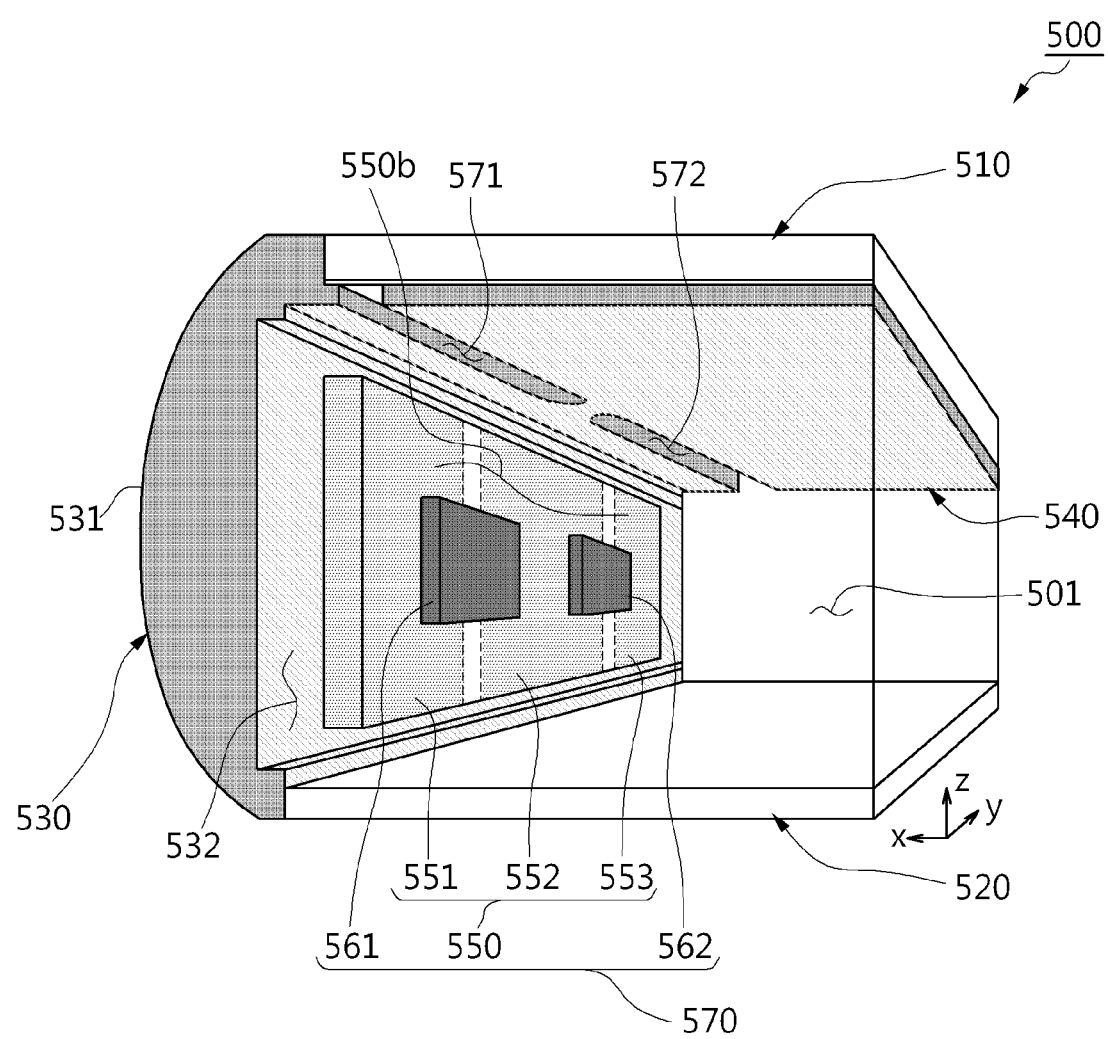
FIG. 5 is a partial cross-sectional view of an electronic device associated with sensing elements according to an embodiment.

FIG. 5 is a partial cross-sectional view of an electronic device 500 associated with sensing elements according to an embodiment.

With reference to FIG. 5, in one embodiment, the electronic device 500 (e.g., electronic device 20 in FIG. 2) may include a display 510, a rear cover 520, a side member 530, a support member 540, or a sensing panel 570.

In one embodiment, the display 510 and the rear cover 520 may be disposed at opposite sides, and the side member 530 may at least partially surround the space 501 between the display 510 and the rear cover 520. In various embodiments, the display 510 may correspond to the display 300 in FIG. 2 or 4. In various embodiments, FIG. 5 may be associated with the first housing structure 210 of the electronic device 20 in FIG. 2. For example, the side member 530 may correspond to the first side member 211 in FIG. 2, and the rear cover 520 may correspond to the first rear cover 280 in FIG. 2. In various embodiments, FIG. 5 may be associated with the second housing structure 220 of the electronic device 20 in FIG. 2. For example, the side member 530 may correspond to the second side member 221 in FIG. 2, and the rear cover 520 may correspond to the second rear cover 290 in FIG. 2.

In one embodiment, the support member (e.g., bracket) 540 may be disposed between the display 510 and the rear cover 520, and may be connected to the side member 530. At least a portion of the support member 540 may be integrally formed with the side member 530 and may be made of the same material as the side member 530. In various embodiments, FIG. 5 may be associated with the first housing structure 210 of the electronic device 20 in FIG. 2, and the support member 540 may correspond to the first support member 410 in FIG. 4. In various embodiments, FIG. 5 may be associated with the second housing structure 220 of the electronic device 20 in FIG. 2, and the support member 540 may correspond to the second support member 420 in FIG. 4. The support member 540 may be made of, for example, a metal material or a non-metal material (e.g., polymer). The display 510 may be combined with the support member 540.

In one embodiment, the side member 530 may include an outer side surface 531 that forms the side surface (e.g., first side surface 200c or second side surface 200d in FIG. 2) of the electronic device 500, and an inner side surface 532 limiting the space 501 between the display 510 and the rear cover 520. In one embodiment, the sensing panel 570 may be disposed on the inner side surface 532. In various embodiments, the inner side surface 532 of the side member 530 may include a recess (not shown), and the sensing panel 570 may be disposed on the recess.

In one embodiment, the sensing panel 570 may include a base plate 550 including plural plates 551, 552 and 553, and a plurality of flexible resistors 561 and 562 disposed on the base plate 550. The base plate 550 may include one surface (not shown) attached to the inner side surface 532 of the side member 530, and the other surface 550b to which the plural resistors 561 and 562 are attached.

In one embodiment, the inner side surface 532 of the side member 530 may include a substantially flat surface. The base plate 550 may be disposed on the flat surface. The flat surface may face in the negative x-axis direction perpendicular to the z-axis direction, for example, from the rear cover 520 to the display 510.

In one embodiment, the plural plates 551, 552 and 553 of the base plate 550 may be arranged in the y-axis direction. For example, the plural plates 551, 552 and 553 may include a first plate 551, a second plate 552, and a third plate 553 arranged in the y-axis direction with a specific gap. For example, with reference to FIGS. 2 and 5, the plural plates 551, 552 and 553 may be disposed along a portion of the first side member 211 or the second side member 221 that is parallel to and spaced apart from the folding axis A. For another example, with reference to FIGS. 2 and 5, depending on the position of the keys for key input, the plural plates 551, 552 and 553 may be arranged along a portion of the first side member 211 or the second side member 221 perpendicular to the folding axis A.

In various embodiments, the first plate 551, the second plate 552, and the third plate 553 may be formed to be substantially rigid. In one embodiment, the plural flexible resistors 561 and 562 may include a first flexible resistor 561 extending from the first plate 551 to the second plate 552, and a second flexible resistor 562 extending from the second plate 552 to the third plate 553. The outer side surface 531 of the side member 530 may include an input region corresponding to the sensing panel 570. When external stress is applied to the input region, a tiny deflection may occur in the side member 530 in the negative x-axis direction, which may cause strain between the first plate 551 and the second plate 552 or strain between the second plate 552 and the third plate 553. This causes strain in the first flexible resistor 561 or the second flexible resistor 562 disposed on the base plate 550, resulting in a change in the resistance of the first flexible resistor 561 or the second flexible resistor 562. The sensor (not shown) electrically connected to the sensing panel 570 may output a key input signal related to a user input based on a change in the resistance of the first flexible resistor 561 or the second flexible resistor 562. For example, when the resistance of the flexible resistor 561 or 562 is greater than or equal to a threshold, the sensor may recognize it as a user input and transmit a corresponding key input signal to the processor (e.g., processor 120 in FIG. 1). In various embodiments, the sensing panel 570 may be referred to as a strain gauge.

In various embodiments, FIG. 5 may be associated with the first housing structure 210 of the electronic device 20 in FIG. 2, in which case the flexible resistor (e.g., first flexible resistor 561, or second flexible resistor 562) may correspond to the first sensing element 310-n in FIG. 2. In various embodiments, FIG. 5 may be associated with the second housing structure 220 of the electronic device 20 in FIG. 2, in which case the flexible resistor (e.g., first flexible resistor 561, or second flexible resistor 562) may correspond to the second sensing element 320-m in FIG. 2. In various embodiments, the sensing element such as a flexible resistor (e.g., first flexible resistor 561, or second flexible resistor 562) may be referred to as a "channel" or "sensor channel" through which the sensor receives a change in physical properties associated with a user input.

In one embodiment, when the external force is released, the base plate 550 and the plural flexible resistors 561 and 562 attached thereto may return to the substantially flat shape due to the elasticity of the side member 530.

In various embodiments, the base plate 550 may include a flexible member disposed between the first plate 551 and the second plate 552 and between the second plate 552 and the third plate 553. The flexible member may connect the first plate 551 and the second plate 552, and connect the second plate 552 and the third plate 553. When the external force is released from the input region of the side member 530, the elasticity of the flexible member, together with the elasticity of the side member 530, may help the sensing panel 570 return to the substantially flat shape.

In various embodiments, the number or shape of plates included in the base plate, and the number or shape of flexible resistors may be varied without being limited to the embodiment of FIG. 5.

In one embodiment, the support member 540 may include openings 571 and 572 penetrating in the z-axis direction and extending in the y-axis direction near the side member 530. The openings 571 and 572 may be disposed near the sensing panel 570. When pressing the outer side surface 531 of the side member 530 with a finger, the force can be concentrated in the structure including the openings 571 and 572, which can facilitate displacement of the side member 530 in the negative x-axis direction. When the outer side surface 531 of the side member 530 is pressed with a finger, the structure including the openings 571 and 572 may enable securing of a force acting on the sensing panel 570. When the outer side surface 531 of the side member 530 is pressed with a finger, the structure including the openings 571 and 572 may increase the sensitivity to displacement of the side member 530 or to displacement of the sensing panel 570. In a certain embodiment, the openings 571 and 572 may be omitted.

In various embodiments, instead of the sensing panel 570 and a sensor electrically connected thereto, various other sensor circuits may be implemented. For example, a sensor circuit can be implemented to use a varying magnetic force when a finger touches the input region. For another example, a sensor circuit may be implemented by using various sensors such as a touch sensor, an optical sensor, or an ultrasonic sensor. In various embodiments, when an optical sensor is utilized, the side member 530 may be formed to include an opening or transparent region through which light can pass.

Figure 6:
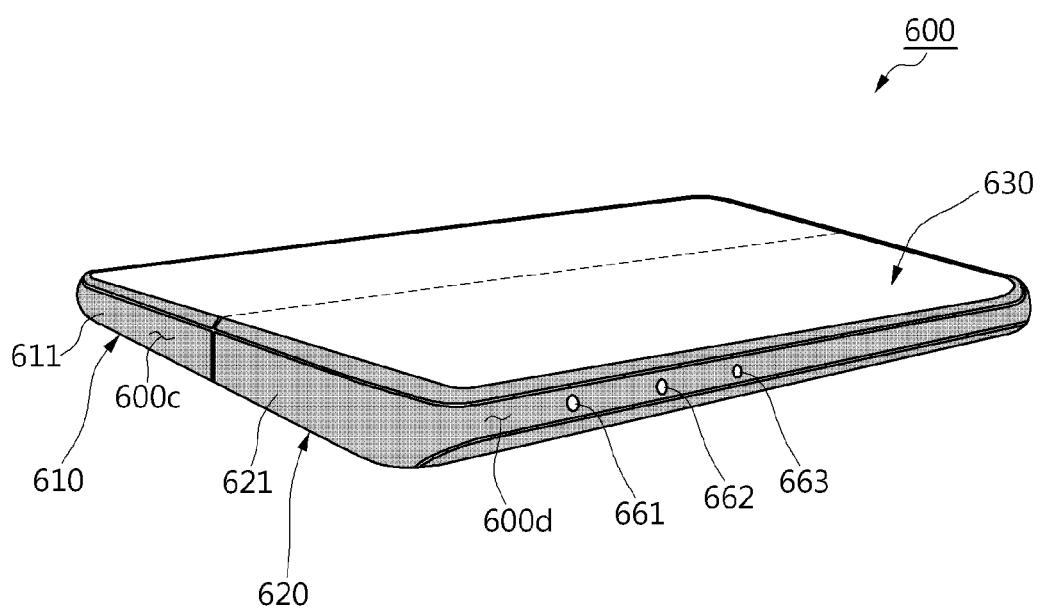
FIG. 6 is a perspective view of an electronic device in the unfolded state according to an embodiment.

FIG. 6 is a perspective view of an electronic device in the unfolded state according to an embodiment.

With reference to FIG. 6, in one embodiment, the electronic device 600 may include a first housing structure 610, a second housing structure 620, and a display 630. At least some of the components of the electronic device 600 may be substantially identical to at least some of the components of the electronic device 20 in FIG. 2. For example, the first housing structure 610 may be identical to the first housing structure 210 in FIG. 2. For example, the second housing structure 620 may be identical to the second housing structure 220 in FIG. 2. For example, the display 630 may be identical to the display 300 in FIG. 2.

In one embodiment, the first housing structure 610 may include a first side member 611 (e.g., first side member 211 in FIG. 2) constituting a first side surface 600c (e.g., first side surface 200c in FIG. 2). The second housing structure 620 may include a second side member 621 (e.g., second side member 221 in FIG. 2) constituting a second side surface 600d (e.g., second side surface 200d in FIG. 2).

In one embodiment, key indicators 661, 662 and 663 corresponding to the sensor channels (or, sensing elements) such as the flexible resistors 561 and 562 in FIG. 5 may be arranged on the second side surface 600d. The key indicators are implemented to have various visual symbols, such as marks, colors, or surface textures, so that an input region (or, key region) for user input can be identified on the second side surface 600d. For example, the key indicators are implemented as an embossed portion or recessed portion on the second side surface 600d, and an input region (or, key region) for user input can be identified on the second side surface 600d through the surface texture of the embossed portion or recessed portion. In various embodiments, the key indicators may be implemented by coupling a material different from the second side member 621 to an opening or groove formed in the second side member 621.

In one embodiment, a sensor channel and a key indicator (or, input region on the side surface) corresponding to the sensor channel may be collectively referred to as a "key". For example, when a key function for increasing the volume when outputting a sound is assigned to the first sensor channel, the first sensor channel and the first key indicator 661 corresponding thereto may be collectively referred to as a volume-up key. For example, when a key function for decreasing the volume when outputting a sound is assigned to the second sensor channel, the second sensor channel and the second key indicator 662 corresponding thereto may be collectively referred to as a volume-down key. For example, when a key function for immediately carrying out a corresponding action is assigned to the third sensor channel, the third sensor channel and the third key indicator 663 corresponding thereto may be collectively referred to as a shortcut key. In various embodiments, the key is a feature that utilizes the side surface of the electronic device 600 (e.g., first side surface 600c and second side surface 600d) and may be referred to as a "side key" or an "edge key". In a certain embodiment, in the electronic device having an out-folding structure in which the screen is folded outwards, the key indicator may be displayed on the screen adjacent to the side surface. In various embodiments, the position or number of keys may be varied without being limited to the embodiment of FIG. 6. In one embodiment (not shown), at least one key including a sensor channel and a key indicator may be disposed on the first side member 611.

Figure 7:
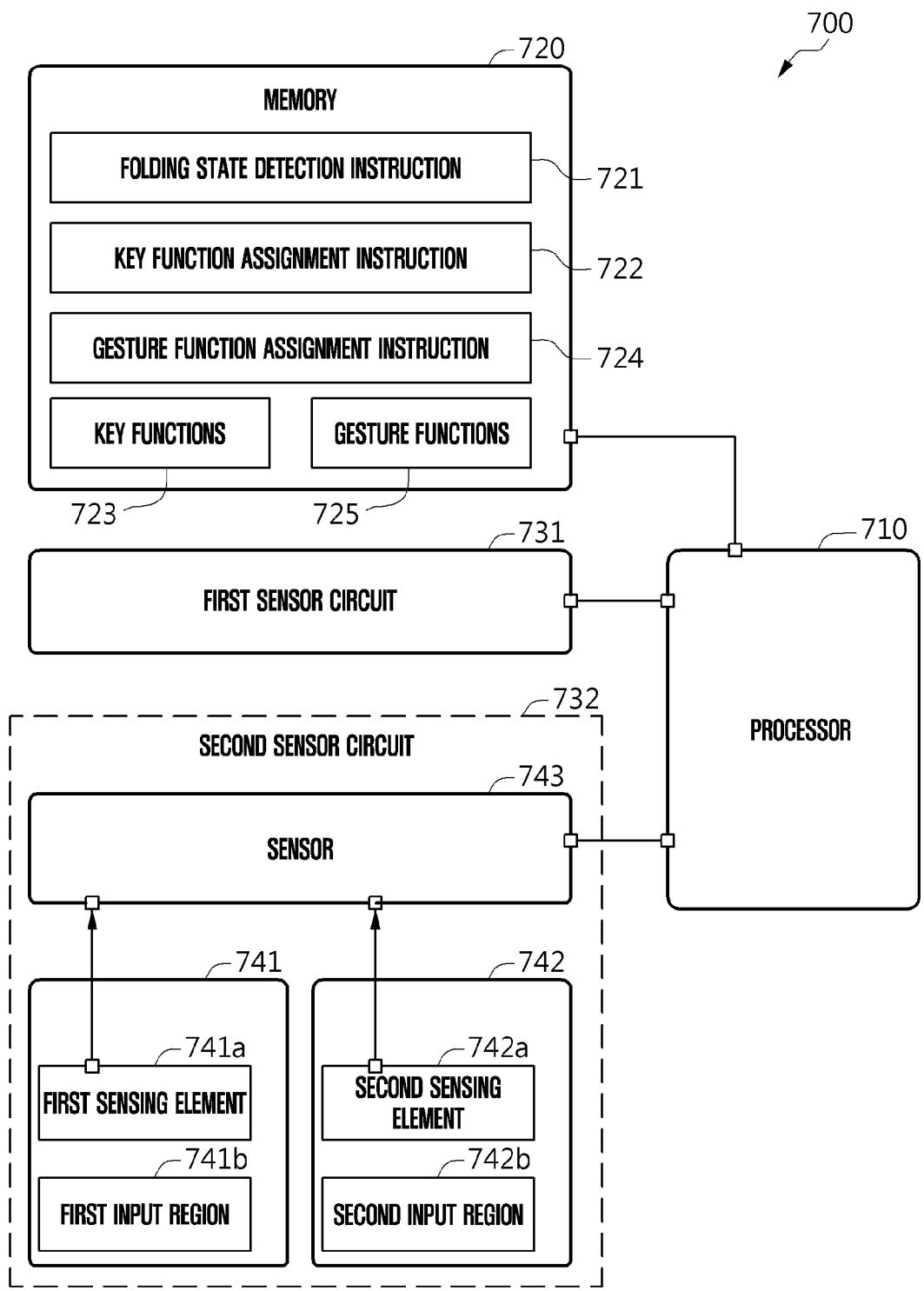
FIG. 7 is a block diagram of an electronic device according to an embodiment.

FIG. 7 is a block diagram of an electronic device according to an embodiment.

With reference to FIG. 7, in one embodiment, the electronic device 700 may include a processor 710, a memory 720, a first sensor circuit 731, or a second sensor circuit 732. The electronic device 700 may correspond to, for example, the electronic device 101 of FIG. 1, the electronic device 20 of FIG. 2, the electronic device 500 of FIG. 5, or the electronic device 600 of FIG. 6.

In one embodiment, the second sensor circuit 732 may include a first edge key 741, a second edge key 742, or a sensor 743.

In one embodiment, the first edge key 741 may include a first sensing element 741a disposed near the first side surface (e.g., first side surface 200c in FIG. 2) within the first housing structure (e.g., first housing structure 210 in FIG. 2). The first edge key 741 may include a first input region (or, first touch region) 741b positioned on the first side surface in correspondence with the first sensing element 741a. Although one first edge key 741 is presented in the block diagram of FIG. 7, a plurality of first edge keys having substantially the same structure as the first edge key 741 may be arranged on the first side member (e.g., first side member 211 in FIG. 2). The first edge key 741 in FIG. 7 may be one of the plural first edge keys. In various embodiments, a key indicator (in FIG. 6) for identifying the first edge key 741 in the first side surface may be disposed in the first input region 741b. The first sensing element 741a may cause a change in various physical properties when the first input region 741b is touched or pressed with a finger. For example, the first sensing element 741a may include a flexible resistor (in FIG. 5), and when the first input region 741b is pressed with a finger, the resistance of the flexible resistor may change. The first sensing element 741a may be electrically connected to the sensor 743. The sensor 743 may transmit a key input signal related to a user input to the processor 710 based on a change in physical properties detected by the first sensing element 741a.

In one embodiment, the second edge key 742 may include a second sensing element 742a disposed near the second side surface (e.g., second side surface 200d in FIG. 2) within the second housing structure (e.g., second housing structure 220 in FIG. 2). The second edge key 742 may include a second input region (or, second touch region) 742b positioned on the second side surface in correspondence with the second sensing element 742a. Although one second edge key 742 is presented in the block diagram of FIG. 7, a plurality of second edge keys having substantially the same structure as the first edge key 741 may be arranged on the second side member (e.g., second side member 221 in FIG. 2). The second edge key 742 in FIG. 7 may be one of the plural second edge keys. In various embodiments, a key indicator (in FIG. 6) for identifying the second edge key 742 in the second side surface may be disposed in the second input region 742b. The second sensing element 742a may cause a change in various physical properties when the second input region 742b is touched or pressed with a finger. For example, the second sensing element 742a may include a flexible resistor (in FIG. 5), and when the second input region 742b is pressed with a finger, the resistance of the flexible resistor may change. The second sensing element 742a may be electrically connected to the sensor 743. The sensor 743 may transmit a key input signal related to a user input to the processor 710 based on a change in physical properties detected by the second sensing element 742a.

In one embodiment, the sensor 743 may be disposed on a printed circuit board included in the first housing structure (e.g., first housing structure 210 in FIG. 2) or the second housing structure (e.g., second housing structure 220 in FIG. 2). In various embodiments, the sensor 743 may be referred to as a sensor integrated circuit (IC).

In one embodiment, in the folded state of the electronic device 700, when viewed toward the side surface (e.g., side surface 200e in FIG. 3), the first edge key 741 and the second edge key 742 may be aligned with each other. For example, in the folded state of the electronic device 700, the first sensing element 741a and the second sensing element 742a may be aligned with each other. In the folded state of the electronic device 700, the first input region 741b and the second input region 742b may be aligned with each other.

In various embodiments, in the folded state of the electronic device 700, when viewed toward the side surface (e.g., side surface 200e in FIG. 3), the first edge key 741 and the second edge key 742 may be not aligned with each other.

In one embodiment, the memory 720 (e.g., memory 130 in FIG. 1) may store instructions (e.g., program 140 in FIG. 1) that enable the processor 710 (e.g., processor 120 in FIG.

1) to control the first edge key 741 or the second edge key 742 of the second sensor circuit 732.

In one embodiment, the memory 720 may store a folding state detection instruction 721, a key function assignment instruction 722, or key functions 723.

In one embodiment, the folding state detection instruction 721 may include a routine for the processor 710 to use the first sensor circuit 731 to identify whether the electronic device 700 is in the unfolded state (FIG. 2) or in the folded state (FIG. 3).

In one embodiment, the first sensor circuit 731 may include a proximity sensor. The proximity sensor may be disposed, for example, in the component placement region 214 of the first housing structure 210 in FIG. 2. When the electronic device 700 is in the folded state (FIG. 3), the proximity sensor disposed in the first housing structure (e.g., first housing structure 210 in FIG. 2) may transmit an electrical signal indicating proximity of the second housing structure (e.g., second housing structure 220 in FIG. 2) to the processor 710.

In another embodiment, the first sensor circuit 731 may include a Hall integrated circuit (IC). For example, the first housing structure (e.g., first housing structure 210 in FIG. 2) may include a Hall IC, and the second housing structure (e.g., second housing structure 220 in FIG. 2) may include a magnet. When the electronic device 700 is in the folded state (FIG. 3), the Hall IC disposed in the first housing structure and the magnet disposed in the second housing structure may be aligned, and the Hall IC may recognize the magnet and transmit a corresponding electrical signal to the processor 710.

In another embodiment, the first sensor circuit 731 may include an image sensor. The image sensor may be included in, for example, the front camera disposed in the component placement region 214 of the first housing structure 210 in FIG. 2. When the electronic device 700 is in the folded state (FIG. 3), the image sensor disposed on the first housing structure (e.g., first housing structure 210 in FIG. 2) may obtain image data of the second housing structure (e.g., second housing structure 220 in FIG. 2) and the processor 710 may determine the folding state of the electronic device 700 based on the image data.

In various embodiments, the folding state (e.g., folded state or unfolded state) of the electronic device 700 may be detected by using various other sensors.

In a certain embodiment, the first housing structure (e.g., first housing structure 210 in FIG. 2) may include a first contact, and the second housing structure (e.g., second housing structure 220 in FIG. 2) may include a second contact. When the electronic device 700 is in the folded state (FIG. 3), the first contact disposed in the first housing structure and the second contact disposed in the second housing structure may physically contact to conduct electricity, and the processor 710 may identify the folded state based on the electrical conduction.

In one embodiment, the key function assignment instruction 722 may include a routine for the processor 710 to assign a key function to the first edge key 741 or the second edge key 742 based on the unfolded or folded state of the electronic device 700. The processor 710 may assign at least one key function, among various key functions 723 stored in the memory 720 (e.g., programs 140 related to key functions), to the first edge key 741 or the second edge key 742 based on the unfolded or folded state of the electronic device 700. The key functions may be various functions based on a key input signal generated through the first edge key 741 or the second edge key 742. For example, the key functions may be various operations related to various devices or components electrically connected to the processor 710 (e.g., input unit 150, sound output unit 155, display unit 160, audio module 170, sensor module 176, interface 177, haptic module 179, camera module 180, power management module 188, battery 189, communication module 190, subscriber identification module 196, or antenna module 197 in FIG. 1).

For example, in the folded state of the electronic device 700, the first edge key 741 and the second edge key 742 may be aligned with each other when viewed toward the side surface (e.g., third side surface 200e in FIG. 3). In one embodiment, when the electronic device 700 is in the folded state, the processor 710 may assign the same key function to the first edge key 741 and the second edge key 742 according to the key function assignment instruction 722. When the same key function is assigned to the first edge key 741 and the second edge key 742 aligned with each other in the folded state of the electronic device 20, an extended input region for the key function may be formed due to the alignment of the first input region 741b and the second input region 742b. In one embodiment, when the electronic device 700 is in the unfolded state, the processor 710 may assign the above key function to at least one of the first edge key 741 or the second edge key 742 according to the key function assignment instruction 722. For example, in the unfolded state of the electronic device 700, the key function may be assigned to one of the first edge key 741 and the second edge key 742.

In various embodiments, when the electronic device 700 is in the unfolded state, the processor 710 may assign a first key function to the first edge key 741 and assign a second key function different from the first key function to the second edge key 742 according to the key function assignment instruction 722. When viewed toward the side surface (e.g., third side surface 200e in FIG. 3) in the folded state of the electronic device 700, the first edge key 741 and the second edge key 742 may be aligned with each other. In the folded state of the electronic device 700, the processor 710 may assign both the first key function and the second key function to the first edge key 741 and the second edge key 742 according to the key function assignment instruction 722.

For another example, when viewed toward the side surface (e.g., side surface 200e in FIG. 3) in the folded state of the electronic device 700, the first edge key 741 and the second edge key 742 may be not aligned with each other. In one embodiment, in the folded or unfolded state of the electronic device 700, the processor 710 may assign a first key function to the first edge key 741 and assign a second key function different from the first key function to the second edge key 742 according to the key function assignment instruction 722.

In one embodiment, after a key function is assigned to the first edge key 741 or the second edge key 742 based on the key function assignment instruction 722, the processor 710 may execute the key function when receiving a key input signal related to a user input from the second sensor circuit 732.

For example, if the physical property value (e.g., resistance value) obtained from the sensing element associated with the edge key to which a key function is assigned is greater than or equal to a threshold, the sensor 743 may transmit a key input signal related to a user input to the processor 710. Upon receiving the key input signal from the sensor 743, the processor 710 may execute the key function.

For example, when viewed toward the side surface (e.g., third side surface 200e in FIG. 3) in the folded state of the electronic device 700, the first edge key 741 and the second edge key 742 may be aligned with each other and may be assigned the same key function. If at least one of physical property values obtained from the first sensing element 741a and the second sensing element 742a is greater than or equal to a threshold, the sensor 743 may transmit a key input signal related to a user input to the processor 710. In a certain embodiment, if both the physical property value obtained from the first sensing element 741a and the physical property value obtained from the second sensing element 742a are greater than or equal to a threshold, the sensor 743 may transmit a key input signal related to a user input to the processor 710.

In one embodiment, even if the physical property value obtained from an edge key to which a key function is not assigned is greater than or equal to a threshold, the sensor 743 may transmit a key input signal to the processor 710. The processor 710 may recognize the key input signal generated based on an edge key to which no key function is assigned as an invalid signal, and may not respond to the key input signal (nonresponsive). In various embodiments, the processor 710 may control the sensor 743 not to respond to a physical property value obtained from an edge key to which no key function is assigned according to the key function assignment instruction 722.

In various embodiments, the electronic device 700 in the folded state may be in the form of a bar-type smartphone, and the folded state of the electronic device 700 may be referred to as "bar-type mode" of the electronic device 700. The electronic device 700 in the unfolded state may be in the form of a tablet, and the unfolded state of the electronic device 700 may be referred to as "tablet mode" of the electronic device 700.

In various embodiments, the processor 710 may be configured to serve as the sensor 743, and the sensor 743 of the second sensor circuit 732 may be omitted.

In various embodiments, the memory 720 may store a gesture function assignment instruction 724 or gesture functions 725. The gesture function assignment instruction 724 may include a routine for the processor 710 to assign a gesture function to the first edge key 741 or the second edge key 742 based on the unfolded or folded state of the electronic device 700. The processor 710 may assign at least one gesture function among various gesture functions 725 stored in the memory 720 (e.g., programs 140 related to gesture functions) to the first edge key 741 or the second edge key 742 based on the unfolded or folded state of the electronic device 700. In one embodiment, in the unfolded or folded state of the electronic device 700, a gesture function may be assigned to at least one first edge key 741 or at least one second edge key 742 to which no key function is assigned according to the gesture function assignment instruction 724. The gesture functions may be various functions based on gesture input signals generated through the first edge key 741 or the second edge key 742. For example, the gesture functions may be various operations related to various devices or components electrically connected to the processor 710 (e.g., input unit 150, sound output unit 155, display unit 160, audio module 170, sensor module 176, interface 177, haptic module 179, camera module 180, power management module 188, battery 189, communication module 190, subscriber identification module 196, or antenna module 197 in FIG. 1).

In one embodiment, the gesture input signal may be related to finger movements (for example, finger movement patterns). For example, a swipe gesture input signal may be generated through a swipe gesture.

For example, with reference to FIG. 2, the swipe gesture may be finger movements in the unfolded state of the electronic device 20 involving touching a specific section of the first side surface 200c, moving in the positive y-axis direction or negative y-axis direction, and releasing. The swipe gesture enables key input signals to be sequentially generated through the first edge keys arranged on the first side surface 200c, and these key input signals may be recognized as a swipe gesture input signal.

For example, with reference to FIG. 2, the swipe gesture may be finger movements in the unfolded state of the electronic device 20 involving touching a specific section of the second side surface 200d, moving in the positive y-axis direction or negative y-axis direction, and releasing. The swipe gesture enables key input signals to be sequentially generated through the second edge keys arranged on the second side surface 200d, and these key input signals may be recognized as a swipe gesture input signal.

For example, with reference to FIG. 3, the swipe gesture may be finger movements in the folded state of the electronic device 20 involving touching a specific section of the third side surface 200e, moving in the positive y-axis direction or negative y-axis direction, and releasing. The swipe gesture enables key input signals to be sequentially generated through the first edge keys or the second edge keys arranged on the third side surface 200e, and these key input signals may be recognized as a swipe gesture input signal.

In various embodiments, the gesture input signal may be related to a state in which the electronic device 700 is held by a hand. For example, a squeeze gesture input signal may be generated through a squeeze gesture.

For example, with reference to FIG. 2, the squeeze gesture may be generated when the electronic device 20 in the unfolded state is carried or gripped by a hand and a section of the first side surface 200c is pressed by a portion of the hand (e.g., palm or finger). The squeeze gesture enables key input signals to be sequentially generated through the first edge keys arranged on the first side surface 200c, and these key input signals may be recognized as a squeeze gesture input signal.

For example, with reference to FIG. 2, the squeeze gesture may be generated when the electronic device 20 in the unfolded state is carried by a hand and a section of the second side surface 200d is pressed by a portion of the hand (e.g., palm or finger). The squeeze gesture enables key input signals to be sequentially generated through the second edge keys arranged on the second side surface 200d, and these key input signals may be recognized as a squeeze gesture input signal.

For example, with reference to FIG. 3, the squeeze gesture may be generated when the electronic device 20 in the folded state is carried by a hand and a section of the third side surface 200e is pressed by a portion of the hand (e.g., palm or finger). The squeeze gesture enables key input signals to be sequentially generated through the first edge keys or the second edge keys arranged on the third side surface 200e, and these key input signals may be recognized as a squeeze gesture input signal.

In various embodiments, the squeeze gesture may be referred to as a "grip gesture".

In various embodiments, the processor 710 may be configured to store the folding state detection instruction 721, the key function assignment instruction 722, or the gesture function assignment instruction 724. In various embodiments, the processor 710 may be configured to include a first control zone for executing the folding state detection instruction 721, a second control zone for executing the key function assignment instruction 722, or a third control zone for executing the gesture function assignment instruction 724.

Figure 8:
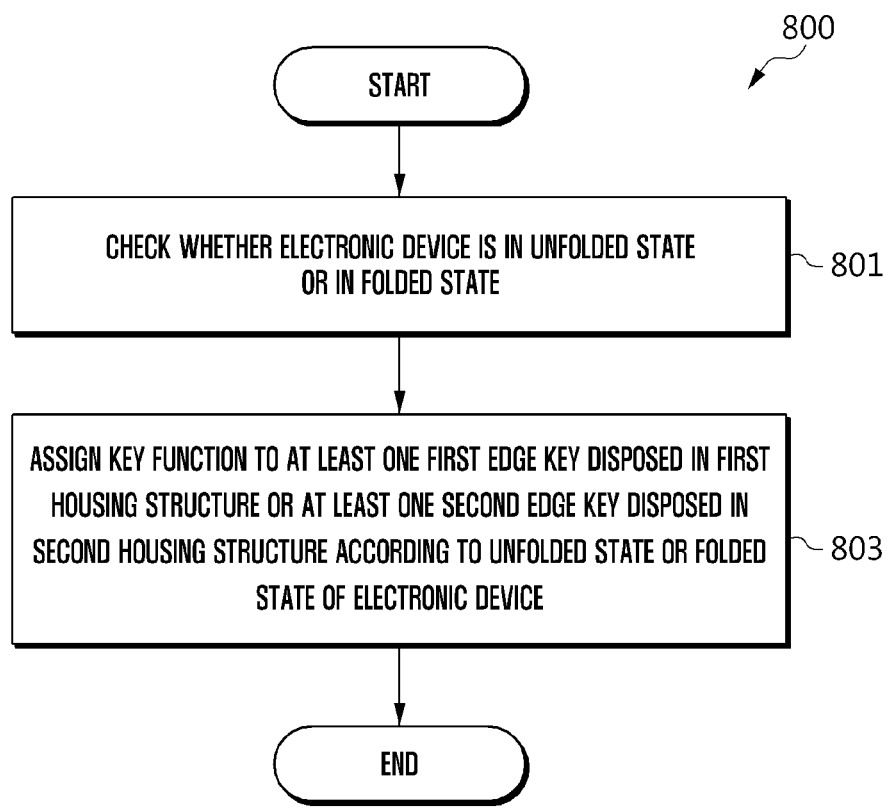
FIG. 8 illustrates an operation flow of an electronic device according to an embodiment.

FIG. 8 illustrates an operation flow 800 of an electronic device according to an embodiment.

With reference to FIGS. 7 and 8, in one embodiment, at operation 801, the processor 710 may check whether the electronic device 700 is in the unfolded state (FIG. 2) or in the folded state (FIG. 3) by use of the first sensor circuit 731.

In one embodiment, at operation 803, the processor 710 may assign a key function to at least one first edge key 741 disposed in the first housing structure or at least one second edge key 742 disposed in the second housing structure according to the unfolded state or folded state of the electronic device 700.

The operation flow of FIG. 8 will be described with reference to the embodiment of FIGS. 9A and 9B, the embodiment of FIGS. 10A and 10B, the embodiment of FIGS. 11A and 11B, or the embodiment of FIGS. 12A and 12B.

Figure 9B:
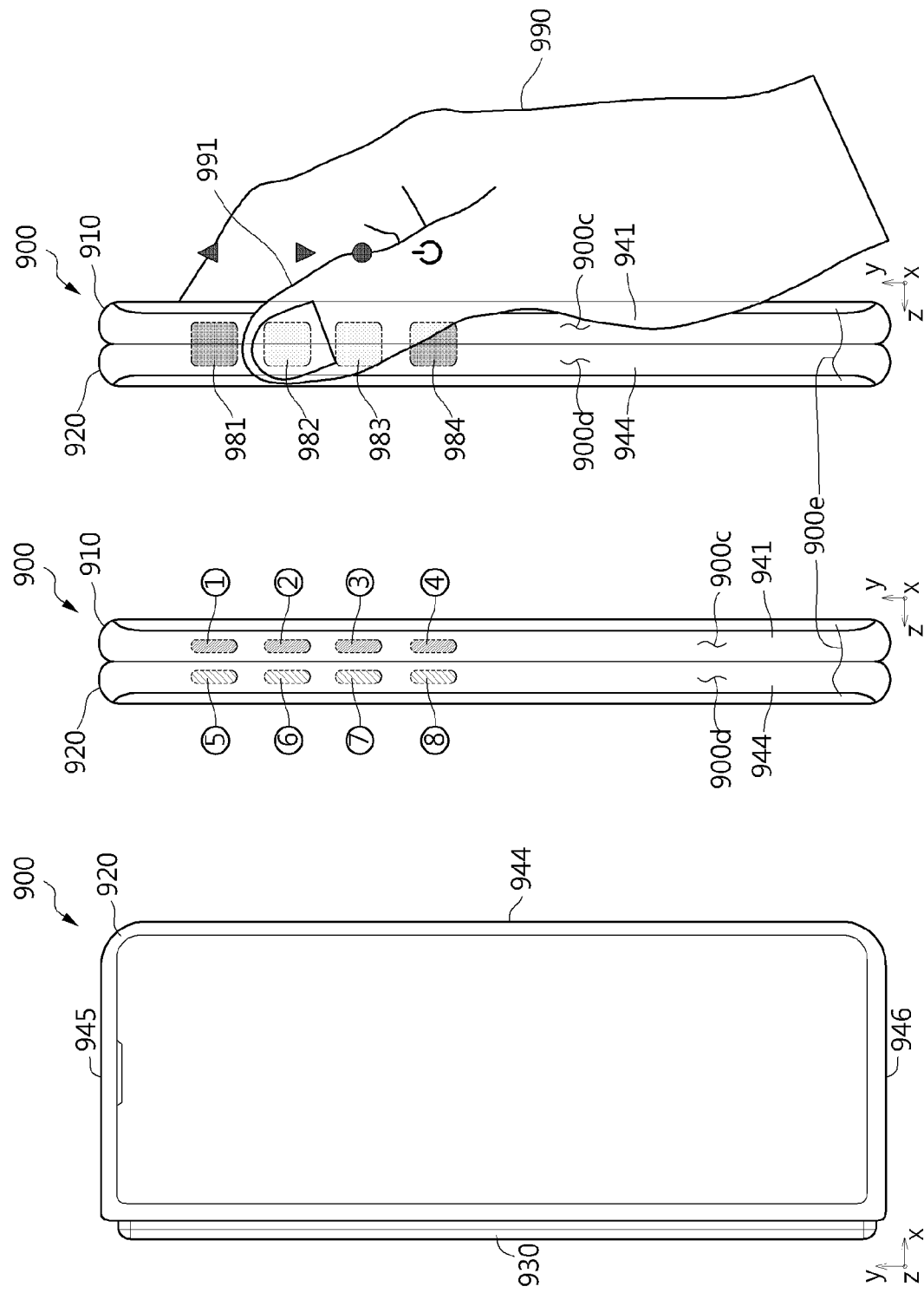
FIG. 9B illustrates the electronic device of FIG. 9A in the folded state according to an embodiment.

FIG. 9A illustrates an electronic device 900 in the unfolded state according to an embodiment. FIG. 9B illustrates the electronic device 900 of FIG. 9A in the folded state according to an embodiment.

With reference to FIGS. 9A and 9B, the electronic device 900 (e.g., electronic device 20 in FIG. 2 or electronic device 700 in FIG. 7) may include a first housing structure 910 (e.g., first housing structure 210 in FIG. 2) including a first side member 911, a second housing structure 920 (e.g., second housing structure 220 in FIG. 2) including a second side member 921, and a hinge structure 930 (e.g., hinge structure 401 in FIG. 4) connecting the first housing structure 910 and the second housing structure 920. The electronic device 900 may include a display (e.g., display 300 in FIG. 2) extending from the first housing structure 910 to the second housing structure 920. The first side member 911 (e.g., first side member 211 in FIG. 2) may include a first side portion 941, a second side portion 942, or a third side portion 943. The first side portion 941 may be extended to be parallel to and spaced apart from the folding axis A. The second side portion 942 may be extended perpendicular to the folding axis A so as to be connected to one end of the first side portion 941. The third side portion 943 may be extended perpendicular to the folding axis A so as to be connected to the other end of the first side portion 941. The second side member 921 (e.g., second side member 221 in FIG. 2) may include a fourth side portion 944, a fifth side portion 945, or a sixth side portion 946. The fourth side portion 944 may be extended to be parallel to and spaced apart from the folding axis A. The fifth side portion 945 may be extended perpendicular to the folding axis A so as to be connected to one end of the fourth side portion 944. The sixth side portion 946 may be extended perpendicular to the folding axis A so as to be connected to the other end of the fourth side portion 944.

With reference to FIG. 9B, in the folded state of the electronic device 900, the first side portion 941 and the fourth side portion 944 may be aligned with each other. Although not shown, in the folded state of the electronic device 900, the second side portion 942 and the fifth side portion 945 may be aligned with each other. Although not shown, in the folded state of the electronic device 900, the third side portion 943 and the sixth side portion 946 may be aligned with each other. The height of the third side surface 900e of the electronic device 900 in the folded state may be greater than that in the unfolded state due to the alignment of the first side surface 900c (e.g., first side surface 200c in FIG. 3) and the second side surface 900d (e.g., second side surface 200d in FIG. 3).

In one embodiment, the electronic device 900 may include a plurality of first edge keys 901, 902, 903 and 904 arranged in the first housing structure 910. The plural first edge keys 901, 902, 903 and 904 may be disposed along the first side portion 941 in parallel with and spaced apart from the folding axis A. The first edge key 901 may include a first sensing channel Ch1 disposed on the first side portion 941 close to the first side surface 900c, and an input region ① located on the first side 900c in correspondence with the first sensing channel Ch1. The first edge key 902 may include a first sensing channel Ch2 disposed on the first side portion 941 close to the first side surface 900c, and an input region ② located on the first side 900c in correspondence with the first sensing channel Ch2. The first edge key 903 may include a first sensing channel Ch3 disposed on the first side portion 941 close to the first side surface 900c, and an input region ③ located on the first side 900c in correspondence with the first sensing channel Ch3. The first edge key 904 may include a first sensing channel Ch4 disposed on the first side portion 941 close to the first side surface 900c, and an input region ④ located on the first side 900c in correspondence with the first sensing channel Ch4. The first sensing channel Ch1, Ch2, Ch3 or Ch4 may correspond to the first sensing element 741a in FIG. 7, and may include, for example, the flexible resistor 561 or 562 in FIG. 5. The input region ①, ②, ③ or ④ may correspond to the first input region 741b in FIG. 7.

In one embodiment, the electronic device 900 may include a plurality of second edge keys 905, 906, 907 and 908 arranged in the second housing structure 920. The plurality of second edge keys 905, 906, 907 and 908 may be disposed along the fourth side portion 944 in parallel with and spaced apart from the folding axis A. The second edge key 905 may include a second sensing channel Ch5 disposed on the fourth side portion 944 close to the second side surface 900d, and an input region ⑤ located on the second side surface 900d in correspondence with the second sensing channel Ch5. The second edge key 906 may include a second sensing channel Ch6 disposed on the fourth side portion 944 close to the second side surface 900d, and an input region ⑥ located on the second side surface 900d in correspondence with the second sensing channel Ch6. The second edge key 907 may include a second sensing channel Ch7 disposed on the fourth side portion 944 close to the second side surface 900d, and an input region ⑦ located on the second side surface 900d in correspondence with the second sensing channel Ch7. The second edge key 908 may include a second sensing channel Ch8 disposed on the fourth side portion 944 close to the second side surface 900d, and an input region ⑧ located on the second side surface 900d in correspondence with the second sensing channel Ch8. The second sensing channel Ch6, Ch6, Ch7 or Ch8 may correspond to the second sensing element 742a in FIG. 7, and may include, for example, the flexible resistor 561 or 562 in FIG. 5. The input region ⑤, ⑥, ⑦ or ⑧ may correspond to the second input region 742b in FIG. 7.

In one embodiment, in the unfolded state of the electronic device 900, the plural first edge keys 901, 902, 903 and 904 and the plural second edge keys 905, 906, 907 and 908 may be arranged to be symmetrical with respect to the folding axis A. In various embodiments, the number or position of the first edge keys or the second edge keys may be varied without being limited to the embodiment of FIGS. 9A and 9B.

With reference to FIG. 9B, in one embodiment, when the electronic device 900 is in the folded state, the input region ① and the input region ⑤ may be aligned with each other when viewed toward the third side surface 900e. In the folded state of the electronic device 900, the input region ② and the input region ⑥ may be aligned with each other when viewed toward the third side surface 900e. In the folded state of the electronic device 900, the input region ③ and the input region ⑦ may be aligned with each other when viewed toward the third side surface 900e. In the folded state of the electronic device 900, the input region ④ and the input region ⑧ may be aligned with each other when viewed toward the third side surface 900e.

In one embodiment, at operation 803 in FIG. 8, the processor (e.g., processor 710 in FIG. 7) may assign the same key function to a pair of a first edge key and a second edge key aligned with each other in the folded state of the electronic device 900, and may assign the above key function to at least one of the pair of a first edge key and a second edge key in the unfolded state of the electronic device 900.

For example, in the unfolded state of the electronic device 900, the processor (e.g., processor 710 in FIG. 7) may assign a first key function to the first edge key 901 including the input region ①. For example, the first key function may be a function of increasing the volume of the output sound. In the unfolded state of the electronic device 900, the processor may assign a second key function to the first edge key 902 including the input region ②. For example, the second key function may be a function of lowering the volume of the output sound. In the unfolded state of the electronic device 900, the processor may assign a third key function to the first edge key 903 including the input region ③. For example, the third key function may be an artificial intelligence (AI) virtual assistant function. The AI virtual assistant function can recognize a user's voice command in the context to search for information or run an application. The AI virtual assistant function may recognize an object, an image, a text, or a QR code by using a camera and provide corresponding information. In the unfolded state of the electronic device 900, the processor may not assign a key function to the first edge key 904 including the input region ④. In the unfolded state of the electronic device 900, the processor may not assign a key function to the second edge key 905 including the input region ⑤, the second edge key 906 including the input region ⑥, and the second edge key 907 including the input region ⑦. In the unfolded state of the electronic device 900, the processor may assign a fourth key function to the second edge key 908 including the input region ⑧. For example, the fourth key function may be a function of turning on or off the power of the electronic device 900. A key indicator 971 indicating the first key function may be disposed in the input region ①. A key indicator 972 indicating the second key function may be disposed in the input region ②. A key indicator 973 indicating the third key function may be disposed in the input region ③. A key indicator 974 indicating the fourth key function may be disposed in the input region ⑧.

In one embodiment, in the unfolded state of the electronic device 900, when the user touches or presses a corresponding input region with a finger, the physical property value (e.g., resistance value) obtained from the sensing channel Ch1, Ch2, Ch3 or Ch8 of the edge key to which a key function is assigned may vary. For example, if the physical property value obtained from the sensing channel Ch1, Ch2, Ch3 or Ch8 of the edge key to which a key function is assigned is greater than or equal to, a key input signal related to the user input may be transmitted to the processor (e.g., processor 710 in FIG. 7), so that the processor can execute the key function.

In one embodiment, in the unfolded state of the electronic device 900, when the user touches or presses a corresponding input region with a finger, the physical property value (e.g., resistance value) obtained from the sensing channel Ch4, Ch5, Ch6 or Ch7 of the edge key to which no key function is assigned may change. For example, if the physical property value obtained from the sensing channel Ch4, Ch5, Ch6 or Ch7 of the edge key to which no key function is assigned is greater than or equal to a threshold, although a key input signal for the user input may be transmitted to the processor (e.g., processor 710 in FIG. 7), the processor may recognize the key input signal as an invalid signal and may not respond to the key input signal.

In one embodiment, in the folded state of the electronic device 900, the processor (e.g., processor 710 in FIG. 7) may assign a first key function (e.g., increasing the volume of the output sound) to the first edge key 901 including the input region ① and the second edge key 905 aligned with the first edge key 901 and including the input region ⑤. In the folded state of the electronic device 900, a first input region 981 for the first key function may be formed on the third side surface 900e due to the alignment of the input regions ① and ⑤. In the folded state of the electronic device 900, the physical property value (e.g., resistance value) obtained from the first sensing channel Ch1 or the second sensing channel Ch5 may change due to a touch or pressure on the first input region 981. For example, if the physical property value obtained from the first sensing channel Ch1 or the second sensing channel Ch5 is greater than or equal to a threshold, a key input signal related to the user input may be transmitted to the processor, and the processor may execute the first key function. In a certain embodiment, in the folded state of the electronic device 900, if the physical property values obtained from the first sensing channel Ch1 and the second sensing channel Ch5 are both greater than or equal to a threshold, a key input signal related to the user input may be transmitted to the processor, and the processor may execute the first key function.

In one embodiment, in the folded state of the electronic device 900, the processor (e.g., processor 710 in FIG. 7) may assign a second key function (e.g., decreasing the volume of the output sound) to the first edge key 902 including the input region ② and the second edge key 906 aligned with the first edge key 902 and including the input region ⑥. In the folded state of the electronic device 900, a second input region 982 for the second key function may be formed on the third side surface 900e due to the alignment of the input regions ② and ⑥. In the folded state of the electronic device 900, the physical property value (e.g., resistance value) obtained from the first sensing channel Ch2 or the second sensing channel Ch6 may change due to a touch or pressure on the second input region 982. For example, if the physical property value obtained from the first sensing channel Ch2 or the second sensing channel Ch6 is greater than or equal to a threshold, a key input signal related to the user input may be transmitted to the processor, and the processor may execute the second key function. In a certain embodiment, in the folded state of the electronic device 900, if the physical property values obtained from the first sensing channel Ch2 and the second sensing channel Ch6 are both greater than or equal to a threshold, a key input signal related to the user input may be transmitted to the processor, and the processor may execute the second key function.

In one embodiment, in the folded state of the electronic device 900, the processor may assign a third key function (e.g., artificial intelligence virtual assistant) to the first edge key 903 including the input region ③ and the second edge key 907 aligned with the first edge key 903 and including the input region ⑦. In the folded state of the electronic device 900, a third input region 983 for the third key function may be formed on the third side surface 900e due to the alignment of the input regions ③ and ⑦. In the folded state of the electronic device 900, the physical property value (e.g., resistance value) obtained from the first sensing channel Ch3 or the second sensing channel Ch7 may change due to a touch or pressure on the third input region 983. For example, if the physical property value obtained from the first sensing channel Ch3 or the second sensing channel Ch7 is greater than or equal to a threshold, a key input signal related to the user input may be transmitted to the processor, and the processor may execute the third key function. In a certain embodiment, in the folded state of the electronic device 900, if the physical property values obtained from the first sensing channel Ch3 and the second sensing channel Ch7 are both greater than or equal to a threshold, a key input signal related to the user input may be transmitted to the processor, and the processor may execute the third key function.

In one embodiment, in the folded state of the electronic device 900, the processor may assign a fourth key function (e.g., turning on or off the power of the electronic device 900) to the first edge key 904 including the input region ④ and the second edge key 908 aligned with the first edge key 904 and including the input region ⑧. In the folded state of the electronic device 900, a fourth input region 984 for the fourth key function may be formed on the third side surface 900e due to the alignment of the input regions ④ and ⑧. In the folded state of the electronic device 900, the physical property value (e.g., resistance value) obtained from the first sensing channel Ch4 or the second sensing channel Ch8 may change due to a touch or pressure on the fourth input region 984. For example, if the physical property value obtained from the first sensing channel Ch4 or the second sensing channel Ch8 is greater than or equal to a threshold, a key input signal related to the user input may be transmitted to the processor, and the processor may execute the fourth key function. In a certain embodiment, in the folded state of the electronic device 900, if the physical property values obtained from the first sensing channel Ch4 and the second sensing channel Ch8 are both greater than or equal to a threshold, a key input signal related to the user input may be transmitted to the processor, and the processor may execute the fourth key function.

In one embodiment, in the folded state of the electronic device 900, the first input region 981 for the first key function, the second input region 982 for the second key function, the third input region 983 for the third key function, or the fourth input region 984 for the fourth key function may form an extended touch reception range that is not biased to one side on the third side surface 900e having a height greater than that of the electronic device 900 in the unfolded state. Consequently, as shown in FIG. 9B, when the user attempts to enter a key with the thumb 991 while holding the electronic device 900 in the folded state with one hand 990, the possibility that a touch deviating from the extended touch reception range occurs may be low, which may facilitate key input. Even when the user attempts to enter a key with a finger of one hand while holding the electronic device 900 in the folded state with the other hand, the extended touch reception range may facilitate key input.

For example, if the second edge key 906 including the input region ⑥ is not present, as the touch reception range for the second key function in the folded state of the electronic device 900 is limited to the input region ② biased to one side (e.g., first side surface 900c), there is a high possibility that a touch deviating from the input region ② on the third side surface 900e having a height greater than that of the electronic device 900 in the unfolded state occurs. Due to this, frequent attempts by the user to re-enter the key may make it difficult to secure satisfaction with the key input. Further, the electronic device 900 in the folded state may be in a form similar to a bar-type smartphone. When the user attempts to enter a key with the thumb 991 while holding the electronic device 900 in the folded state with one hand 990, the user may have a tendency to utilize the previous experience of holding a bar-type electronic device with one hand and pressing a button placed on its side with a thumb. In the folded state of the electronic device 900, the extended touch reception range (e.g., first input region 981, second input region 982, third input region 983, or fourth input region 984) for a key function is widely distributed so as not to be biased to one side on the third side surface 900e having a height greater than that of the electronic device 900 in the unfolded state. Hence, key input can also be smoothly performed for key input based on the previous user experience.

In various embodiments, the first side surface 900c and the second side surface 900d may be implemented to be smoothly connected in the folded state of the electronic device 900, which may provide a user experience such as performing key input through a button disposed on the side of a bar-type electronic device.

In various embodiments, in the unfolded state of the electronic device 900, the processor (e.g., processor 710 in FIG. 7) may assign a first key function (e.g., increasing the volume of the sound output) to the first edge key 901 including the input region ① and the second edge key 905 including the input region ⑤. In various embodiments, in the unfolded state of the electronic device 900, the processor (e.g., processor 710 in FIG. 7) may assign a second key function (e.g., decreasing the volume of the sound output) to the first edge key 902 including the input region ② and the second edge key 906 including the input region ⑥. In various embodiments, in the unfolded state of the electronic device 900, the processor (e.g., processor 710 in FIG. 7) may assign a third key function (e.g., artificial intelligence virtual assistant) to the first edge key 903 including the input region ③ and the second edge key 907 including the input region ⑦. In various embodiments, in the unfolded state of the electronic device 900, the processor (e.g., processor 710 in FIG. 7) may assign a fourth key function (e.g., turning on or off the power of the electronic device 900) to the first edge key 904 including the input region ④ and the second edge key 908 including the input region ⑧. In various embodiments, the first edge key 904 and the second edge key 908 associated with the fourth key function (e.g., turning on or off the power of the electronic device 900) may be omitted. In various embodiments, a key button 909 associated with the fourth key function may be disposed on the second side portion 942.

In various embodiments, when the electronic device 900 is switched from the unfolded state to the folded state or from the folded state to the unfolded state, the processor may switch a corresponding edge key or a sensor circuit related to the edge key from an inactive (or, off) state to an active (or, on) state, or from an active state to an inactive state.

Figure 10A:
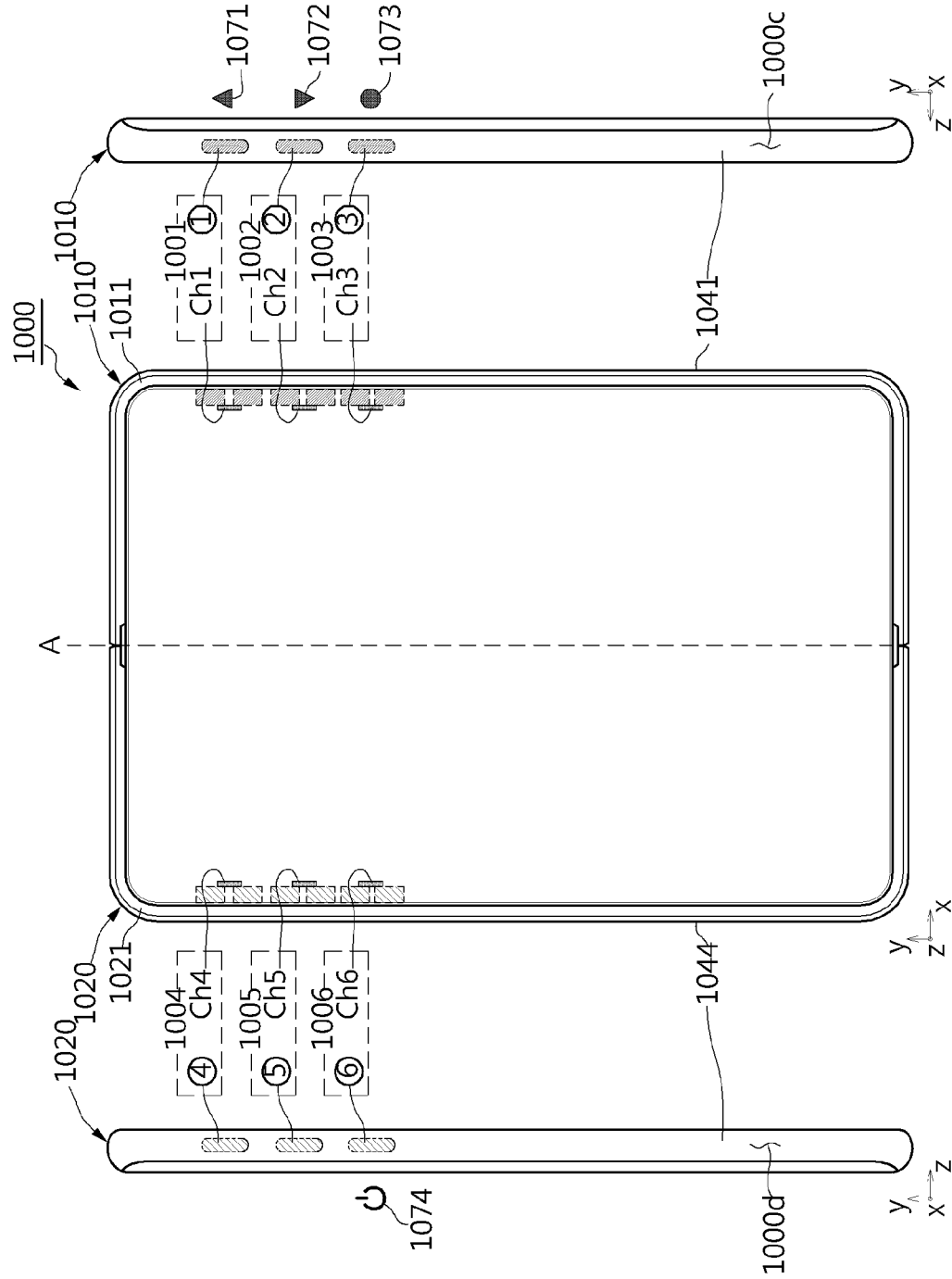
FIG. 10A illustrates an electronic device in the unfolded state according to various embodiments.

FIG. 10A illustrates an electronic device 1000 in the unfolded state according to various embodiments. FIG. 10B illustrates the electronic device 1000 of FIG. 10A in the folded state according to various embodiments.

With reference to FIGS. 10A and 10B, the electronic device 1000 (e.g., electronic device 20 in FIG. 2, or electronic device 700 in FIG. 7) may include a first housing structure 1010 (e.g., first housing structure 910 in FIG. 9A) including a first side member 1011 (e.g., first side member 911 in FIG. 9A), a second housing structure 1020 (e.g., second housing structure 920 in FIG. 9A) including a second side member 1021 (e.g., second side member 921 in FIG. 9A), and a hinge structure 1030 (e.g., hinge structure 930 in FIG. 9A) connecting the first housing structure 1010 and the second housing structure 1020. The electronic device 1000 may include a display (e.g., display 300 in FIG. 2) extending from the first housing structure 1010 to the second housing structure 1020.

With reference to FIG. 10B, in the folded state of the electronic device 1000, the first side member 1011 and the second side member 1021 may be aligned with each other. In the folded state of the electronic device 1000, the first side surface 1000c (e.g., first side surface 900c in FIG. 9B) and the second side surface 1000d (e.g., second side surface 900d in FIG. 9B) are aligned with each other, forming a third side surface 1000e (e.g., third side surface 900e in FIG. 9B) having a height greater than that of the electronic device 1000 in the unfolded state.

In one embodiment, the electronic device 1000 may include a plurality of first edge keys 1001, 1002 and 1003 disposed in the first housing structure 1010. The plural first edge keys 1001, 1002 and 1003 may be disposed along the first side portion 1041 in parallel with and spaced apart from the folding axis A. The plural first edge keys 1001, 1002 and 1003 may be implemented in substantially the same manner as the first edge keys 901, 902, 903 and 904 in FIG. 9A by use of plural first sensing channels Ch1, Ch2 and Ch3 and plural input regions ①, ② and ③.

In one embodiment, the electronic device 1000 may include a plurality of second edge keys 1004, 1005 and 1006 disposed in the second housing structure 1020. The plural second edge keys 1004, 1005 and 1006 may be disposed along the fourth side portion 1044 in parallel with and spaced apart from the folding axis A. The plural second edge keys 1004, 1005 and 1006 may be implemented in substantially the same manner as the second edge keys 905, 906, 907 and 908 in FIG. 9A by use of plural second sensing channels Ch4, Ch5 and Ch6 and plural input regions ④, ⑤ and ⑥.

In one embodiment, in the unfolded state of the electronic device 1000, the plural first edge keys 1001, 1002 and 1003 and the plural second edge keys 1004, 1005 and 1006 may be symmetrically arranged with respect to the folding axis A. In various embodiments, the number or location of the first edge keys or the second edge keys may be varied without being limited to the embodiment of FIGS. 10A and 10B.

With reference to FIG. 10B, in one embodiment, when viewed toward the third side surface 1000e in the folded state of the electronic device 1000, the input region ① and the input region ④ may be aligned with each other. When viewed toward the third side surface 1000e in the folded state of the electronic device 1000, the input region ② and the input region ⑤ may be aligned with each other. When viewed toward the third side surface 1000e in the folded state of the electronic device 1000, the input region ③ and the input region ⑥ may be aligned with each other.

In one embodiment, in the unfolded state of the electronic device 1000, the processor (e.g., processor 710 in FIG. 7) may assign a first key function (e.g., increasing the volume of the output sound) to the first edge key 1001 including the input region ①. In the unfolded state of the electronic device 1000, the processor may assign a second key function (e.g., decreasing the volume of the output sound) to the first edge key 1002 including the input region ②. In the unfolded state of the electronic device 1000, the processor may not assign a key function to the second edge key 1004 including the input region ④ and the second edge key 1005 including the input region ⑤. A key indicator 1071 indicating the first key function may be disposed in the input region ①. A key indicator 1072 indicating the second key function may be disposed in the input region ②. In one embodiment, in the folded state of the electronic device 1000, the processor may assign the first key function to the first edge key 1001 including the input region ① and the second edge key 1004 aligned with the first edge key 1001 and including the input region ④. In the folded state of the electronic device 1000, the processor may assign the second key function to the first edge key 1002 including the input region ② and the second edge key 1005 aligned with the first edge key 1002 and including the input region ⑤. When a key input signal related to a user input is generated from an edge key to which a key function is assigned in the unfolded state or folded state of the electronic device 1000, the processor may execute the assigned function.

In one embodiment, at operation 803 in FIG. 8, the processor (e.g., processor 710 in FIG. 7) may assign different key functions to a pair of a first edge key and a second edge key that are aligned with each other in the unfolded state of the electronic device 1000, and may assign all the key functions to the first edge key and the second edge key in the unfolded state of the electronic device 1000.

For example, in the unfolded state of the electronic device 1000, the processor (e.g., processor 710 in FIG. 7) may assign a third key function (e.g., artificial intelligence virtual assistant) to the first edge key 1003 including the input region ③. In the unfolded state of the electronic device 1000, the processor may assign a fourth key function (e.g., turning on or off the power of the electronic device 1000) to the second edge key 1006 including the input region ⑥. A key indicator 1073 indicating the third key function may be disposed in the input region ③. A key indicator 1074 indicating the fourth key function may be disposed in the input region ⑥. In the folded state of the electronic device 1000, the processor may assign both the third key function and the fourth key function to the first edge key 1003 including the input region ③ and the second edge key 1006 aligned with the first edge key 1003 and including the input region ⑥. In one embodiment, when the physical property value (e.g., resistance value) obtained from the first sensing channel Ch3 or the second sensing channel Ch6 according to a user input is greater than or equal to a threshold value and is maintained shorter than or equal to a threshold time, a key input signal for the third key function may be transmitted to the processor and the processor may execute the third key function. For example, when the physical property value (e.g., resistance value) obtained from the first sensing channel Ch3 or the second sensing channel Ch6 according to a user input is greater than or equal to the threshold value and is maintained longer than the threshold time, a key input signal for the fourth key function may be transmitted to the processor and the processor may execute the fourth key function.

In one embodiment, in the folded state of the electronic device 1000, the first input region 1081 for the first key function, the second input region 1082 for the second key function, and the third input region 1083 for the third key function and the fourth key function may form an extended touch reception range that is not biased to one side on the third side surface 1000e having a height greater than that of the electronic device 1000 in the unfolded state. For this reason, as described with reference to FIG. 9B, key input can be smoothly performed.

Figure 11A:
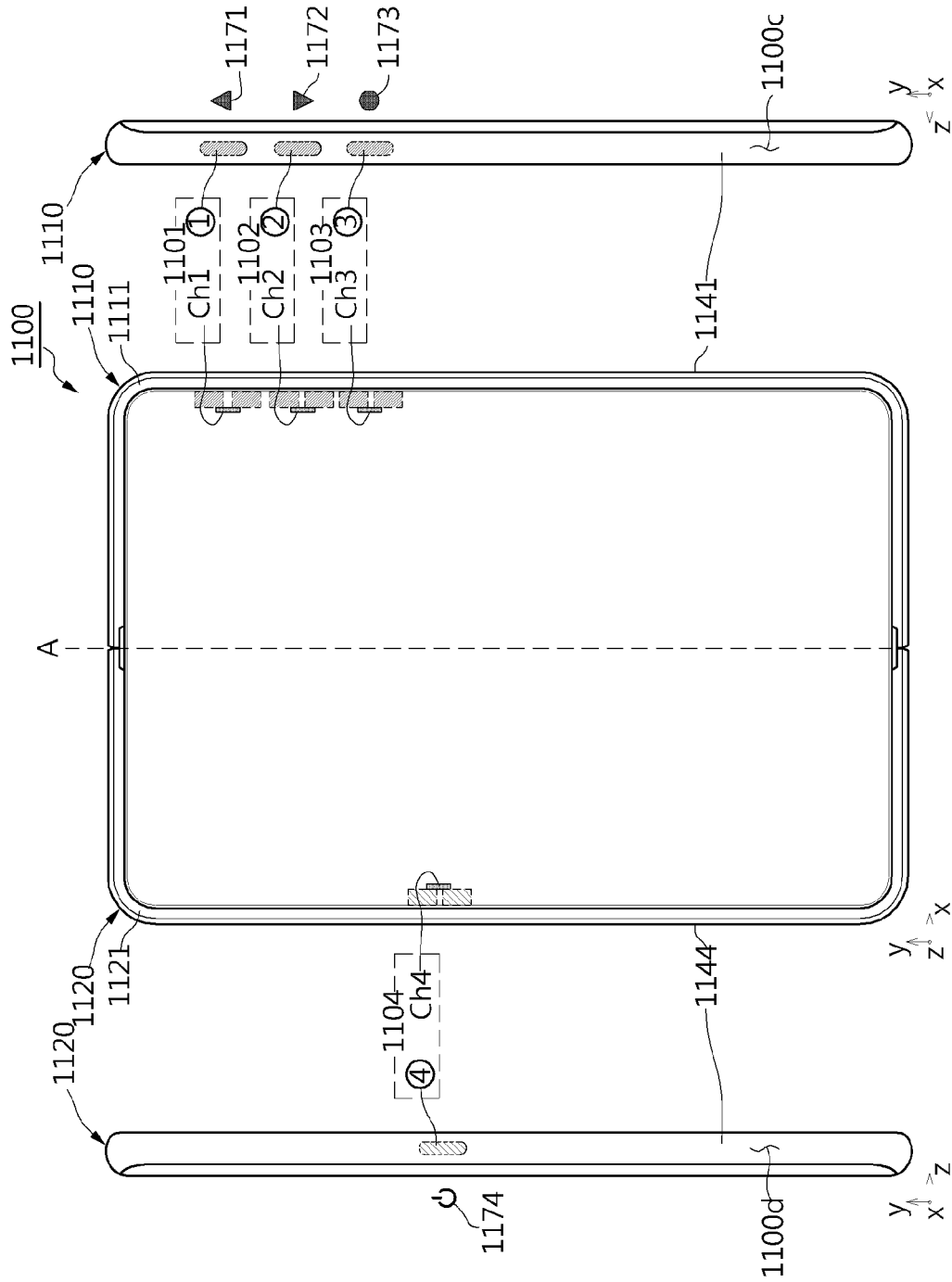
FIG. 11A illustrates an electronic device in the unfolded state according to various embodiments.

FIG. 11A illustrates an electronic device 1100 in the unfolded state according to various embodiments. FIG. 11B illustrates the electronic device 1100 of FIG. 11A in the folded state according to various embodiments.

Figure 11B:
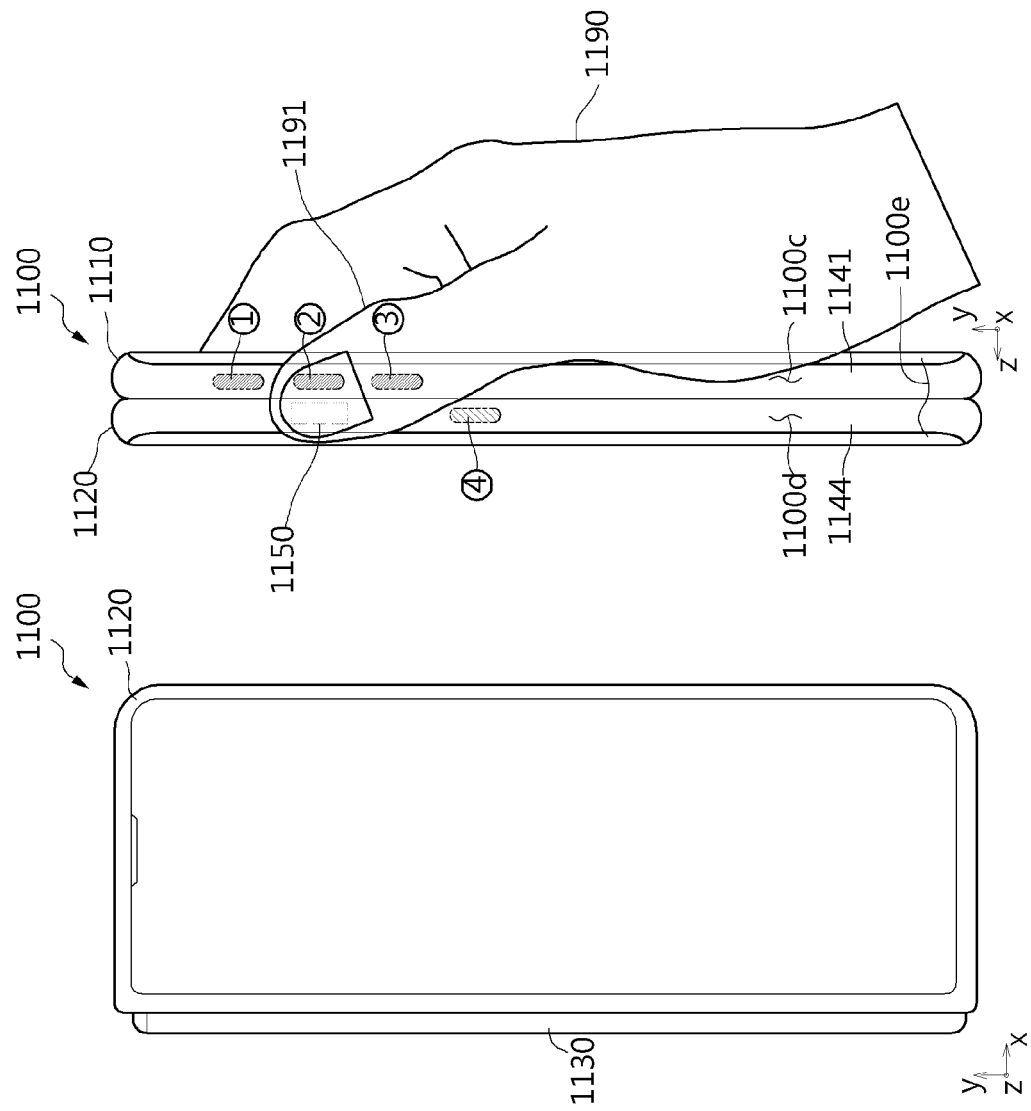
FIG. 11B illustrates the electronic device of FIG. 11A in the folded state according to various embodiments.

With reference to FIGS. 11A and 11B, the electronic device 1100 (e.g., electronic device 20 in FIG. 2, or electronic device 700 in FIG. 7) may include a first housing structure 1110 (e.g., first housing structure 910 in FIG. 9A) including a first side member 1111 (e.g., first side member 911 in FIG. 9A), a second housing structure 1120 (e.g., second housing structure 920 in FIG. 9A) including a second side member 1121 (e.g., second side member 921 in FIG. 9A), and a hinge structure 1130 (e.g., hinge structure 930 in FIG. 9A) connecting the first housing structure 1110 and the second housing structure 1120. The electronic device 1100 may include a display (e.g., display 300 in FIG. 2) extending from the first housing structure 1110 to the second housing structure 1120.

With reference to FIG. 11B, in the folded state of the electronic device 1100, the first side member 1111 and the second side member 1121 may be aligned with each other. In the folded state of the electronic device 1100, the first side surface 1100c (e.g., first side surface 900c in FIG. 9B) and the second side surface 1100d (e.g., second side surface 900d in FIG. 9B) are aligned with each other, forming a third side surface 1100e (e.g., third side surface 900e in FIG. 9B) having a height greater than that of the electronic device 1100 in the unfolded state.

In one embodiment, the electronic device 1100 may include a plurality of first edge keys 1101, 1102 and 1103 disposed in the first housing structure 1110. The plural first edge keys 1101, 1102 and 1103 may be disposed along the first side portion 1141 in parallel with and spaced apart from the folding axis A. The plural first edge keys 1101, 1102 and 1103 may be implemented in substantially the same manner as the first edge keys 901, 902, 903 and 904 in FIG. 9A by use of plural first sensing channels Ch1, Ch2 and Ch3 and plural input regions ①, ② and ③.

In one embodiment, the electronic device 1100 may include a second edge key 1104 disposed along a fourth side portion 1144 in the second housing structure 1120. The second edge key 1104 may be implemented in substantially the same manner as the second edge key 905, 906, 907 or 908 in FIG. 9A by use of the second sensing channel Ch4 and the input region ④.

With reference to FIG. 11B, in one embodiment, in the folded state of the electronic device 1100, when viewed toward the third side surface 1100e, the input region ④ of the second edge key 1104 may be not aligned with the input regions ①, ② and ③ of the first edge keys 1101, 1102 and 1103. In various embodiments, the number or location of the first and second edge keys may be varied without being limited to the embodiment of FIGS. 11A and 11B.

In one embodiment, at operation 803 in FIG. 8, the processor (e.g., processor 710 in FIG. 7) may assign different key functions to the first and second edge keys that are not aligned with each other in the unfolded or folded state of the electronic device 1100.

For example, in the unfolded or folded state of the electronic device 1100, the processor (e.g., processor 710 in FIG. 7) may assign a first key function (e.g., increasing the volume of the output sound) to the first edge key 1101 including the input region ①. In the unfolded or folded state of the electronic device 1100, the processor may assign a second key function (e.g., decreasing the volume of the output sound) to the first edge key 1102 including the input region ②. In the unfolded or folded state of the electronic device 1100, the processor may assign a third key function (e.g., artificial intelligence virtual assistant) to the first edge key 1103 including the input region ③. In the unfolded or folded state of the electronic device 1100, the processor may assign a fourth key function (e.g., turning on or off the power of the electronic device 1100) to the second edge key 1104 including the input region ④. When a key input signal related to a user input is generated from the edge key to which a key function is assigned in the unfolded or folded state of the electronic device 1100, the processor may execute the assigned function. Key indicators 1171, 1172, 1173 and 1174 indicating the key functions may be disposed respectively in the input regions of the edge keys to which the key functions are assigned.

In various embodiments, when the user attempts to enter a key with the thumb while holding the electronic device 1100 in the folded state with one hand, the user may have a tendency to utilize the previous experience of holding an electronic device like a bar-type smartphone with one hand and pressing a button placed on its side with a thumb. For example, as the electronic device 1100 in the folded state has a shape similar to a bar-type electronic device, when the user attempts to enter a key, it is highly probable that both the first side surface 1100c and the second side surface 1100d are pressurized. For example, as shown in FIG. 11B, while the electronic device 1100 in the folded state is being held with one hand 1190, when the user presses the third side surface 1100e with the thumb 1191 to execute the second key function, it is possible that not only the input region ② but also a region 1150 of the second side surface 1100d aligned with the input region ② are pressed by the thumb 1191. Due to this, the physical property value (e.g., resistance value) obtained through the first sensing channel Ch2 may not reach the threshold value, and the key input signal may be not smoothly generated compared to when key input is performed through the input region ② in the unfolded state of the electronic device 1100. As a result, to generate a key input signal, the user may attempt to press the input region ② with a greater force than when entering a key through the input region ② in the unfolded state of the electronic device 1100, or may move the thumb 1191 toward the input region ② and attempt to press the input region ②. In one embodiment, to resolve this inconvenience of key input, the processor (e.g., processor 710 in FIG. 7) may control the sensor 743 in FIG. 7 to lower the threshold value, which is a reference for generating a key input signal based on the physical property value (e.g., resistance value) obtained through the first sensing channel Ch1, Ch2 or Ch3 or the second sensing channel Ch4, when the electronic device 1100 is folded.

Figure 12B:
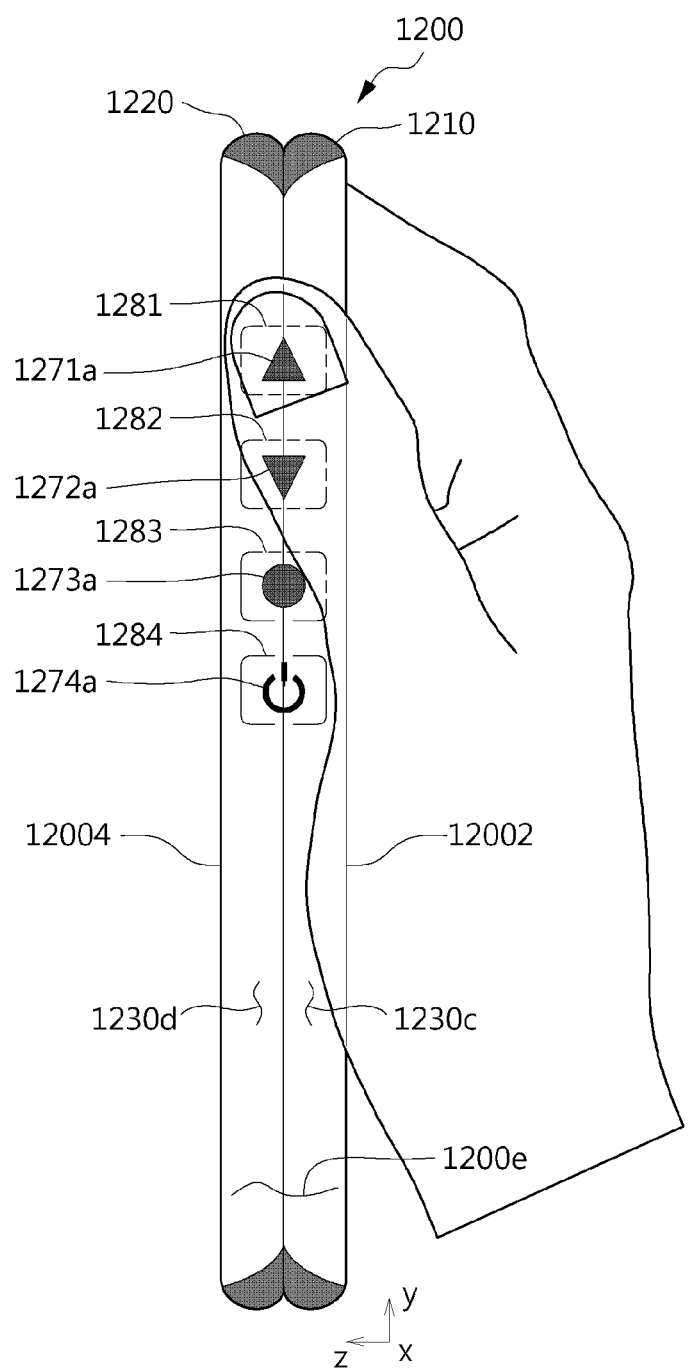
FIG. 12B illustrates the electronic device of FIG. 12A in the folded state according to various embodiments.

FIG. 12A illustrates an electronic device 1200 in the unfolded state according to various embodiments. FIG. 12B illustrates the electronic device 1200 of FIG. 12A in the folded state according to various embodiments.

With reference to FIG. 12A, in one embodiment, the electronic device 1200 (e.g., electronic device 20 in FIG. 2, or electronic device 700 in FIG. 7) may include a first housing structure 1210, a second housing structure 1220, or a hinge structure (not shown) connecting the first housing structure 1210 and the second housing structure 1220. The first housing structure 1210 may include a first surface 12001 (e.g., first surface 2001 in FIG. 2) facing in a first direction, a second surface 12002 (e.g., second surface 2002 in FIG. 2) facing in a second direction opposite to the first direction, and a first side surface 1200c surrounding at least a portion of the space between the first surface 12001 and the second surface 12002. The second housing structure 1220 may include a third surface 12003 (e.g., third surface 2003 in FIG. 2) facing in a third direction, a fourth surface 12004 (e.g., fourth surface 2004 in FIG. 2) facing in a fourth direction opposite to the third direction, and a second side surface 1200d surrounding at least a portion of the space between the third surface 12003 and the fourth surface 12004. In the folded state of the electronic device 1200, the first surface 12001 and the third surface 12003 may be arranged to face each other.

With reference to FIGS. 12A and 12B, in one embodiment, the display 1230 may include a first part (e.g., first part 301 in FIG. 2) extending from the first surface 12001 to the third surface 12003 to constitute the first surface 12001, a second part (e.g., second part 302 in FIG. 2) constituting the third surface 12003, and a folding part (e.g., folding part 303 in FIG. 2) between the first part and the second part. In one embodiment, the display 1230 may include a first display area 1230c extending from the first part to the first side surface 1200c. In one embodiment, the display 1230 may include a second display area 1230d extending from the second part to the second side surface 1200d. The first display area 1230c and the second display area 1230d may be extended in parallel with the folding axis A. In the folded state of the electronic device 1200, the first display area 1230c and the second display area 1230d may be aligned with each other to constitute at least a portion of the third side surface 1200e (e.g., third side surface 900e in FIG. 9B) of the electronic device 1200 in the folded state.

In one embodiment, in the folded state of the electronic device 1200, the first display area 1230c and the second display area 1230d may be implemented so as to be substantially free of a gap therebetween. For example, implementation is possible in a manner substantially free of a gap G1 between the first display area 1230c and the second surface 12002 when viewed toward the first side surface 1200c or a gap G2 between the second display area 1230d and the fourth surface 12004 when viewed toward the second side surface 1200d.

In various embodiments, the first display area 1230c and the second display area 1230d may be implemented to be smoothly connected in the folded state of the electronic device 1200.

In one embodiment, the electronic device 1200 may include a plurality of first edge keys 1201, 1202, 1203 and 1204 arranged in the first housing structure 1210. The plural first edge keys 1201, 1202, 1203 and 1204 may be disposed along the first display area 1230c in parallel with and spaced apart from the folding axis A. The first edge key 1201 may include an input region ① and a first sensing channel Ch1 corresponding thereto. The first edge key 1202 may include an input region ② and a first sensing channel Ch2 corresponding thereto. The first edge key 1203 may include an input region ③ and a first sensing channel Ch3 corresponding thereto. The first edge key 1204 may include an input region ④ and a first sensing channel Ch4 corresponding thereto. In one embodiment, the plural first sensing channels Ch1, Ch2, Ch3 and Ch4 may be disposed near the first display area 1230c inside the first housing structure 1210. The input regions ①, ②, ③ and ④ may be arranged in the first display area 1230c.

In one embodiment, the electronic device 1200 may include a plurality of second edge keys 1205, 1206, 1207 and 1208 disposed in the second housing structure 1220. The plural second edge keys 1205, 1206, 1207 and 1208 may be disposed along the second display area 1230d in parallel with and spaced apart from the folding axis A. The second edge key 1205 may include an input region ⑤ and a second sensing channel Ch5 corresponding thereto. The second edge key 1206 may include an input region ⑥ and a second sensing channel Ch6 corresponding thereto. The second edge key 1207 may include an input region ⑦ and a second sensing channel Ch7 corresponding thereto. The second edge key 1208 may include an input region ⑧ and a second sensing channel Ch8 corresponding thereto. The plural second sensing channels Ch5, Ch6, Ch7 and Ch8 may be disposed near the second display area 1230d inside the second housing structure 1220. The input regions ⑤, ⑥, ⑦ and ⑧ may be arranged in the second display area 1230d.

In one embodiment, the plural first sensing channels Ch1, Ch2, Ch3 and Ch4 or the plural second sensing channels Ch5, Ch6, Ch7 and Ch8 may be attached to the display 1230. In various embodiments, the plural first sensing channels Ch1, Ch2, Ch3 and Ch4 and/or the plural second sensing channels Ch5, Ch6, Ch7 and Ch8 may also be implemented as sensing elements included in the display 1230 for detecting the pressure. In various embodiments, the plural first sensing channels Ch1, Ch2, Ch3 and Ch4 or the plural second sensing channels Ch5, Ch6, Ch7 and Ch8 may correspond to the first sensing element 741a in FIG. 7, and may include, for example, the flexible resistor 561 or 562 in FIG. 5.

In one embodiment, in the unfolded state of the electronic device 1200, the plural first edge keys 1201, 1202, 1203 and 204 and the plural second edge keys 1205, 1206, 1207 and 1208 may be symmetrically disposed with respect to the folding axis A. In various embodiments, the number or location of the first edge keys or the second edge keys may be varied without being limited to the embodiment of FIGS. 12A and 12B.

In one embodiment, when viewed toward the third side surface 1200e in the folded state of the electronic device 1200, the input region ① and the input region ⑤ may be aligned with each other. When viewed toward the third side surface 1200e in the folded state of the electronic device 1200, the input region ② and the input region ⑥ may be aligned with each other. When viewed toward the third side surface 1200e in the folded state of the electronic device 1200, the input region ③ and the input region ⑦ may be aligned with each other. When viewed toward the third side surface 1200e in the folded state of the electronic device 1200, the input region ④ and the input region ⑧ may be aligned with each other.

In one embodiment, at operation 803 in FIG. 8, the processor (e.g., processor 710 in FIG. 7) may assign the same key function to a pair of a first edge key and a second edge key aligned with each other in the folded state of the electronic device 1200, and may assign the above key function to at least one of the first edge key or the second edge key in the unfolded state of the electronic device 1200.

For example, in the unfolded state of the electronic device 1200, the processor (e.g., processor 710 in FIG. 7) may assign a first key function (e.g., increasing the volume of the sound output) to the first edge key 1201 including the input region ①. In the unfolded state of the electronic device 1200, the processor may assign a second key function (e.g., decreasing the volume of the sound output) to the first edge key 1202 including the input region ②. In the unfolded state of the electronic device 1200, the processor may assign a third key function (e.g., artificial intelligence virtual assistant) to the first edge key 1203 including the input region ③. In the unfolded state of the electronic device 1200, the processor may assign a fourth key function (e.g., turning on or off the power of the electronic device 1200) to the second edge key 1208 including the input region ⑧. In the unfolded state of the electronic device 1200, the processor may not assign a key function to the first edge key 1204 including the input region ④, the second edge key 1205 including the input region ⑤, the second edge key 1206 including the input region ⑥, or the second edge key 1207 including the input region ⑦. The processor may display a key indicator 1271 indicating the first key function through the input region ①. The processor may display a key indicator 1272 indicating the second key function through the input region ②. The processor may display a key indicator 1273 indicating the third key function through the input region ③. The processor may display a key indicator 1274 indicating the fourth key function through the input region ⑧.

For example, in the folded state of the electronic device 1200, the processor (e.g., processor 710 in FIG. 7) may assign a first key function (e.g., increasing the volume of the output sound) to the first edge key 1201 including the input region ① and the second edge key 1205 aligned with the first edge key 1201 and including the input region ⑤. In the folded state of the electronic device 1200, a first input region 1281 for the first key function may be formed on the third side surface 1200e due to the alignment of the input regions ① and ⑤. The processor may assign a second key function (e.g., decreasing the volume of the output sound) to the first edge key 1202 including the input region ② and the second edge key 1206 aligned with the first edge key 1202 and including the input region ⑥. In the folded state of the electronic device 1200, a second input region 1282 for the second key function may be formed on the third side surface 1200e due to the alignment of the input regions ② and ⑥. The processor may assign a third key function (e.g., artificial intelligence virtual assistant) to the first edge key 1203 including the input region ③ and the second edge key 1207 aligned with the first edge key 1203 and including the input region ⑦. In the folded state of the electronic device 1200, a third input region 1283 for the third key function may be formed on the third side surface 1200e due to the alignment of the input regions ③ and ⑦. The processor may assign a fourth key function (e.g., turning on or off the power of the electronic device 1200) to the first edge key 1204 including the input region ④ and the second edge key 1208 aligned with the first edge key 1204 and including the input region ⑧. In the folded state of the electronic device 1200, a fourth input region 1284 for the fourth key function may be formed on the third side surface 1200e due to the alignment of the input regions ④ and ⑧. In one embodiment, in the folded state of the electronic device 1200, the processor may display a key indicator 1271a associated with the first key function through the first input region 1281, display a key indicator 1272a associated with the second key function through the second input region 1282, display a key indicator 1273a associated with the third key function through the third input region 1283, and display a key indicator 1274a associated with the fourth key function through the fourth input region 1284. In various embodiments, the key indicators 1271a, 1272a, 1273a and 1274a may be larger than those key indicators 1271, 1272, 1273 and 1274 displayed in the unfolded state of the electronic device 1200.

In one embodiment, when a key input signal related to a user input is generated from an edge key to which a key function is assigned in the unfolded or folded state of the electronic device 1200, the processor (e.g., processor 710 in FIG. 7) may execute the assigned function.

In one embodiment, in the folded state of the electronic device 1200, the first input region 1281 for the first key function, the second input region 1282 for the second key function, the third input region 1283 for the third key function, and the fourth input region 1284 for the fourth key function may form an extended touch reception range that is not biased to one side on the third side surface 1200e having a height greater than that of the electronic device 1200 in the unfolded state. For this reason, as described with reference to FIG. 9B, key input can be smoothly performed.

In various embodiments, the number or location of the first edge keys or the second edge keys may be varied without being limited to the embodiment of FIG. 12A, and the arrangement of edge keys or assignment of key functions may be applied according to the embodiment of FIG. 10A or 10B, the embodiment of FIG. 11A or 11B, or the embodiment of FIG. 12A or 12B.

Figure 13:
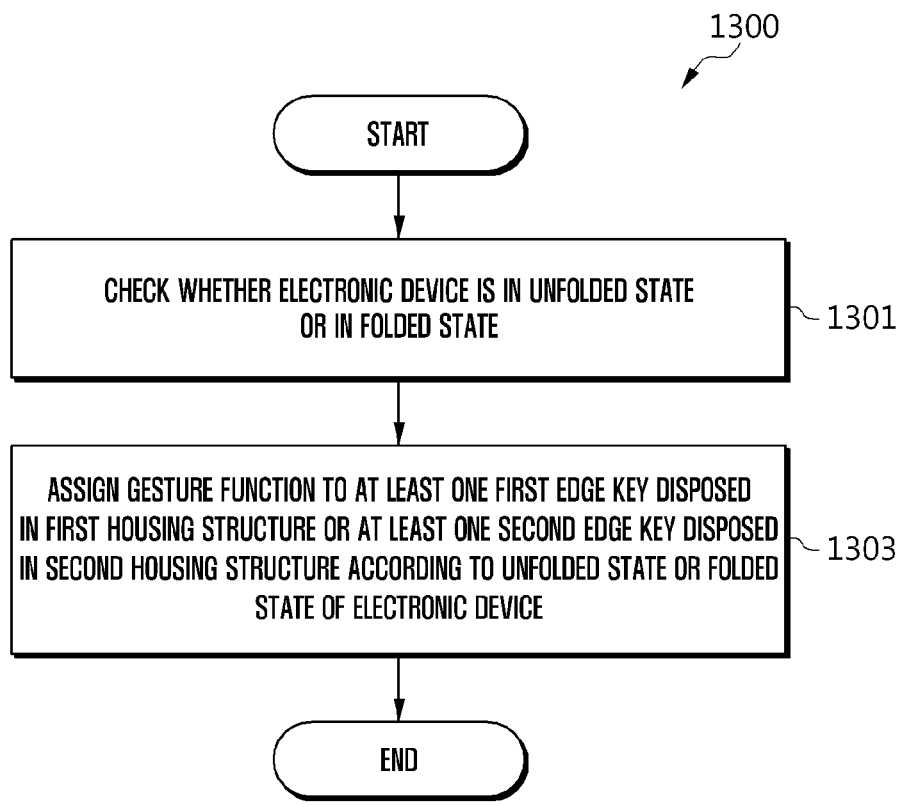
FIG. 13 illustrates an operation flow of an electronic device according to various embodiments.

FIG. 13 illustrates an operation flow 1300 of an electronic device according to various embodiments.

With reference to FIGS. 7 and 13, in one embodiment, at operation 1301, the processor (e.g., processor 710 in FIG. 7) may check whether the electronic device 700 is in the unfolded state (FIG. 2) or in the folded state (FIG. 3). For example, the processor may identify the unfolded state or the folded state of the electronic device 700 by using the first sensor circuit 731 of FIG. 7.

In one embodiment, at operation 1303, the processor 710 may assign a gesture function to at least one first edge key 741 disposed in the first housing structure or at least one second edge key 742 disposed in the second housing structure according to the unfolded state or folded state of the electronic device 700. In various embodiments, operation 1303 may be included in operation 803 of FIG. 8.

The operation flow of FIG. 13 will be described with reference to the embodiment of FIGS. 14A and 14B, the embodiment of FIGS. 15A and 15B, the embodiment of FIGS. 16A and 16B, or the embodiment of FIGS. 17A and 17B.

Figure 14B:
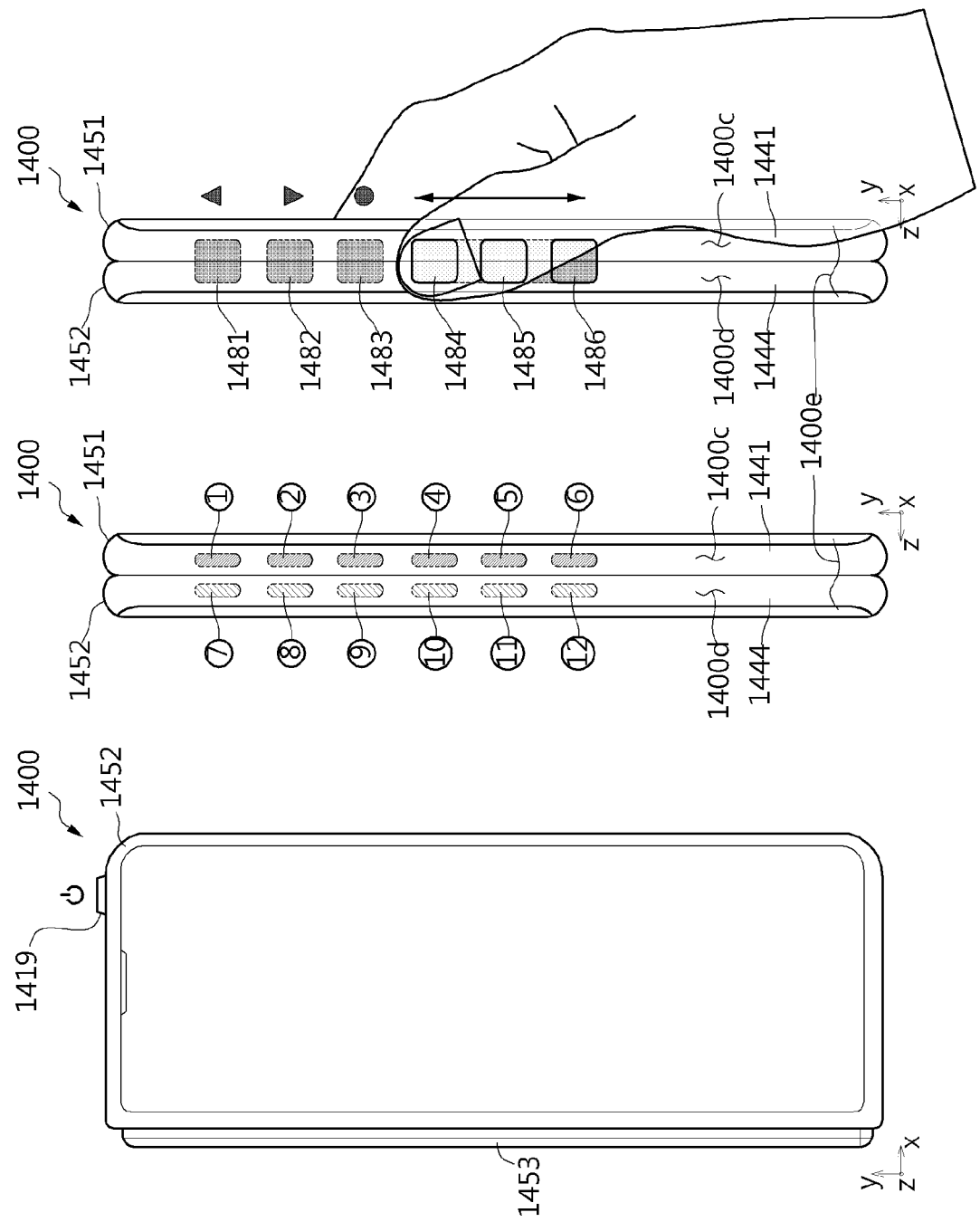
FIG. 14B illustrates the electronic device of FIG. 14A in the folded state according to an embodiment.

FIG. 14A illustrates an electronic device 1400 in the unfolded state according to various embodiments. FIG. 14B illustrates the electronic device 1400 of FIG. 14A in the folded state according to an embodiment.

With reference to FIGS. 14A and 14B, the electronic device 1400 (e.g., electronic device 20 in FIG. 2, or electronic device 700 in FIG. 7) may include a first housing structure 1451 (e.g., first housing structure 910 in FIG. 9A) including a first side member 1431 (e.g., first side member 911 in FIG. 9A), a second housing structure 1452 (e.g., second housing structure 920 in FIG. 9A) including a second side member 1432 (e.g., second side member 921 in FIG. 9A), and a hinge structure 1453 (e.g., hinge structure 930 in FIG. 9A) connecting the first housing structure 1451 and the second housing structure 1452. The electronic device 1400 may include a display (e.g., display 300 in FIG. 2) extending from the first housing structure 1451 to the second housing structure 1452.

With reference to FIG. 14B, in the folded state of the electronic device 1400, the first side member 1431 and the second side member 1432 may be aligned with each other. In the folded state of the electronic device 1400, the first side surface 1400c (e.g., first side surface 900c in FIG. 9B) and the second side surface 1400d (e.g., second side surface 900d in FIG. 9B) are aligned with each other, forming a third side surface 1400e (e.g., third side surface 900e in FIG. 9B) having a height greater than that of the electronic device 1400 in the unfolded state.

In one embodiment, the electronic device 1400 may include a plurality of first edge keys 1401, 1402, 1403, 1404, 1405 and 1406 disposed in the first housing structure 1451. The plural first edge keys 1401, 1402, 1403, 1404, 1405 and 1406 may be disposed along the first side portion 1441 (e.g., first side portion 941 in FIG. 9A) in parallel with and spaced apart from the folding axis A. The plural first edge keys 1401, 1402, 1403, 1404, 1405 and 1406 may be implemented in substantially the same manner as the first edge keys 901, 902, 903 and 904 in FIG. 9A by use of plural first sensing channels Ch1, Ch2, Ch3, Ch4, Ch5 and Ch6 and plural input regions ①, ②, ③, ④, ⑤ and ⑥.

In one embodiment, the electronic device 1400 may include a plurality of second edge keys 1407, 1408, 1409, 1410, 1411 and 1412 disposed in the second housing structure 1452. The plural second edge keys 1407, 1408, 1409, 1410, 1411 and 1412 may be disposed along the fourth side portion 1444 (e.g., fourth side portion 944 in FIG. 9A) in parallel with and spaced apart from the folding axis A. The plural second edge keys 1407, 1408, 1409, 1410, 1411 and 1412 may be implemented in substantially the same manner as the second edge keys 905, 906, 907 and 908 in FIG. 9A by use of plural second sensing channels Ch7, Ch8, Ch9, Ch10, Ch11 and Ch12 and plural input regions ⑦, ⑧, ⑨, ⑩, ⑪ and ⑫.

In one embodiment, in the unfolded state of the electronic device 1400, the plural first edge keys 1401, 1402, 1403, 1404, 1405 and 1406 and the plural second edge keys 1407, 1408, 1409, 1410, 1411 and 1412 may be symmetrically disposed with respect to the folding axis A. In various embodiments, the number or location of the first edge keys or the second edge keys may be varied without being limited to the embodiment of FIGS. 14A and 14B.

With reference to FIG. 14B, in one embodiment, when viewed toward the third side surface 1400e in the folded state of the electronic device 1400, the input region ① and the input region ⑦ may be aligned with each other. When viewed toward the third side surface 1400e in the folded state of the electronic device 1400, the input region ② and the input region ⑧ may be aligned with each other. When viewed toward the third side surface 1400e in the folded state of the electronic device 1400, the input region ③ and the input region ⑨ may be aligned with each other. When viewed toward the third side surface 1400e in the folded state of the electronic device 1400, the input region ④ and the input region ⑩ may be aligned with each other. When viewed toward the third side surface 1400e in the folded state of the electronic device 1400, the input region ⑤ and the input region ⑪ may be aligned with each other. When viewed toward the third side surface 1400e in the folded state of the electronic device 1400, the input region ⑥ and the input region ⑫ may be aligned with each other.

In one embodiment, in the unfolded state of the electronic device 1400, the processor (e.g., processor 710 in FIG. 7) may assign a first key function (e.g., increasing the volume of the sound output) to the first edge key 1401 including the input region ①. In the unfolded state of the electronic device 1400, the processor may assign a second key function (e.g., decreasing the volume of the sound output) to the first edge key 1402 including the input region ②. In the unfolded state of the electronic device 1400, the processor may assign a third key function (e.g., artificial intelligence virtual assistant) to the first edge key 1403 including the input region ②. Key indicators 1471, 1472 and 1473 indicating key functions may be disposed in the input regions of the edge keys to which key functions are assigned. In the unfolded state of the electronic device 1400, the processor may not assign a key function to the remaining edge keys 1404, 1405, 1406, 1407, 1408, 1409, 1410, 1411 and 1412. In one embodiment, in the folded state of the electronic device 1400, the processor may assign the first key function to the first edge key 1401 including the input region ① and the second edge key 1407 aligned with the first edge key 1401 and including the input region ⑦. In the folded state of the electronic device 1400, the processor may assign the second key function to the first edge key 1402 including the input region ② and the second edge key 1408 aligned with the first edge key 1402 and including the input region ⑧. In the folded state of the electronic device 1400, the processor may assign the third key function to the first edge key 1403 including the input region ③ and the second edge key 1409 aligned with the first edge key 1403 and including the input region ⑨. When a key input signal related to a user input is generated from an edge key to which a key function is assigned in the unfolded or folded state of the electronic device 1400, the processor may execute the assigned function.

In various embodiments, a key button 1419 associated with the fourth key function (e.g., turning on or off the power of the electronic device 1400) may be disposed on the second side portion 1442 (e.g., second side portion 942 in FIG. 9A).

In one embodiment, in the folded state of the electronic device 1400, a first input region 1481 for the first key function may be formed on the third side surface 1400e due to the alignment of the input regions ① and ⑦. In the folded state of the electronic device 1400, a second input region 1482 for the second key function may be formed on the third side surface 1400e due to the alignment of the input regions ② and ⑧. In the folded state of the electronic device 1400, a third input region 1483 for the third key function may be formed on the third side surface 1400e due to the alignment of the input regions ③ and ⑨. In the folded state of the electronic device 1400, the first input region 1481 for the first key function, the second input region 1482 for the second key function, or the third input region 1483 for the third key function may form an extended touch reception range that is not biased to one side on the third side surface 1400e having a height greater than that of the electronic device 1400 in the unfolded state. For this reason, as described with reference to FIG. 9B, key input can be smoothly performed.

In one embodiment, at operation 1303 in FIG. 13, in the unfolded or folded state of the electronic device 1400, the processor (e.g., processor 710 in FIG. 7) may assign a gesture function to at least one first edge key or at least one second edge key to which no key function is assigned.

For example, in the unfolded state of the electronic device 1400, the processor (e.g., processor 710 in FIG. 7) may assign a gesture function to at least some of the plural second edge keys 1407, 1408, 1409, 1410, 1411 and 1412. In one embodiment, in the unfolded state of the electronic device 1400, the processor may assign a gesture function to the second edge key 1407 including the input region ⑦, the second edge key 1408 including the input region ⑧, and the second edge key 1409 including the input region ⑨. In a certain embodiment, in the unfolded state of the electronic device 1400, the processor may assign a gesture function to the second edge key 1410 including the input region ⑩, the second edge key 1411 including the input region ⑪, and the second edge key 1412 including the input region ⑫. In the unfolded state of the electronic device 1400, a gesture input signal may be generated through the second edge keys according to various gestures such as a swipe gesture or a squeeze gesture, and the processor may execute the corresponding gesture function based on the gesture input signal.

For example, in the folded state of the electronic device 1400, the processor (e.g., processor 710 in FIG. 7) may assign a gesture function to the first edge key 1404 including the input region ④, the second edge key 1410 aligned with the first edge key 1404 and including the input region ⑩, the first edge key 1405 including the input region ⑤, the second edge key 1411 aligned with the first edge key 1405 and including the input region ⑪, the first edge key 1406 including the input region ⑥, and the second edge key 1412 aligned with the first edge key 1406 and including the input region ⑫. In one embodiment, in the folded state of the electronic device 1400, a fourth input region 1484 for the gesture function may be formed on the third side surface 1400e due to the alignment of the input regions ④ and ⑩. In the folded state of the electronic device 1400, a fifth input region 1485 for the gesture function may be formed on the third side surface 1400e due to the alignment of the input regions ⑤ and ⑪. In the folded state of the electronic device 1400, a sixth input region 1486 for the gesture function may be formed on the third side surface 1400e due to the alignment of the input regions ⑥ and ⑫. In the folded state of the electronic device 1400, the fourth input region 1484, the fifth input region 1485, or the sixth input region 1486 for the above gesture function may form an extended touch reception range that is not biased to one side on the third side surface 1400e having a height greater than that of the electronic device 1400 in the unfolded state. For this reason, as described with reference to FIG. 9B, key input can be smoothly performed.

Figure 15A:
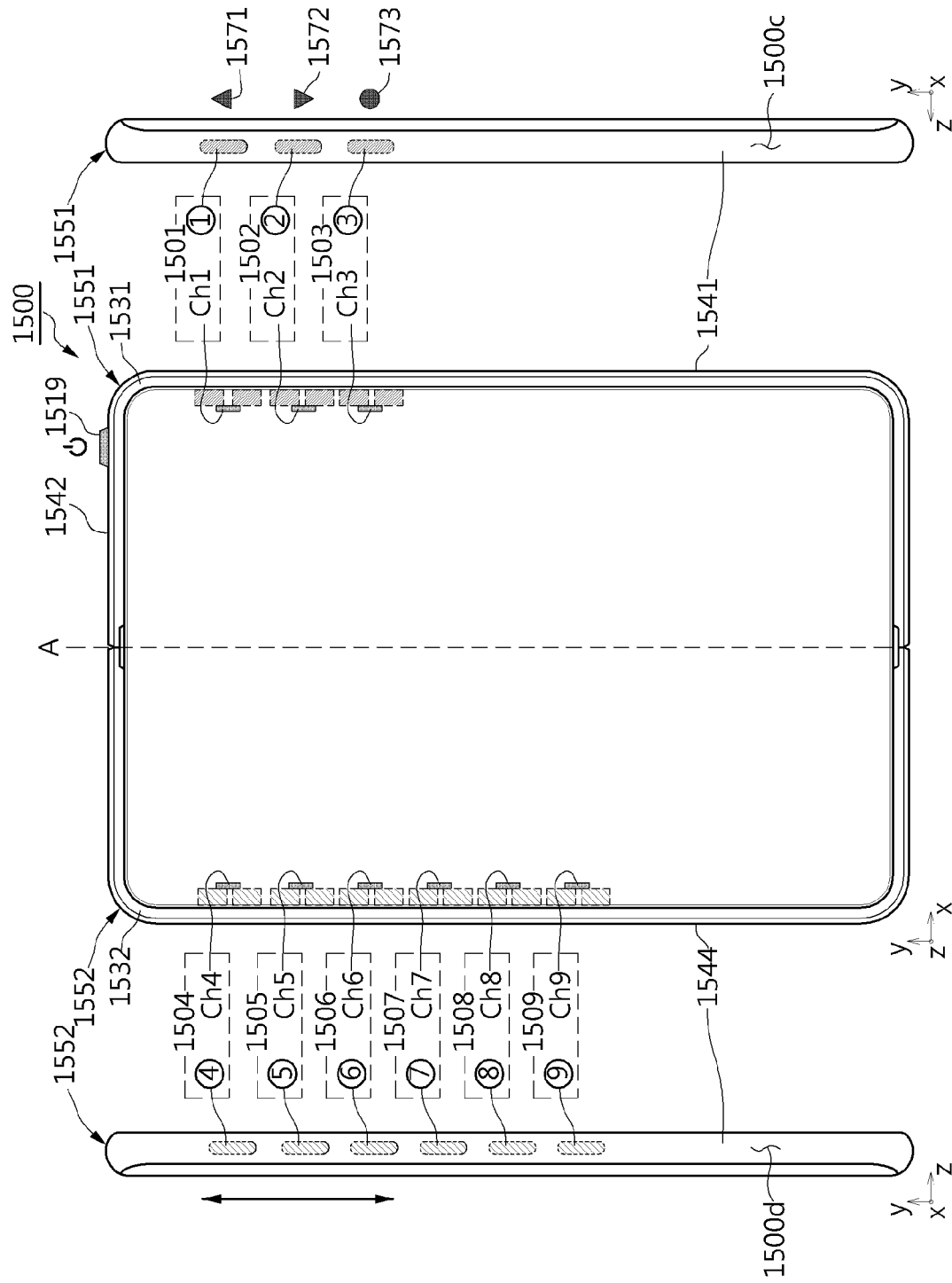
FIG. 15A illustrates an electronic device in the unfolded state according to various embodiments.

FIG. 15A illustrates an electronic device 1500 in the unfolded state according to various embodiments. FIG. 15B illustrates the electronic device 1500 of FIG. 15A in the folded state according to various embodiments.

With reference to FIGS. 15A and 15B, the electronic device 1500 (e.g., electronic device 20 in FIG. 2, or electronic device 700 in FIG. 7) may include a first housing structure 1551 (e.g., first housing structure 910 in FIG. 9A) including a first side member 1531 (e.g., first side member 911 in FIG. 9A), a second housing structure 1552 (e.g., second housing structure 920 in FIG. 9A) including a second side member 1532 (e.g., second side member 921 in FIG. 9A), and a hinge structure 1553 (e.g., hinge structure 930 in FIG. 9A) connecting the first housing structure 1551 and the second housing structure 1552. The electronic device 1500 may include a display (e.g., display 300 in FIG. 2) extending from the first housing structure 1551 to the second housing structure 1552.

With reference to FIG. 15B, in the folded state of the electronic device 1500, the first side member 1531 and the second side member 1532 may be aligned with each other. In the folded state of the electronic device 1500, the first side surface 1500c (e.g., first side surface 900c in FIG. 9B) and the second side surface 1500d (e.g., second side surface 900d in FIG. 9B) are aligned with each other, forming a third side surface 1500e (e.g., third side surface 900e in FIG. 9B) having a height greater than that of the electronic device 1500 in the unfolded state.

In one embodiment, the electronic device 1500 may include a plurality of first edge keys 1501, 1502 and 1503 disposed in the first housing structure 1551. The plural first edge keys 1501, 1502 and 1503 may be disposed along the first side portion 1541 (e.g., first side portion 941 in FIG. 9A) in parallel with and spaced apart from the folding axis A. The plural first edge keys 1501, 1502 and 1503 may be implemented in substantially the same manner as the first edge keys 901, 902, 903 and 904 in FIG. 9A by use of plural first sensing channels Ch1, Ch2 and Ch3 and plural input regions ①, ② and ③.

In one embodiment, the electronic device 1500 may include a plurality of second edge keys 1504, 1505, 1506, 1507, 1508 and 1509 disposed in the second housing structure 1552. The plural second edge keys 1504, 1505, 1506, 1507, 1508 and 1509 may be disposed along the fourth side portion 1544 (e.g., fourth side portion 944 in FIG. 9A) in parallel with and spaced apart from the folding axis A. The plural second edge keys 1504, 1505, 1506, 1507, 1508 and 1509 may be implemented in substantially the same manner as the second edge keys 905, 906, 907 and 908 in FIG. 9A by use of plural second sensing channels Ch4, Ch5, Ch6, Ch7, Ch8 and Ch9 and plural input regions ④, ⑤, ⑥, ⑦, ⑧ and ⑨.

In one embodiment, in the unfolded state of the electronic device 1500, the plural first edge keys 1501, 1502 and 1503 and some second edge keys 1504, 1505 and 1506 among the plural second edge keys 1504, 1505, 1506, 1507, 1508 and 1509 may be symmetrically disposed with respect to the folding axis A. In various embodiments, the number or location of the first edge keys or the second edge keys may be varied without being limited to the embodiment of FIGS. 15A and 15B.

With reference to FIG. 15B, in one embodiment, when viewed toward the third side surface 1500e in the folded state of the electronic device 1500, the input region ① and the input region ④ may be aligned with each other. When viewed toward the third side surface 1500e in the folded state of the electronic device 1500, the input region ② and the input region ⑤ may be aligned with each other. When viewed toward the third side surface 1500e in the folded state of the electronic device 1500, the input region ③ and the input region ⑥ may be aligned with each other.

In one embodiment, in the unfolded state of the electronic device 1500, the processor (e.g., processor 710 in FIG. 7) may assign a first key function (e.g., increasing the volume of the sound output) to the first edge key 1501 including the input region ①. In the unfolded state of the electronic device 1500, the processor may assign a second key function (e.g., decreasing the volume of the sound output) to the first edge key 1502 including the input region ②. In the unfolded state of the electronic device 1500, the processor may assign a third key function (e.g., artificial intelligence virtual assistant) to the first edge key 1503 including the input region ③. Key indicators 1571, 1572 and 1573 indicating key functions may be disposed in the input regions of the edge keys to which key functions are assigned. In the unfolded state of the electronic device 1500, the processor may not assign a key function to the second edge keys 1504, 1505, 1506, 1507, 1508 and 1509. In one embodiment, in the folded state of the electronic device 1500, the processor may assign the first key function to the first edge key 1501 including the input region ②  and the second edge key 1504 aligned with the first edge key 1501 and including the input region ④. In the folded state of the electronic device 1500, the processor may assign the second key function to the first edge key 1502 including the input region ② and the second edge key 1505 aligned with the first edge key 1502 and including the input region ⑤. In the folded state of the electronic device 1500, the processor may assign the third key function to the first edge key 1503 including the input region ③ and the second edge key 1506 aligned with the first edge key 1503 and including the input region ⑥. When a key input signal related to a user input is generated from an edge key to which a key function is assigned in the unfolded or folded state of the electronic device 1500, the processor may execute the assigned function.

In various embodiments, a key button 1519 associated with the fourth key function (e.g., turning on or off the power of the electronic device 1500) may be disposed on the second side portion 1542 (e.g., second side portion 942 in FIG. 9A).

In one embodiment, in the folded state of the electronic device 1500, a first input region 1581 for the first key function may be formed on the third side surface 1500e due to the alignment of the input regions ① and ④. In the folded state of the electronic device 1500, a second input region 1582 for the second key function may be formed on the third side surface 1500e due to the alignment of the input regions ② and ⑤. In the folded state of the electronic device 1500, a third input region 1583 for the third key function may be formed on the third side surface 1500e due to the alignment of the input regions ③ and ⑥. In the folded state of the electronic device 1500, the first input region 1581 for the first key function, the second input region 1582 for the second key function, or the third input region 1583 for the third key function may form an extended touch reception range that is not biased to one side on the third side surface 1500e having a height greater than that of the electronic device 1500 in the unfolded state. For this reason, as described with reference to FIG. 9B, key input can be smoothly performed.

In one embodiment, at operation 1303 in FIG. 13, in the unfolded or folded state of the electronic device 1500, the processor (e.g., processor 710 in FIG. 7) may assign a gesture function to at least one first edge key or at least one second edge key to which no key function is assigned.

For example, in the unfolded state of the electronic device 1500, the processor (e.g., processor 710 in FIG. 7) may assign a gesture function to at least some of the plural second edge keys 1504, 1505, 1506, 1507, 1508 and 1509. In one embodiment, in the unfolded state of the electronic device 1500, the processor may assign a gesture function to the second edge key 1504 including the input region ④, the second edge key 1505 including the input region ⑤, and the second edge key 1506 including the input region ⑥. In a certain embodiment, in the unfolded state of the electronic device 1500, the processor may assign a gesture function to the second edge key 1507 including the input region ⑦, the second edge key 1508 including the input region ⑧, and the second edge key 1509 including the input region ⑨. In the unfolded state of the electronic device 1500, a gesture input signal may be generated through the second edge keys according to various gestures such as a swipe gesture or a squeeze gesture, and the processor may execute the corresponding gesture function based on the gesture input signal.

Figure 16A:
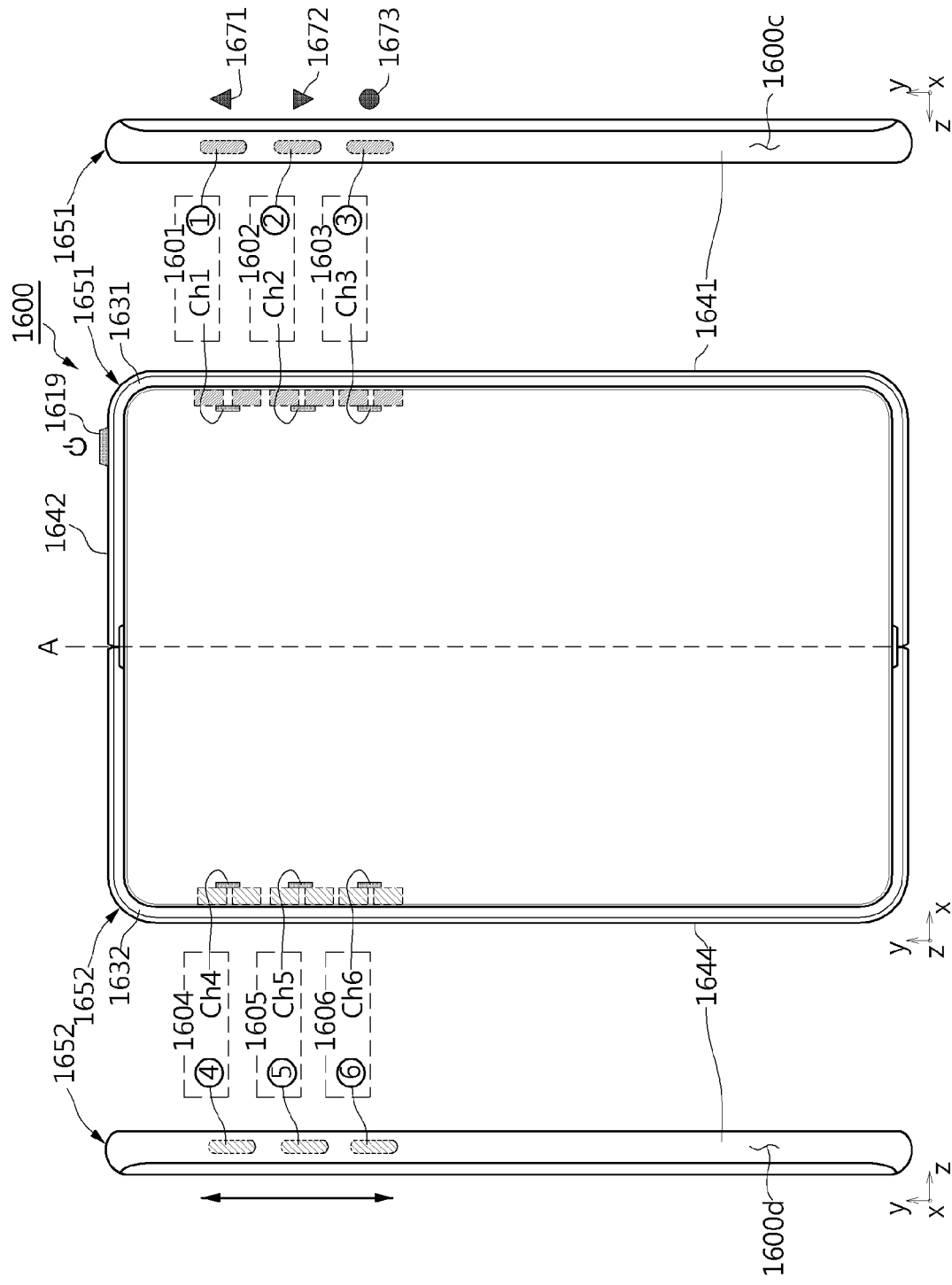
FIG. 16A illustrates an electronic device in the unfolded state according to various embodiments.

FIG. 16A illustrates an electronic device 1600 in the unfolded state according to various embodiments. FIG. 16B illustrates the electronic device 1600 of FIG. 16A in the folded state according to various embodiments.

Figure 16B:
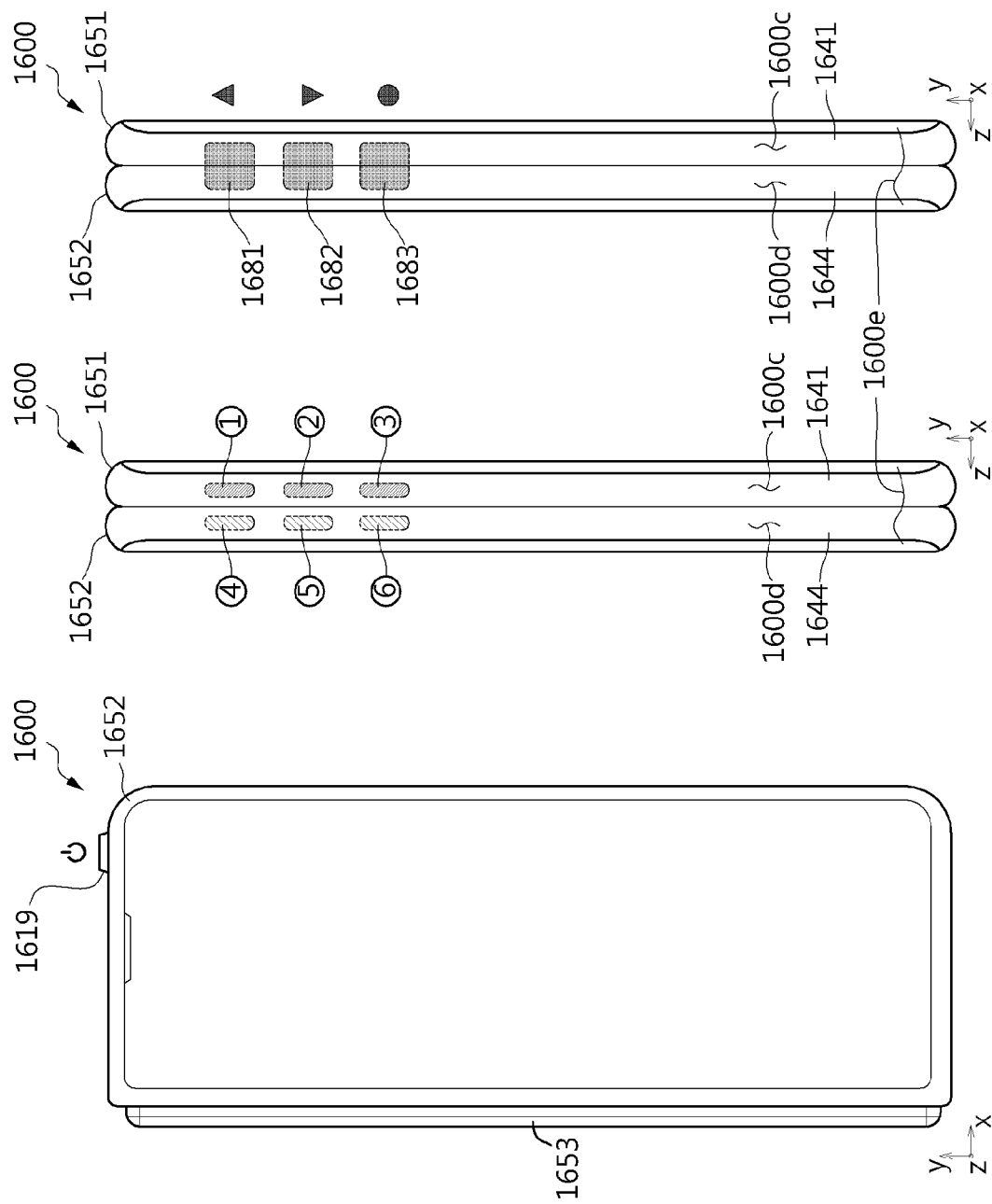
FIG. 16B illustrates the electronic device of FIG. 16A in the folded state according to various embodiments.

With reference to FIGS. 16A and 16B, the electronic device 1600 (e.g., electronic device 20 in FIG. 2, or electronic device 700 in FIG. 7) may include a first housing structure 1651 (e.g., first housing structure 910 in FIG. 9A) including a first side member 1631 (e.g., first side member 911 in FIG. 9A), a second housing structure 1652 (e.g., second housing structure 920 in FIG. 9A) including a second side member 1632 (e.g., second side member 921 in FIG. 9A), and a hinge structure 1653 (e.g., hinge structure 930 in FIG. 9A) connecting the first housing structure 1651 and the second housing structure 1652. The electronic device 1600 may include a display (e.g., display 300 in FIG. 2) extending from the first housing structure 1651 to the second housing structure 1652.

With reference to FIG. 16B, in the folded state of the electronic device 1600, the first side member 1631 and the second side member 1632 may be aligned with each other. In the folded state of the electronic device 1600, the first side surface 1600c (e.g., first side surface 900c in FIG. 9B) and the second side surface 1600d (e.g., second side surface 900d in FIG. 9B) are aligned with each other, forming a third side surface 1600e (e.g., third side surface 900e in FIG. 9B) having a height greater than that of the electronic device 1600 in the unfolded state.

In one embodiment, the electronic device 1600 may include a plurality of first edge keys 1601, 1602 and 1603 disposed in the first housing structure 1651. The plural first edge keys 1601, 1602 and 1603 may be disposed along the first side portion 1641 (e.g., first side portion 941 in FIG. 9A) in parallel with and spaced apart from the folding axis A. The plural first edge keys 1601, 1602 and 1603 may be implemented in substantially the same manner as the first edge keys 901, 902, 903 and 904 in FIG. 9A by use of plural first sensing channels Ch1, Ch2 and Ch3 and plural input regions ①, ② and ③.

In one embodiment, the electronic device 1600 may include a plurality of second edge keys 1604, 1605 and 1606 disposed in the second housing structure 1652. The plural second edge keys 1604, 1605 and 1606 may be disposed along the fourth side portion 1644 (e.g., fourth side portion 944 in FIG. 9A) in parallel with and spaced apart from the folding axis A. The plural second edge keys 1604, 1605 and 1606 may be implemented in substantially the same manner as the second edge keys 905, 906, 907 and 908 in FIG. 9A by use of plural second sensing channels Ch4, Ch5 and Ch6 and plural input regions ④, ⑤ and ⑥.

In one embodiment, in the unfolded state of the electronic device 1600, the plural first edge keys 1601, 1602 and 1603 and the plural second edge keys 1604, 1605 and 1606 may be symmetrically disposed with respect to the folding axis A. In various embodiments, the number or location of the first edge keys or the second edge keys may be varied without being limited to the embodiment of FIGS. 16A and 16B.

With reference to FIG. 16B, in one embodiment, when viewed toward the third side surface 1600e in the folded state of the electronic device 1600, the input region ① and the input region ④ may be aligned with each other. When viewed toward the third side surface 1600e in the folded state of the electronic device 1600, the input region ② and the input region ⑤ may be aligned with each other. When viewed toward the third side surface 1600e in the folded state of the electronic device 1600, the input region ③ and the input region ⑥ may be aligned with each other.

In one embodiment, in the unfolded state of the electronic device 1600, the processor (e.g., processor 710 in FIG. 7)

may assign a first key function (e.g., increasing the volume of the sound output) to the first edge key 1601 including the input region ①. In the unfolded state of the electronic device 1600, the processor may assign a second key function (e.g., decreasing the volume of the sound output) to the first edge key 1602 including the input region ②. In the unfolded state of the electronic device 1600, the processor may assign a third key function (e.g., artificial intelligence virtual assistant) to the first edge key 1603 including the input region ③. Key indicators 1671, 1672 and 1673 indicating key functions may be disposed in the input regions of the edge keys to which key functions are assigned. In the unfolded state of the electronic device 1600, the processor may not assign a key function to the second edge keys 1604, 1605 and 1606. In one embodiment, in the folded state of the electronic device 1600, the processor may assign the first key function to the first edge key 1601 including the input region ① and the second edge key 1604 aligned with the first edge key 1601 and including the input region ④. In the folded state of the electronic device 1600, the processor may assign the second key function to the first edge key 1602 including the input region ② and the second edge key 1605 aligned with the first edge key 1602 and including the input region ⑤. In the folded state of the electronic device 1600, the processor may assign the third key function to the first edge key 1603 including the input region ③ and the second edge key 1606 aligned with the first edge key 1603 and including the input region ⑥. When a key input signal related to a user input is generated from an edge key to which a key function is assigned in the unfolded or folded state of the electronic device 1600, the processor may execute the assigned function.

In various embodiments, a key button 1619 associated with the fourth key function (e.g., turning on or off the power of the electronic device 1600) may be disposed on the second side portion 1642 (e.g., second side portion 942 in FIG. 9A).

In one embodiment, in the folded state of the electronic device 1600, a first input region 1681 for the first key function may be formed on the third side surface 1600e due to the alignment of the input regions ① and ④. In the folded state of the electronic device 1600, a second input region 1682 for the second key function may be formed on the third side surface 1600e due to the alignment of the input regions ② and ⑤. In the folded state of the electronic device 1600, a third input region 1683 for the third key function may be formed on the third side surface 1600e due to the alignment of the input regions ③ and ⑥. In the folded state of the electronic device 1600, the first input region 1681 for the first key function, the second input region 1682 for the second key function, or the third input region 1683 for the third key function may form an extended touch reception range that is not biased to one side on the third side surface 1600e having a height greater than that of the electronic device 1600 in the unfolded state. For this reason, as described with reference to FIG. 9B, key input can be smoothly performed.

In one embodiment, at operation 1303 in FIG. 13, in the unfolded or folded state of the electronic device 1600, the processor (e.g., processor 710 in FIG. 7) may assign a gesture function to at least one first edge key or at least one second edge key to which no key function is assigned.

For example, in the unfolded state of the electronic device 1600, the processor (e.g., processor 710 in FIG. 7) may assign a gesture function to the plural second edge keys 1604, 1605 and 1606. In the unfolded state of the electronic device 1600, a gesture input signal may be generated through the second edge keys 1604, 1605 and 1606 according to various gestures such as a swipe gesture or a squeeze gesture, and the processor may execute the corresponding gesture function based on the gesture input signal.

FIG. 17A illustrates an electronic device 1700 in the unfolded state according to various embodiments. FIG. 17B illustrates the electronic device 1700 of FIG. 17A in the folded state according to various embodiments.

With reference to FIGS. 17A and 17B, the electronic device 1700 (e.g., electronic device 20 in FIG. 2, or electronic device 700 in FIG. 7) may include a first housing structure 1751 (e.g., first housing structure 910 in FIG. 9A) including a first side member 1731 (e.g., first side member 911 in FIG. 9A), a second housing structure 1752 (e.g., second housing structure 920 in FIG. 9A) including a second side member 1732 (e.g., second side member 921 in FIG. 9A), and a hinge structure 1753 (e.g., hinge structure 930 in FIG. 9A) connecting the first housing structure 1751 and the second housing structure 1752. The electronic device 1700 may include a display (e.g., display 300 in FIG. 2) extending from the first housing structure 1751 to the second housing structure 1752.

With reference to FIG. 17B, in the folded state of the electronic device 1700, the first side member 1731 and the second side member 1732 may be aligned with each other. In the folded state of the electronic device 1700, the first side surface 1700c (e.g., first side surface 900c in FIG. 9B) and the second side surface 1700d (e.g., second side surface 900d in FIG. 9B) are aligned with each other, forming a third side surface 1700e (e.g., third side surface 900e in FIG. 9B) having a height greater than that of the electronic device 1700 in the unfolded state.

In one embodiment, the electronic device 1700 may include a plurality of first edge keys 1701, 1702 and 1703 disposed in the first housing structure 1751. The plural first edge keys 1701, 1702 and 1703 may be disposed along the first side portion 1741 (e.g., first side portion 941 in FIG. 9A) in parallel with and spaced apart from the folding axis A. The plural first edge keys 1701, 1702 and 1703 may be implemented in substantially the same manner as the first edge keys 901, 902, 903 and 904 in FIG. 9A by use of plural first sensing channels Ch1, Ch2 and Ch3 and plural input regions ①, ② and ③.

In one embodiment, the electronic device 1700 may include a plurality of second edge keys 1704, 1705 and 1706 disposed in the second housing structure 1752. The plural second edge keys 1704, 1705 and 1706 may be disposed along the fourth side portion 1744 (e.g., fourth side portion 944 in FIG. 9A) in parallel with and spaced apart from the folding axis A. The plural second edge keys 1704, 1705 and 1706 may be implemented in substantially the same manner as the second edge keys 905, 906, 907 and 908 in FIG. 9A by use of plural second sensing channels Ch4, Ch5 and Ch6 and plural input regions ④, ⑤ and ⑥.

In one embodiment, the plural first edge keys 1701, 1702 and 1703 may be disposed closer to the second side portion 1742 (e.g., second side portion 942 in FIG. 9A) than the third side portion 1743 (e.g., third side portion 943 in FIG. 9A). The plural second edge keys 1704, 1705 and 1706 may be disposed closer to the sixth side portion 1746 (e.g., sixth side portion 946 in FIG. 9A) than the fifth side portion 1745 (e.g., fifth side portion 945 in FIG. 9A). As shown in FIG. 17B, in one embodiment, when viewed toward the third side surface 1700e in the folded state of the electronic device 1700, the input regions ①, ② and ③ may be not aligned with the input regions ④, ⑤ and ⑥. In various embodiments, the number or location of the first edge keys or the second edge keys may be varied without being limited to the embodiment of FIGS. 17A and 17B.

In one embodiment, in the unfolded or folded state of the electronic device 1700, the processor (e.g., processor 710 in FIG. 7) may assign a first key function (e.g., increasing the volume of the sound output) to the first edge key 1701 including the input region ①. In the unfolded state of the electronic device 1700, the processor may assign a second key function (e.g., decreasing the volume of the sound output) to the first edge key 1702 including the input region ②. In the unfolded state of the electronic device 1700, the processor may assign a third key function (e.g., artificial intelligence virtual assistant) to the first edge key 1703 including the input region ③. Key indicators 1771, 1772 and 1773 indicating key functions may be disposed in the input regions of the edge keys to which key functions are assigned. In the unfolded state of the electronic device 1700, the processor may not assign a key function to the second edge keys 1704, 1705 and 1706. When a key input signal related to a user input is generated from an edge key to which a key function is assigned in the unfolded or folded state of the electronic device 1700, the processor may execute the assigned function.

In various embodiments, a key button 1719 associated with the fourth key function (e.g., turning on or off the power of the electronic device 1700) may be disposed on the second side portion 1742 (e.g., second side portion 942 in FIG. 9A).

In one embodiment, at operation 1303 in FIG. 13, in the unfolded or folded state of the electronic device 1700, the processor (e.g., processor 710 in FIG. 7) may assign a gesture function to at least one first edge key or at least one second edge key to which no key function is assigned.

For example, in the unfolded state of the electronic device 1700, the processor (e.g., processor 710 in FIG. 7) may assign a gesture function to the plural second edge keys 1704, 1705 and 1706. In the unfolded state of the electronic device 1700, a gesture input signal may be generated through the second edge keys 1704, 1705 and 1706 according to various gestures such as a swipe gesture or a squeeze gesture, and the processor may execute the corresponding gesture function based on the gesture input signal.

Figure 17C:
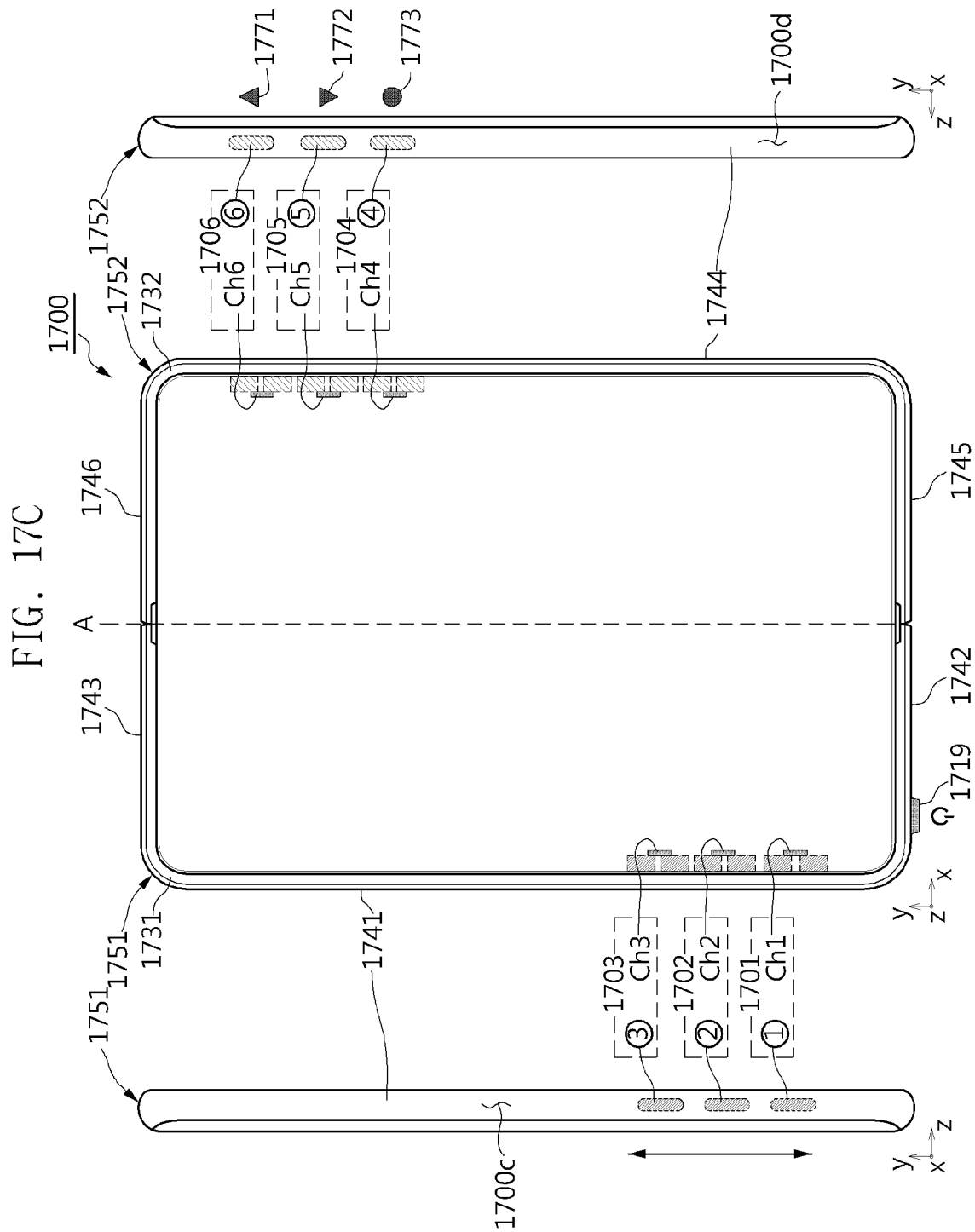
FIG. 17C illustrates an electronic device in the unfolded state and in the second rotation state according to various embodiments.

In various embodiments, the memory 720 in FIG. 7 may further include a rotation state detection instruction. The rotation state detection instruction may include a routine for the processor 710 of FIG. 7 to check the rotation state of the electronic device 700 by using at least one sensor (e.g., first sensor circuit 731 in FIG. 7). FIG. 17A illustrates the electronic device 1700 in the unfolded state and in the first rotation state. FIG. 17A illustrates the electronic device 1700 in the folded state and in the first rotation state. FIG. 17C illustrates the electronic device 1700 in the unfolded state and in the second rotation state according to various embodiments. FIG. 17D illustrates the electronic device 1700 in the folded state and in the second rotation state according to various embodiments. With reference to FIGS. 17A, 17B, 17C and 17D, compared to the first rotation state, the second rotation state may indicate a state in which the direction from the second side portion 1742 to the third side portion 1743 or the direction from the fifth side portion 1745 to the sixth side portion 1746 is reversed. The processor 710 may check whether the electronic device 1700 is in the first rotation state or in the second rotation state by using various sensors such as a gravity sensor, an acceleration sensor, or a gyro sensor. In one embodiment, the key function assignment instruction 722 in FIG. 7 may include a routine for the processor 710 to assign a key function to the first edge key 741 or the second edge key 742 based on the folding state (unfolded or folded) and the rotation state (first rotation or second rotation) of the electronic device 700. The gesture function assignment instruction 724 in FIG. 7 may include a routine for the processor 710 to assign a gesture function to the first edge key 741 or the second edge key 742 based on the folding state (unfolded or folded) and the rotation state (first rotation or second rotation) of the electronic device 700.

In one embodiment, when the electronic device 1700 is in the first rotation state, a key function may be assigned to the plural first edge keys 1701, 1702 and 1703, and a gesture function may be assigned to the plural second edge keys 1704, 1705 and 1706. When the electronic device 1700 is in the second rotation state, a gesture function may be assigned to the plural first edge keys 1701, 1702 and 1703, and a key function may be assigned to the plural second edge keys 1704, 1705 and 1706.

For example, with reference to FIGS. 17A and 17B, when the electronic device 1700 in the unfolded or folded state is in the first rotation state, the processor (e.g., processor 710 in FIG. 7) may assign a first key function (e.g., increasing the volume of the sound output) to the first edge key 1701 including the input region ①. When the electronic device 1700 in the unfolded or folded state is in the first rotation state, the processor may assign a second key function (e.g., decreasing the volume of the sound output) to the first edge key 1702 including the input region ②. When the electronic device 1700 in the unfolded or folded state is in the first rotation state, the processor may assign a third key function (e.g., artificial intelligence virtual assistant) to the first edge key 1703 including the input region ③. When the electronic device 1700 in the unfolded or folded state is in the first rotation state, the processor may assign a gesture function to the second edge key 1704 including the input region ④, the second edge key 1705 including the input region ⑤, and the second edge key 1706 including the input region ⑥.

For example, with reference to FIGS. 17C and 17D, when the electronic device 1700 in the unfolded or folded state is in the second rotation state, the processor (e.g., processor 710 in FIG. 7) may assign a first key function (e.g., increasing the volume of the sound output) to the second edge key 1706 including the input region ⑥. When the electronic device 1700 in the unfolded or folded state is in the second rotation state, the processor may assign a second key function (e.g., decreasing the volume of the sound output) to the second edge key 1705 including the input region ⑤. When the electronic device 1700 in the unfolded or folded state is in the second rotation state, the processor may assign a third key function (e.g., artificial intelligence virtual assistant) to the second edge key 1704 including the input region ④. When the electronic device 1700 in the unfolded or folded state is in the second rotation state, the processor may assign a gesture function to the first edge key 1703 including the input region ③, the first edge key 1702 including the input region ②, and the first edge key 1701 including the input region ①.

In one embodiment, with reference to FIGS. 17A and 17C, even when the electronic device 1700 in the unfolded state is in the first rotation state or in the second rotation state, the same user experience can be provided for key input or gesture input (e.g., gesture input using a swipe gesture).

In one embodiment, with reference to FIGS. 17B and 17D, even when the electronic device 1700 in the folded state is in the first rotation state or in the second rotation state, the same user experience can be provided for key input or gesture input. For example, as the electronic device 1700 in the folded state has a shape similar to a bar-type electronic device, when the electronic device 1700 in the folded state is gripped with one hand, a gesture input signal for a squeeze gesture may be generated not only in the first rotation state but also in the second rotation state due to the position of the edge keys to which the gesture function is assigned. For example, when the electronic device 1700 in the folded state is gripped with one hand, the same user experience for key input can be provided not only in the first rotation state but also in the second rotation state due to the position of the edge keys to which the key function is assigned.

Figure 18A:
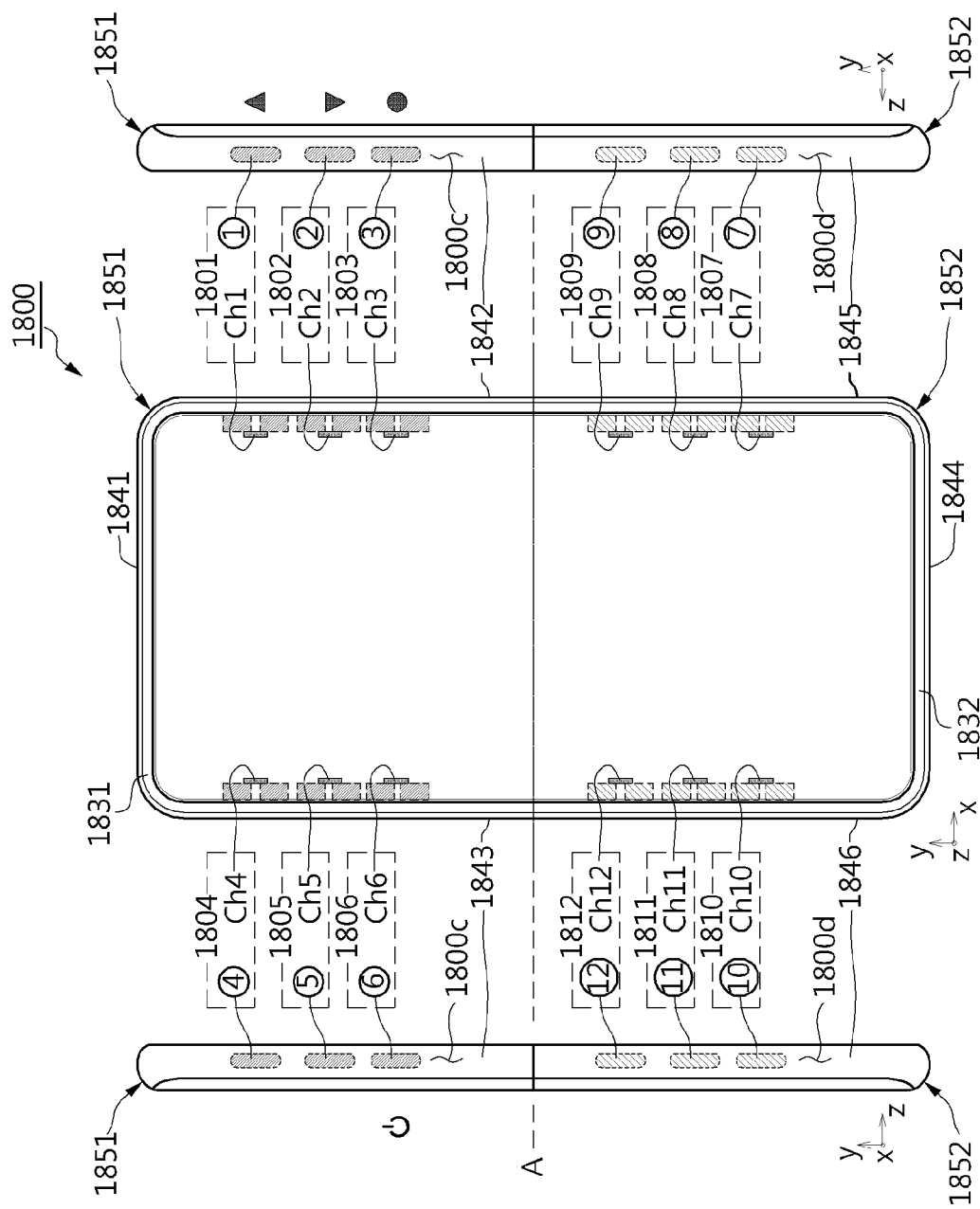
FIG. 18A illustrates an electronic device in the unfolded state according to various embodiments.
Figure 18B:
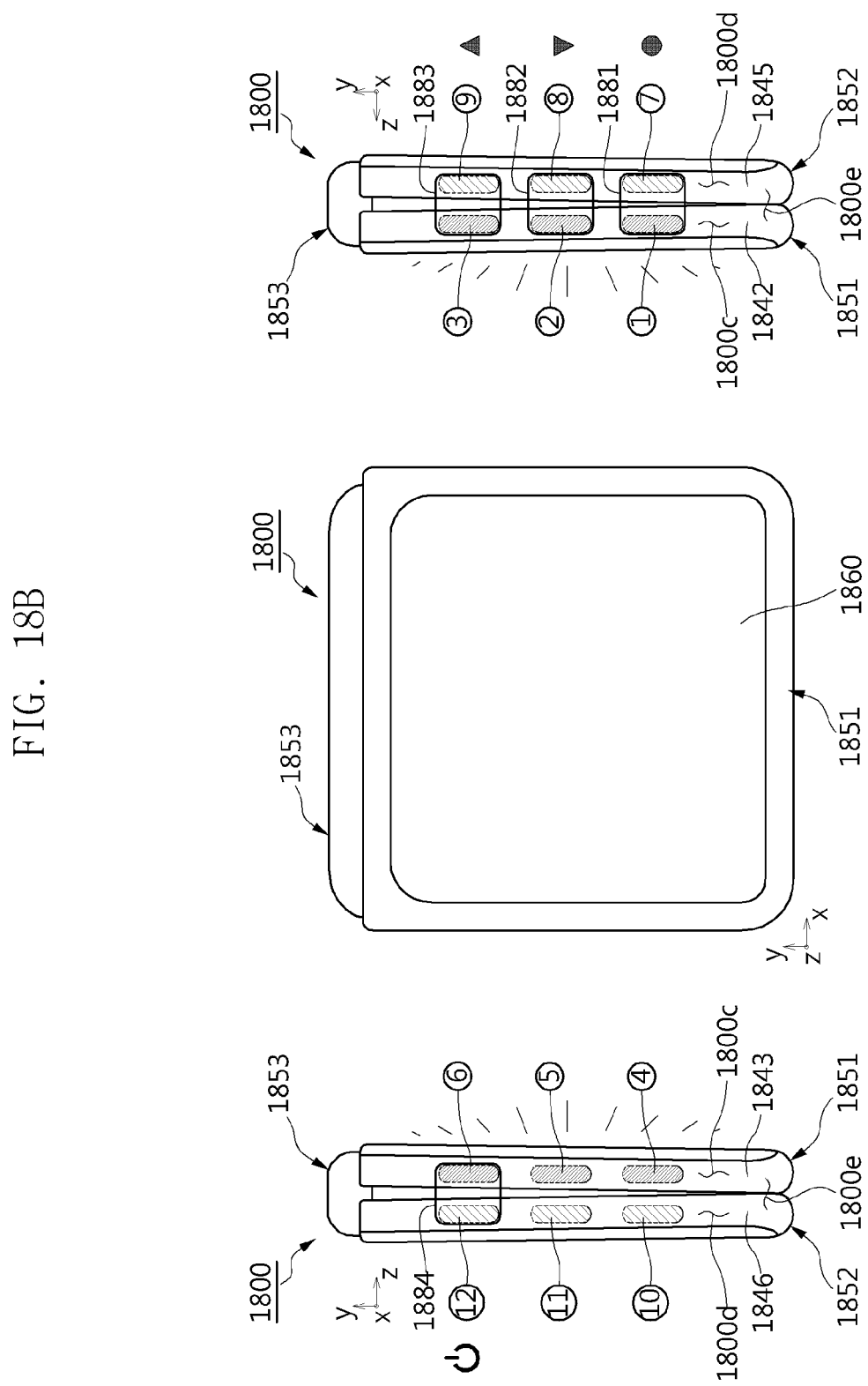
FIG. 18B illustrates the electronic device of FIG. 18A in the folded state according to various embodiments.

FIG. 18A illustrates an electronic device 1800 in the unfolded state according to various embodiments. FIG. 18B illustrates the electronic device 1800 of FIG. 18A in the folded state according to various embodiments.

With reference to FIGS. 18A and 18B, the electronic device 1800 (e.g., electronic device 700 in FIG. 7) may include a first housing structure 1851 including a first side member 1831, a second housing structure 1852 including a second side member 1832, and a hinge structure 1853 connecting the first housing structure 1851 and the second housing structure 1852. The electronic device 1800 may include a display (e.g., display 300 in FIG. 2) extending from the first housing structure 1851 to the second housing structure 1852. In various embodiments, the electronic device 1800 may include a sub display 1860 disposed in the first housing structure 1851. The first side member 1831 may include a first side portion 1841 extended in parallel with the folding axis (A), a second side portion 1842 extended perpendicularly to the folding axis A and connected to one end of the first side portion 1841, and a third side portion 1843 extended perpendicularly to the folding axis A, connected to the other end of the first side portion 1841, and parallel to the second side portion 1842. The second side member 1832 may include a fourth side portion 1844 extended in parallel with the folding axis (A), a fifth side portion 1845 extended perpendicularly to the folding axis A and connected to one end of the fourth side portion 1844, and a sixth side portion 1846 extended perpendicularly to the folding axis A, connected to the other end of the fourth side portion 1844, and parallel to the fifth side portion 1845.

With reference to FIG. 18B, in the folded state of the electronic device 1800, the second side portion 1842 and the fifth side portion 1845 may be aligned. In the folded state of the electronic device 1800, the third side portion 1843 and the sixth side portion 1846 may be aligned. In the folded state of the electronic device 1800, the first side portion 1841 and the fourth side portion 1844 may be aligned. In the folded state of the electronic device 1800, the first side surface 1800c formed by the first side member 1831 and the second side surface 1800d formed by the second side member 1832 are aligned with each other, forming the third side surface 1800e having a height greater than that of the electronic device 1800 in the unfolded state.

In one embodiment, the electronic device 1800 may include a plurality of first edge keys 1801, 1802, 1803, 1804, 1805 and 1806 disposed in the first housing structure 1851. The electronic device 1800 may include a plurality of second edge keys 1807, 1808, 1809, 1810, 1811 and 1812 disposed in the second housing structure 1852. The plural first edge keys 1801, 1802, 1803, 1804, 1805 and 1806 may be implemented in substantially the same manner as the first edge keys 901, 902, 903 and 904 in FIG. 9A by use of plural first sensing channels Ch1, Ch2, Ch3, Ch4, Ch5 and Ch6 and plural input regions ①, ②, ③, ④, ⑤ and ⑥. The plural second edge keys 1807, 1808, 1809, 1810, 1811 and 1812 may be implemented in substantially the same manner as the second edge keys 905, 906, 907 and 908 in FIG. 9A by use of plural second sensing channels Ch7, Ch8, Ch9, Ch10, Ch11 and Ch12 and plural input regions ⑦, ⑧, ⑨, ⑩, ⑪ and ⑫. ⑫. In one embodiment, in the unfolded state of the electronic device 1800, the plural first edge keys 1801, 1802, 1803, 1804, 1805 and 1806 and the plural second edge keys 1807, 1808, 1809, 1810, 1811 and 1812 may be symmetrically disposed with respect to the folding axis A. The plural first edge keys 1801, 1802 and 1803 may be disposed along the second side portion 1842. The plural first edge keys 1804, 1805 and 1806 may be disposed along the third side portion 1843. The plural second edge keys 1807, 1808 and 1809 may be disposed along the fifth side portion 1845. The plural second edge keys 1810, 1811 and 1812 may be disposed along the sixth side portion 1846. With reference to FIG. 18B, when viewed toward the third side surface 1800e in the folded state of the electronic device 1800, the input region ① and the input region ⑦ may be aligned with each other. When viewed toward the third side surface 1800e in the folded state of the electronic device 1800, the input region ② and the input region ⑧ may be aligned with each other. When viewed toward the third side surface 1800e in the folded state of the electronic device 1800, the input region ③ and the input region ⑨ may be aligned with each other. When viewed toward the third side surface 1800e in the folded state of the electronic device 1800, the input region ④ and the input region ⑩ may be aligned with each other. When viewed toward the third side surface 1800e in the folded state of the electronic device 1800, the input region ⑤ and the input region ⑪ may be aligned with each other. When viewed toward the third side surface 1800e in the folded state of the electronic device 1800, the input region ⑥ and the input region ⑫ may be aligned with each other. In various embodiments, the number or location of the first edge keys or the second edge keys may be varied without being limited to the embodiment of FIGS. 18A and 18B.

In one embodiment, in the unfolded state of the electronic device 1800, the processor (e.g., processor 710 in FIG. 7) may assign a first key function (e.g., increasing the volume of the sound output) to the first edge key 1801 including the input region ①. In the unfolded state of the electronic device 1800, the processor may assign a second key function (e.g., decreasing the volume of the sound output) to the first edge key 1802 including the input region ②. In the unfolded state of the electronic device 1800, the processor may assign a third key function (e.g., artificial intelligence virtual assistant) to the first edge key 1803 including the input region ③. In the unfolded state of the electronic device 1800, the processor may assign a fourth key function (e.g., turning on or off the power of the electronic device 1800) to the first edge key 1806 including the input region ⑥. In the unfolded state of the electronic device 1800, the processor may not allocate a key function to the remaining edge keys 1804, 1805, 1806, 1807, 1809, 1810, 1811 and 1812.

In one embodiment, in the folded state of the electronic device 1800, the processor (e.g., processor 710 in FIG. 7) may assign the first key function (e.g., increasing the volume of the output sound) to the first edge key 1803 including the input region ③ and the second edge key 1809 aligned with the first edge key 1803 and including the input region ⑨. In the folded state of the electronic device 1800, a first input region 1881 for the first key function may be formed on the third side surface 1800e due to the alignment of the input regions ③ and ⑨. In one embodiment, in the folded state of the electronic device 1800, the processor may assign the second key function (e.g., decreasing the volume of the output sound) to the first edge key 1802 including the input region ②  and the second edge key 1808 aligned with the first edge key 1802 and including the input region ⑧. In the folded state of the electronic device 1800, a second input region 1882 for the second key function may be formed on the third side surface 1800*e* due to the alignment of the input regions ② and ⑧. In one embodiment, in the folded state of the electronic device 1800, the processor may assign the third key function (e.g., artificial intelligence virtual assistant) to the first edge key 1801 including the input region ① and the second edge key 1807 aligned with the first edge key 1801 and including the input region ⑦. In the folded state of the electronic device 1800, a third input region 1883 for the third key function may be formed on the third side surface 1800*e* due to the alignment of the input regions ① and ⑦. In one embodiment, in the folded state of the electronic device 1800, the processor may assign the fourth key function (e.g., turning on or off the power of the electronic device 1800) to the first edge key 1806 including the input region ⑥ and the second edge key 1812 aligned with the first edge key 1806 and including the input region ⑫. In the folded state of the electronic device 1800, the fourth input region 1884 for the fourth key function may be formed on the third side surface 1800*e* due to the alignment of the input regions ⑥ and ⑫.

In one embodiment, in the folded state of the electronic device 1800, the processor (e.g., processor 710 in FIG. 7) may not assign a key function to the remaining edge keys 1804, 1805, 1810 and 1811.

In various embodiments, in the unfolded state of the electronic device 1800, the processor (e.g., processor 710 in FIG. 7) may assign a gesture function to the second edge key 1810 including the input region ⑩, the second edge key 1811 including the input region ⑪, and the second edge key 1812 including the input region ⑫.

In various embodiments, in the unfolded state of the electronic device 1800, the processor (e.g., processor 710 in FIG. 7) may assign a gesture function to the second edge key 1807 including the input region ⑦, the second edge key 1808 including the input region ⑧, and the second edge key 1809 including the input region ⑨.

In various embodiments, in the folded state of the electronic device 1800, the processor (e.g., processor 710 in FIG. 7) may assign a gesture function to the first edge key 1804 including the input region ④, the first edge key 1805 including the input region ⑤, the second edge key 1810 including the input region ⑩, and the second edge key 1811 including the input region ⑪.

In various embodiments, the number or location of the first edge keys or the second edge keys may be varied without being limited to the embodiment of FIGS. 18A and 18B, and the arrangement of edge keys or assignment of key functions may be applied according to the embodiment of FIG. 10A or 10B, the embodiment of FIG. 11A or 11B, or the embodiment of FIG. 12A or 12B. In various embodiments, the number or location of the first edge keys or the second edge keys may be varied without being limited to the embodiment of FIGS. 18A and 18B, and the arrangement of edge keys or assignment of gesture functions may be applied according to the embodiment of FIG. 14A or 14B, the embodiment of FIG. 15A or 15B, or the embodiment of FIG. 17A, 17B, 17C or 17D.

Figure 19A:
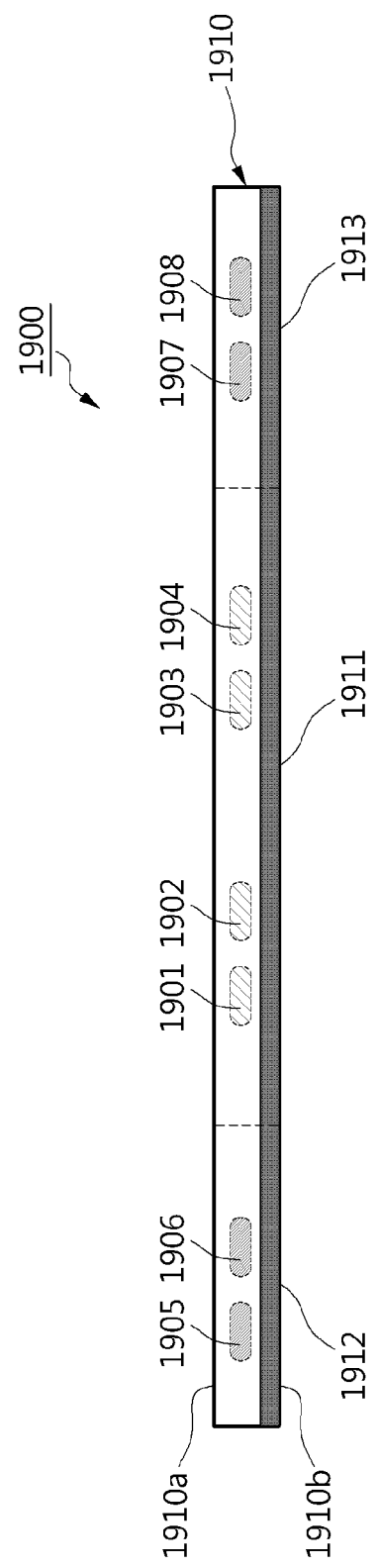
FIG. 19A is a side view of an electronic device in the unfolded state according to various embodiments.
Figure 19B:
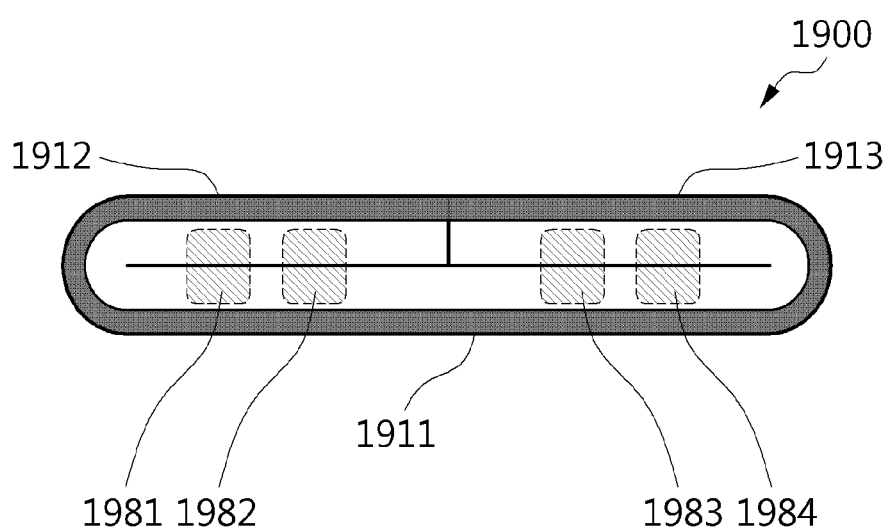
FIG. 19B is a side view of the electronic device of FIG. 19A in the folded state according to various embodiments.

FIG. 19A is a side view of an electronic device 1900 in the unfolded state according to various embodiments. FIG. 19B is a side view of the electronic device 1900 of FIG. 19A in the folded state according to various embodiments.

With reference to FIG. 19A, in one embodiment, the electronic device 1900 (e.g., electronic device 700 in FIG. 7) may include a foldable housing 1910 composed of a first housing structure 1911, a second housing structure 1912, and a third housing structure 1913. The first housing structure 1911 may be disposed between the second housing structure 1912 and the third housing structure 1913. The first housing structure 1911 and the second housing structure 1912 may be connected through a first hinge structure (not shown), and the first housing structure 1911 and the third housing structure 1913 may be connected through a second hinge structure (not shown). With reference to FIG. 19B, the foldable housing 1910 may be in a folded state where the second housing structure 1912 or the third housing structure 1913 at least partially overlap the first housing structure 1911 through the hinge structure. With reference to FIG. 19A, in one embodiment, the foldable housing 1910 may include a first surface 1910*a* and a second surface 1910*b* facing in opposite directions. A display (not shown) may be disposed along at least some of the first surface 1910*a*.

In one embodiment, the electronic device 1900 may include a plurality of first edge keys 1901, 1902, 1903 and 1904 disposed in the first housing structure 1911. The electronic device 1900 may include a plurality of second edge keys 1905 and 1906 disposed in the second housing structure 1912. The electronic device 1900 may include a plurality of third edge keys 1907 and 1908 disposed in the third housing structure 1913.

In one embodiment, in the folded state of the electronic device 1900, the first edge key 1901 and the second edge key 1906 may be aligned with each other. In the folded state of the electronic device 1900, an extended input region 1981 for the corresponding key function may be formed due to the alignment of the input region (e.g., first input region 741*b* in FIG. 7) of the first edge key 1901 and the input region (e.g., second input region 742*b* in FIG. 7) of the second edge key 1906. In the folded state of the electronic device 1900, the first edge key 1902 and the second edge key 1905 may be aligned with each other. In the folded state of the electronic device 1900, an extended input region 1982 for the corresponding key function may be formed due to the alignment of the input region (e.g., first input region 741*b* in FIG. 7) of the first edge key 1902 and the input region (e.g., second input region 742*b* in FIG. 7) of the second edge key 1905.

In one embodiment, in the folded state of the electronic device 1900, the first edge key 1903 and the third edge key 1908 may be aligned with each other. In the folded state of the electronic device 1900, an extended input region 1983 for the corresponding key function may be formed due to the alignment of the input region (e.g., first input region 741*b* in FIG. 7) of the first edge key 1903 and the input region (e.g., second input region 742*b* in FIG. 7) of the third edge key 1908. In the folded state of the electronic device 1900, the first edge key 1904 and the third edge key 1907 may be aligned with each other. In the folded state of the electronic device 1900, an extended input region 1984 for the corresponding key function may be formed due to the alignment of the input region (e.g., first input region 741*b* in FIG. 7) of the first edge key 1903 and the input region (e.g., second input region 742*b* in FIG. 7) of the third edge key 1907.

In various embodiments, the number or location of the first edge keys, the second edge keys, or the third edge keys may be varied without being limited to the embodiment of FIGS. 19A and 19B. In various embodiments, the arrangement of edge keys or assignment of key functions according to the embodiment of FIG. 10A or 10B, the embodiment of FIG. 11A or 11B, or the embodiment of FIG. 12A or 12B may be applied to the embodiment of FIG. 19A or 19B. In various embodiments, the arrangement of edge keys or assignment of gesture functions according to the embodiment of FIG. 14A or 14B, the embodiment of FIG. 15A or 15B, the embodiment of FIG. 16A or 16B, or the embodiment of 17A, 17B, 17C or 17D may be applied to the embodiment of FIG. 19A or 19B.

The arrangement of edge keys, assignment of key functions, or assignment of gesture functions according to various embodiments of the disclosure may be applied to a variety of other foldable electronic devices. For example, the arrangement of edge keys, assignment of key functions, or assignment of gesture functions according to various embodiments of the disclosure may be applied to electronic devices having an out-folding structure in which the screen is folded outwards.

In various embodiments, the arrangement of edge keys, assignment of key functions, or assignment of gesture functions according to various embodiments of the disclosure may be applied to various types of electronic devices in which at least two housings can be arranged to overlap. For example, the arrangement of edge keys, assignment of key functions, or assignment of gesture functions according to various embodiments of the disclosure may be applied to electronic devices of a slide-type or swivel-type in which at least two housings are rotatably operated through a connection part.

According to an embodiment of the disclosure, an electronic device (e.g., electronic device 20 in FIG. 2) may include a foldable housing (e.g., foldable housing 200 in FIG. 2). The foldable housing may include a hinge structure (e.g., hinge structure 401 in FIG. 4). The foldable housing may include a first housing structure (e.g., first housing structure 210 in FIG. 2) that is connected to the hinge structure and includes a first surface (e.g., first surface 2001 in FIG. 2) facing in a first direction, a second surface (e.g., second surface 2002 in FIG. 2) facing in a second direction opposite to the first direction, and a first side surface (e.g., first side surface 200*c* in FIG. 2) surrounding at least some of the space between the first surface and the second surface. The foldable housing may include a second housing structure (e.g., second housing structure 220 in FIG. 2) that is connected to the hinge structure, includes a third surface (e.g., third surface 2003 in FIG. 2) facing in a third direction, a fourth surface (e.g., fourth surface 2004 in FIG. 2) facing in a fourth direction opposite to the third direction, and a second side surface (e.g., second side surface 200*d* in FIG. 2) surrounding at least some of the space between the third surface and the fourth surface, and is foldable with the first housing structure with the hinge structure as the center. In the folded state of the foldable housing, the first side surface and the second side surface may be aligned with each other. The electronic device may include a flexible display (e.g., display 300 in FIG. 2) extending from the first surface to the third surface. The electronic device may include one or more first side keys (e.g., first edge keys 741 in FIG. 7) that are disposed near the first side surface within the first housing structure and includes a first sensing panel (e.g., sensing panel 570 in FIG. 5) reflecting a change in the external force applied to the first side surface. The electronic device may include one or more second side keys (e.g., second edge keys 742 in FIG. 7) that are disposed near the second side surface within the second housing structure and includes a second sensing panel (e.g., sensing panel 570 in FIG. 5) reflecting a change in the external force applied to the second side surface. The electronic device may include a sensor (e.g., sensor 743 in FIG. 7) that is disposed inside the foldable housing, is electrically connected to the first sensing panel and the second sensing panel, and generates a signal related to a key input based on a change in the external force detected by the first sensing panel or the second sensing panel. In the folded state, at least one of the one or more first side keys and at least one of the one or more second side keys may be substantially aligned with each other.

In one embodiment of the disclosure, in the folded state, the first surface (e.g., first surface 2001 in FIG. 2) may face the third surface (e.g., third surface 2003 in FIG. 2).

In one embodiment of the disclosure, in the folded state, the second surface (e.g., second surface 2002 in FIG. 2) may face the fourth surface (e.g., fourth surface 2004 in FIG. 2) (e.g., electronic device having an out-folding structure in which the screen is folded outwards).

In one embodiment of the disclosure, the first housing structure (e.g., first housing structure 910 in FIG. 9A) may include a portion (e.g., first side portion 941 in FIG. 9A) extended parallel to and spaced apart from the folding axis (e.g., folding axis A in FIG. 9A) of the foldable housing. The one or more first side keys (e.g., plural first edge keys 901, 902, 903 and 904 in FIG. 9A) may be disposed at the portion.

In one embodiment of the disclosure, the first housing structure (e.g., first housing structure 1851 in FIG. 18A) may include a portion (e.g., second side portion 1842 or third side portion 1843 in FIG. 9A) extended perpendicular to the folding axis (e.g., folding axis A in FIG. 18A) of the foldable housing. The one or more first side keys (e.g., plural first edge keys 1801, 1802, 1803, 1804, 1805 and 1806 in FIG. 18A) may be disposed at the portion.

In one embodiment of the disclosure, the one or more first side keys (e.g., plural first edge keys 901, 902, 903 and 904 in FIG. 9A) and the one or more second side keys (e.g., plural second edge keys 905, 906, 907 and 908 in FIG. 9A) may be aligned one-to-one in the folded state.

In one embodiment of the disclosure, the one or more second side keys (e.g., plural second edge keys 1504, 1505, 1506, 1507, 1508 and 1509 in FIG. 15A) may include a first section including at least one second side key (e.g., second edge keys 1504, 1505 and 1506 in FIG. 15A) aligned with the one or more first side keys in the folded state, and a second section including at least one second side key (e.g., second edge keys 1507, 1508 and 1509 in FIG. 15A) not aligned with the one or more first side keys in the folded state.

In one embodiment of the disclosure, the first sensing panel and the second sensing panel may include a strain gauge (see FIG. 5, for example).

In one embodiment of the disclosure, the electronic device may include a processor (e.g., processor 710 in FIG. 7) electrically connected to the flexible display and the sensor, and a memory (e.g., memory 720 in FIG. 7) electrically connected to the processor. The memory may store instructions (e.g., key function assignment instruction 722 in FIG. 7) that, when executed, cause the processor to assign a key function to at least one of the one or more first side keys or at least one of the one or more second side keys depending on the folded state or not.

In one embodiment of the disclosure, the instructions (e.g., key function assignment instruction 722 in FIG. 7) may cause the processor, in the folded state, to assign the same key function to a first side key selected from among the one or more first side keys and a second side key being aligned with the selected first side key and selected from among the one or more second side keys, and may cause the processor, not in the folded state, to assign the key function to at least one of the selected first side key or the selected second side key. In one embodiment of the disclosure, the key function may include a function for increasing the volume of the output sound, decreasing the volume of the output sound, an artificial intelligence virtual assistant, or turning on or off the power of the electronic device.

In one embodiment of the disclosure, the instructions (e.g., key function assignment instruction 722 in FIG. 7) may cause the processor, in the folded state, to assign a first key function and a second key function to a first side key selected from among the one or more first side keys and a second side key being aligned with the selected first side key and selected from among the one or more second side keys. The instructions (e.g., key function assignment instruction 722 in FIG. 7) may cause the processor, not in the folded state, to assign the first key function and the second key function respectively to the selected first side key and the selected second side key. In one embodiment of the disclosure, the first key function may be a function for an artificial intelligence virtual assistant, and the second key function may be a function for turning on or off the power of the electronic device.

In one embodiment of the disclosure, the display (e.g., display 1230 in FIG. 12A) may include a first display area (e.g., first display area 1230c in FIG. 12A) extended to the first side surface (e.g., first side surface 1200c in FIG. 12A) so as to overlap the one or more first side keys, and a second display area (e.g., second display area 1230d in FIG. 12A) extended to the second side surface (e.g., second side surface 1200d in FIG. 12A) so as to overlap the one or more second side keys. In the folded state, the first display area and the second display area may be aligned with each other.

In one embodiment of the disclosure, the memory (e.g., memory 720 in FIG. 7) may store instructions that, when executed, cause the processor (e.g., processor 710 in FIG. 7) to, not in the folded state, display a key indicator at a position of the first display area corresponding to one of the one or more first side keys to which a key function is assigned, and display a key indicator at a position of the second display area corresponding to one of the one or more second side keys to which a key function is assigned (see FIG. 12A, for example).

In one embodiment of the disclosure, the memory (e.g., memory 720 in FIG. 7) may store instructions that, when executed, cause the processor (e.g., processor 710 in FIG. 7) to, in the folded state, assign the same key function to a first side key selected from among the one or more first side keys and a second side key being aligned with the selected first side key and selected from among the one or more second side keys, and display, through the display, a key indicator that extends from a first position of the first display area corresponding to the selected first side key to a second position of the second display area corresponding to the selected second side key (see FIG. 12B, for example).

In one embodiment of the disclosure, the memory (e.g., memory 720 in FIG. 7) may further store instructions (e.g., gesture function assignment instruction 724 in FIG. 7) that, when executed, cause the processor (e.g., processor 710 in FIG. 7) to assign a gesture function to some of the one or more first side keys or some of the one or more second side keys depending on the folded state or not, and identify a gesture input based on a signal related to a key input generated by the sensor by using some of the one or more first side keys or the one or more second side keys to which the gesture function is assigned.

In one embodiment of the disclosure, the instructions (e.g., gesture function assignment instruction 724 in FIG. 7) may cause the processor (e.g., processor 710 in FIG. 7) to, in the folded state, assign the same key function to a first side key selected from among the one or more first side keys and a second side key being aligned with the selected first side key and selected from among the one or more second side keys. The instructions may cause the processor to, not in the folded state, assign the key function and the gesture function respectively to the selected first side key and the selected second side key (see FIGS. 14A and 14B, FIGS. 15A and 15B, or FIGS. 16A and 16B, for example).

In one embodiment of the disclosure, the one or more second side keys (e.g., plural second edge keys 1504, 1505, 1506, 1507, 1508 and 1509 in FIG. 15A) may include a first section including at least one second side key (e.g., second edge keys 1504, 1505 and 1506 in FIG. 15A) aligned with the one or more first side keys in the folded state, and a second section including at least one second side key (e.g., second edge keys 1507, 1508 and 1509 in FIG. 15A) not aligned with the one or more first side keys in the folded state. The instructions (e.g., key function assignment instruction 722 and gesture function assignment instruction 724 in FIG. 7) may cause the processor (e.g., processor 710 in FIG. 7) to, in the folded state, assign the same key function to a first side key selected from among the one or more first side keys and a second side key of the first section being aligned with the selected first side key, and assign the gesture function to at least one second side key of the second section (see FIG. 15B, for example). The instructions may cause the processor to, not in the folded state, assign the key function and the gesture function respectively to the selected first side key and the second side key of the first section (see FIG. 15A, for example).

In one embodiment of the disclosure, the gesture input may include a swipe gesture or a squeeze gesture.

Hereinabove, various embodiments of the disclosure have been shown and described for the purpose of illustration and understanding without limiting the subject matter of the disclosure. It should be understood by those skilled in the art that many variations and modifications of the basic inventive concept described herein will still fall within the spirit and scope of the disclosure as defined in the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
 a foldable housing that includes:
  a hinge structure;
  a first housing structure connected to the hinge structure, and including a first surface facing in a first direction, a second surface facing in a second direction opposite to the first direction, and a first side surface surrounding at least some of a space between the first surface and the second surface; and
  a second housing structure connected to the hinge structure, including a third surface facing in a third direction, a fourth surface facing in a fourth direction opposite to the third direction, and a second side surface surrounding at least some of a space between the third surface and the fourth surface, and foldable with the first housing structure with the hinge structure as a center, wherein, in a folded state, the first side surface and the second side surface are aligned with each other;
a flexible display extended from the first surface to the third surface;
one or more first side keys disposed near the first side surface within the first housing structure, and including a first sensing panel reflecting a change in an external force applied to the first side surface;
one or more second side keys disposed near the second side surface within the second housing structure, and including a second sensing panel reflecting a change in an external force applied to the second side surface; and
a sensor disposed inside the foldable housing, electrically connected to the first sensing panel and the second sensing panel, and configured to generate a signal related to a key input based on a change in the external force detected by the first sensing panel or the second sensing panel,
wherein, in the folded state, at least one of the one or more first side keys and at least one of the one or more second side keys are substantially aligned with each other.

2. The electronic device of claim 1, wherein, in the folded state, the first surface faces the third surface.

3. The electronic device of claim 1, wherein, in the folded state, the second surface faces the fourth surface.

4. The electronic device of claim 1, wherein:
the first housing structure includes a portion extended parallel to and spaced apart from a folding axis of the foldable housing, and
the one or more first side keys are disposed at the portion.

5. The electronic device of claim 1, wherein:
the first housing structure includes a portion extended perpendicular to a folding axis of the foldable housing, and
the one or more first side keys are disposed at the portion.

6. The electronic device of claim 1, wherein the one or more first side keys and the one or more second side keys are aligned one-to-one in the folded state.

7. The electronic device of claim 1, wherein the one or more second side keys include:
a first section including at least one second side key aligned with the one or more first side keys in the folded state; and
a second section including at least one second side key not aligned with the one or more first side keys in the folded state.

8. The electronic device of claim 1, wherein the first sensing panel and the second sensing panel include a strain gauge.

9. The electronic device of claim 1, further comprising:
a processor electrically connected to the flexible display and the sensor; and
a memory electrically connected to the processor,
wherein the memory stores instructions that, when executed, cause the processor to assign a key function to at least one of the one or more first side keys or at least one of the one or more second side keys depending on the folded state.

10. The electronic device of claim 9, wherein the instructions are configured to cause the processor to:
assign, in the folded state, the same key function to a first side key selected from among the one or more first side keys and a second side key being aligned with the selected first side key and selected from among the one or more second side keys; and assign, not in the folded state, the key function to at least one of the selected first side key or the selected second side key.

11. The electronic device of claim 10, wherein the key function includes a function for increasing volume of an output sound, decreasing volume of an output sound, an artificial intelligence virtual assistant, or turning on or off power of the electronic device.

12. The electronic device of claim 9, wherein the instructions are configured to cause the processor to:
assign, in the folded state, a first key function and a second key function to a first side key selected from among the one or more first side keys and a second side key being aligned with the selected first side key and selected from among the one or more second side keys; and
assign, not in the folded state, the first key function and the second key function respectively to the selected first side key and the selected second side key.

13. The electronic device of claim 12, wherein the first key function is a function for an artificial intelligence virtual assistant, and the second key function is a function for turning on or off power of the electronic device.

14. The electronic device of claim 9, wherein:
the flexible display includes a first display area extended to the first side surface in a manner to overlap the one or more first side keys, and a second display area extended to the second side surface in a manner to overlap the one or more second side keys; and
in the folded state, the first display area and the second display area are aligned with each other.

15. The electronic device of claim 14, wherein the memory stores instructions that, when executed, cause the processor to, not in the folded state:
display a key indicator at a position of the first display area corresponding to one of the one or more first side keys to which a key function is assigned; and
display a key indicator at a position of the second display area corresponding to one of the one or more second side keys to which a key function is assigned.

16. The electronic device of claim 14, wherein the memory stores instructions that, when executed, cause the processor to, in the folded state:
assign the same key function to a first side key selected from among the one or more first side keys and a second side key being aligned with the selected first side key and selected from among the one or more second side keys; and
display, through the flexible display, a key indicator that extends from a first position of the first display area corresponding to the selected first side key to a second position of the second display area corresponding to the selected second side key.

17. The electronic device of claim 9, wherein the memory further stores instructions that, when executed, cause the processor to:
assign a gesture function to some of the one or more first side keys or some of the one or more second side keys depending on the folded state; and
identify a gesture input based on a signal related to a key input generated by the sensor by using some of the one or more first side keys or the one or more second side keys to which the gesture function is assigned.

18. The electronic device of claim 17, wherein the instructions are configured to cause the processor to:
assign, in the folded state, the same key function to a first side key selected from among the one or more first side keys and a second side key being aligned with the selected first side key and selected from among the one or more second side keys; and assign, not in the folded state, the key function and the gesture function respectively to the selected first side key and the selected second side key.

19. The electronic device of claim 17, wherein the one or more second side keys include a first section including at least one second side key aligned with the one or more first side keys in the folded state, and a second section including at least one second side key not aligned with the one or more first side keys in the folded state, and wherein the instructions are configured to cause the processor to:

assign, in the folded state, the same key function to a first side key selected from among the one or more first side keys and a second side key of the first section being aligned with the selected first side key, and assign the gesture function to at least one second side key of the second section; and assign, not in the folded state, the key function and the gesture function respectively to the selected first side key and the second side key of the first section.

20. The electronic device of claim 17, wherein the gesture input includes a swipe gesture or a squeeze gesture.

* * * * *